(12) United States Patent
Bentfeld et al.

(10) Patent No.: US 12,212,191 B2
(45) Date of Patent: Jan. 28, 2025

(54) PLANAR DRIVE SYSTEM, METHOD FOR OPERATING A PLANAR DRIVE SYSTEM, AND STATOR FOR DRIVING A ROTOR

(71) Applicant: Beckhoff Automation GmbH, Verl (DE)

(72) Inventors: Lukas Bentfeld, Delbrück (DE); Rolf Brinkmann, Bad Salzuflen (DE); Patrick Jebramcik, Gütersloh (DE); Tim Kaulmann, Paderborn (DE)

(73) Assignee: Beckhoff Automation GmbH, Verl (DE)

( * ) Notice: Subject to any disclaimer, the term of this patent is extended or adjusted under 35 U.S.C. 154(b) by 236 days.

(21) Appl. No.: 17/886,750

(22) Filed: Aug. 12, 2022

(65) Prior Publication Data

US 2022/0393555 A1 Dec. 8, 2022

Related U.S. Application Data

(63) Continuation of application No. PCT/EP2021/056714, filed on Mar. 16, 2021.

(30) Foreign Application Priority Data

Mar. 19, 2020 (EP) .................................... 20164167

(51) Int. Cl.
*H02K 11/27* (2016.01)
*H02K 1/22* (2006.01)
(Continued)

(52) U.S. Cl.
CPC ............. *H02K 11/27* (2016.01); *H02K 1/223* (2013.01); *H02K 1/272* (2013.01); *H02K 21/042* (2013.01)

(58) Field of Classification Search
CPC ............ H02K 1/22; H02K 1/223; H02K 1/27; H02K 1/272; H02K 11/00; H02K 11/27;
(Continued)

(56) References Cited

U.S. PATENT DOCUMENTS

| 7,948,122 B2 | 5/2011 | Compter et al. |
| 10,116,195 B2 | 10/2018 | Lu |
| 2005/0093378 A1 | 5/2005 | Ohishi |

FOREIGN PATENT DOCUMENTS

| DE | 2111802 A1 | 9/1971 |
| EP | 1842101 B1 | 9/2014 |

(Continued)

OTHER PUBLICATIONS

International Search Report and Written Opinion dated Apr. 14, 2021 in connection with PCT/EP2021/056714, 25 pages including translation.

(Continued)

*Primary Examiner* — Tran N Nguyen
(74) *Attorney, Agent, or Firm* — Dorsey & Whitney LLP

(57) ABSTRACT

A planar drive system comprises a stator and a rotor. The stator comprises a plurality of stator conductors. The rotor comprises a magnet device comprising at least one rotor magnet. The stator is configured to energize the stator conductors. A magnetic interaction can be produced between energized stator conductors of the stator and the magnet device of the rotor in order to drive the rotor. The stator is configured to carry out the energizing of the stator conductors by a current control based on a pulse-width modulation. Due to the current control, a ripple current in energized stator conductors of the stator and thereby an alternating magnetic field can be generated. The rotor comprises at least one rotor coil in which an alternating voltage can be induced due to the alternating magnetic field.

19 Claims, 29 Drawing Sheets

(51) Int. Cl.
  *H02K 1/272* (2022.01)
  *H02K 21/04* (2006.01)
  *H02K 41/02* (2006.01)

(58) Field of Classification Search
  CPC ...... H02K 41/00; H02K 41/03; H02K 41/031;
    G03F 7/70; G03F 7/707; G03F 7/70716;
    G03F 7/70725; G03F 7/70758; G03F
    7/709; G03F 7/7096; G03F 7/70991;
    G01B 7/00; G01B 7/003; G01D 5/00;
    G01D 5/14; G01D 5/145
  See application file for complete search history.

(56) References Cited

FOREIGN PATENT DOCUMENTS

| EP | 3285046 | A1 | | 2/2018 |
|---|---|---|---|---|
| GB | 1346094 | A | * | 2/1974 |
| JP | H086642 | A | | 1/1996 |
| JP | 2002112526 | A | | 4/2002 |
| JP | 5422126 | B2 | | 11/2013 |
| WO | 2009083891 | A2 | | 7/2009 |
| WO | 2015179962 | A1 | | 12/2015 |

OTHER PUBLICATIONS

International Preliminary Report on Patentability dated Jul. 12, 2022 in connection with PCT/EP2021/056714, 61 pages including translation.
Extended European Search Report dated Oct. 1, 2020 in connection with European Patent Application No. 20164167.7, 26 pages including translation.
Boerhof, R., "Transforming a planar maglev system to new application areas," Philips Innovation Services, DSPE, Oct. 2016.
English translation of European Patent Publication EP 3285046 A1, Feb. 21, 2018, 20 pages.
In re Bozek, United States Court of Customs and Patent Appeals, 416 F.2d 1385, Nov. 6, 1969, 6 pages.

* cited by examiner

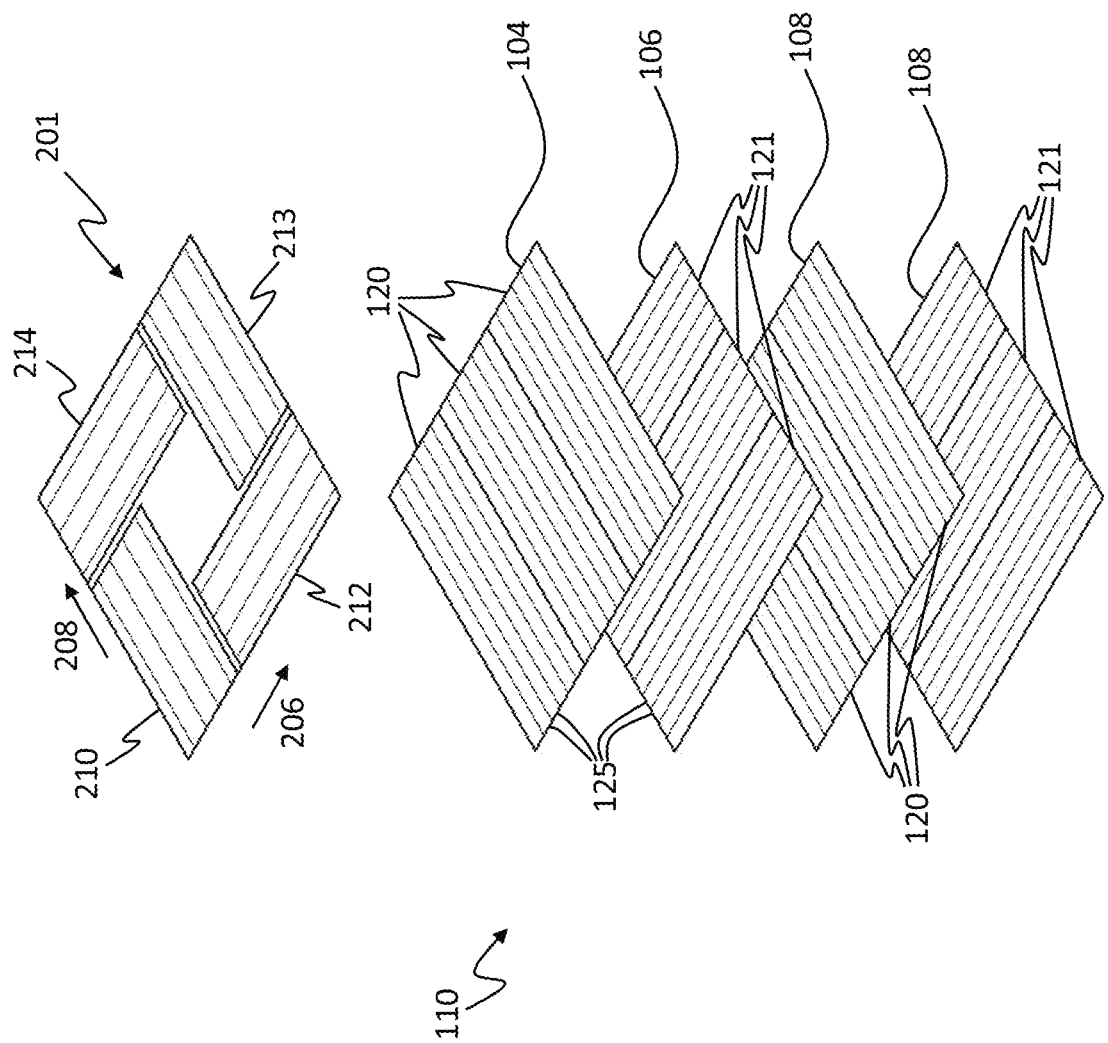
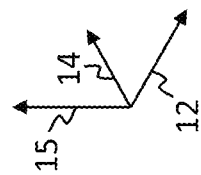
Fig. 5

PLANAR DRIVE SYSTEM, METHOD FOR OPERATING A PLANAR DRIVE SYSTEM, AND STATOR FOR DRIVING A ROTOR

CROSS REFERENCE TO RELATED APPLICATIONS

This patent application is a continuation of International Patent Application No. PCT/EP2021/056714, PLANAR DRIVE SYSTEM, METHOD FOR OPERATING A PLANAR DRIVE SYSTEM, AND STATOR FOR DRIVING A ROTOR, filed 16 Mar. 2021, which claims the priority of European patent application No. EP 20 164 167.7, PLANARANTRIEBSSYSTEM, VERFAHREN ZUM BETREIBEN EINES PLANARANTRIEBSSYSTEMS UND STATOR ZUM ANTREIBEN EINES LÄUFERS, filed 19 Mar. 2020, each of which is incorporated by reference herein, in the entirety and for all purposes.

FIELD

The present invention relates to a planar drive system. The invention further relates to a stator for a planar drive system for driving a rotor.

BACKGROUND

Planar drive systems may be used in various fields. Possible examples are automation technology, in particular manufacturing technology, handling technology and process engineering. A planar drive system may be used to move or position a movable element, which may e.g. be a component of a system or machine, in at least two linearly independent directions. A planar drive system may comprise a permanently energized electromagnetic planar motor with a planar stator and at least a rotor that may be moved above the stator in at least two directions.

The stator of a planar drive system may comprise a plurality of energizable stator conductors. The rotor may comprise a magnet device comprising a plurality of permanent magnets. The rotor may be driven by energizing stator conductors of the stator. In this way, a magnetic interaction may be caused between energized stator conductors and the magnet device of the rotor, wherein the rotor may be held suspended above the stator and moved above it.

EP 1 842 101 B1 describes a planar motor with a stator and a movable rotor. The rotor comprises a plurality of electronics and pick-up coils for absorbing energy so that the electronics may be supplied with energy.

SUMMARY

The present invention provides an improved planar drive system and an improved stator for driving a rotor.

According to a first aspect, a planar drive system is proposed. The planar drive system comprises a stator and a rotor. The stator comprises a plurality of stator conductors. The rotor comprises a magnet device comprising at least one rotor magnet. The stator is configured to energize the stator conductors. A magnetic interaction may be produced between energized stator conductors of the stator and the magnet device of the rotor in order to drive the rotor. The stator is configured to carry out the energizing of the stator conductors by a current control based on a pulse-width modulation. Due to the current control, a ripple current in energized stator conductors of the stator and thereby an alternating magnetic field may be generated. The rotor comprises at least one rotor coil in which an alternating voltage may be induced due to the alternating magnetic field.

According to a second aspect, a stator for a planar drive system for driving a rotor is proposed. The rotor comprises a magnet device comprising at least one rotor magnet and at least one rotor coil. The stator comprises a plurality of stator conductors. The stator is configured to energize the stator conductors, so that a magnetic interaction may be produced between energized stator conductors of the stator and the magnet device of the rotor in order to drive the rotor. The stator is configured to carry out the energizing of the stator conductors for driving the rotor by a current control based on a pulse-width modulation, so that stator conductors to be energized are supplied with an electrical voltage clocked by pulse-width modulation and thus with pulse-width-modulated periodic voltage pulses. Due to the current control based on pulse-width modulation, a ripple current in energized stator conductors of the stator and thereby an alternating magnetic field may be generated via which an alternating voltage may be induced in the at least one rotor coil of the rotor. The stator comprises an optionally switchable influencing device which is configured to influence the current control in such a way that an amplified ripple current in energized stator conductors of the stator and thus an amplified alternating magnetic field may be generated. The amplified ripple current and the amplified alternating magnetic field comprise a larger oscillation width than the ripple current and the alternating magnetic field in a state without influence on the current control by the influencing device.

According to a third aspect, a further planar drive system is proposed. The planar drive system comprises a stator and a rotor. The stator comprises a plurality of stator conductors. The rotor comprises a magnet device comprising at least one rotor magnet. The stator is configured to energize the stator conductors. A magnetic interaction may be produced between energized stator conductors of the stator and the magnet device of the rotor in order to drive the rotor. The stator is configured to carry out the energizing of the stator conductors by a current control based on a pulse-width modulation. Due to the current control, a ripple current in energized stator conductors of the stator and thereby an alternating magnetic field may be generated. The rotor comprises at least one rotor coil in which an alternating voltage may be induced due to the alternating magnetic field. The at least one rotor coil of the rotor is configured as a wound wire and encloses the magnet device of the rotor.

EXAMPLES

The examples described in the following relate to a planar drive system suitable for wireless power transmission from a stator to a rotor. Further described are a corresponding method of operating a planar drive system, and a stator for a planar drive system for driving a rotor.

A planar drive system is proposed. The planar drive system comprises a stator and a rotor. The stator comprises a plurality of stator conductors. The rotor comprises a magnet device comprising at least one rotor magnet. The stator is configured to energize the stator conductors. A magnetic interaction may be produced between energized stator conductors of the stator and the magnet device of the rotor in order to drive the rotor. The stator is configured to carry out the energizing of the stator conductors by a current control based on a pulse-width modulation. Due to the current control based on pulse-width modulation, a ripple current in energized stator conductors of the stator and thereby an alternating magnetic field may be generated. The rotor comprises at least one rotor coil in which an alternating voltage may be induced due to the alternating magnetic field.

The proposed planar drive system is suitable for reliable wireless or inductive power transfer from the stator to the rotor. Here, energized stator conductors of the stator act as primary windings or primary coils, and the at least one rotor coil of the rotor serves as a secondary winding or secondary coil. In order to induce an electrical voltage in the rotor coil of the rotor, a magnetic field varying over time is required in the region of the rotor coil. A time-variable electric current in electrically driven stator conductors of the stator may provide such a time-varying magnetic flux in the area of the rotor coil.

In this context, the planar drive system makes use of the fact that the stator conductors serving as primary windings are energized by electrical current control based on pulse-width modulation (PWM). In this process, stator conductors to be energized are supplied with an electrical voltage clocked by pulse-width modulation, and consequently with pulse-width-modulated periodic voltage pulses, or in other words, with periodic voltage pulses specified by a PWM clock frequency or by a time raster of the pulse-width modulation. A side effect of this type of current control is that the electric current generated in energized stator conductors is superimposed with an alternating current component, referred to as ripple current. This is due to a smoothing effect of the stator conductors serving as primary coils, as a result of which the current flowing in electrically energized stator conductors follows the pulse-width-modulated voltage in such a way that a sawtooth or triangular current curve is provided. Here, the current may oscillate back and forth around a mean value.

The occurrence of the ripple current is associated with a time-varying magnetic field. In this manner, an alternating electrical voltage may be induced in the at least one rotor coil of the rotor, and consequently electrical energy may be transferred from the stator to the rotor. The induced AC voltage may be substantially proportional to the time variation of the magnetic flux passing through the rotor coil.

Thus, in the planar drive system, no additional primary coil is used at the stator to inductively transfer an electrical energy from the stator to the rotor. Instead, the energy transfer is based on a parasitic utilization of the ripple current caused by the pulse-width-modulated pulsed current, and thus on the alternating magnetic field generated by the ripple current in the region of the rotor.

Further possible details and embodiments, which may be considered for the planar drive system, are described in more detail below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 shows is an exploded view of the magnet assembly of the rotor and stator layers of the stator module;

DETAILED DESCRIPTION

Figure 1:
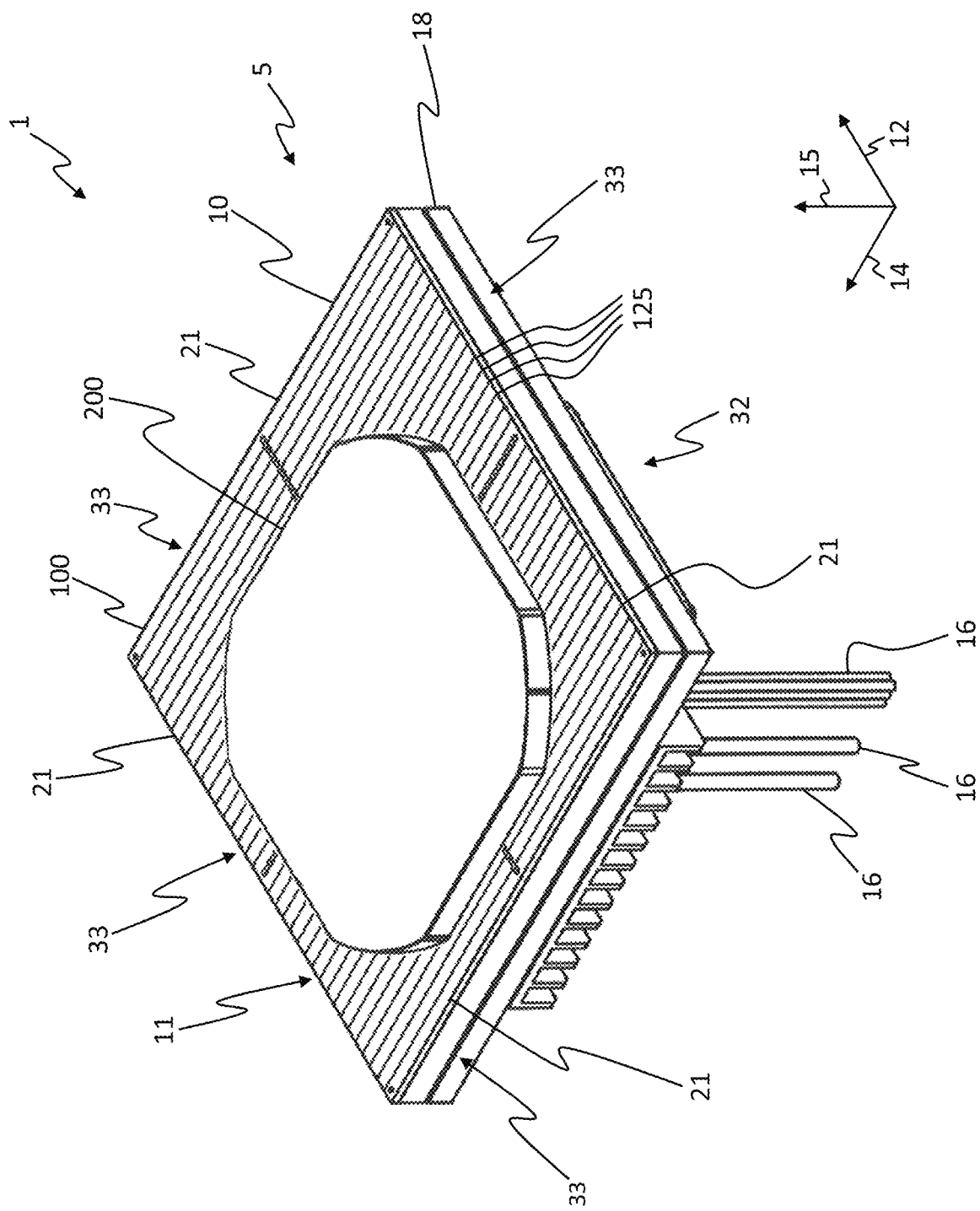
FIG. 1 shows a perspective view of a planar drive system with a stator and a rotor, wherein the stator comprises a stator module.

Based on the following schematic figures, embodiments of a planar drive system and a method for operating a planar drive system are described. The planar drive system, which comprises a planar stator and a movable rotor, is suitable for reliable inductive power transfer from the stator to the rotor. With reference to the embodiments described below, it is noted that aspects and details described with respect to an embodiment may be applicable to another embodiment. Furthermore, it is possible to combine features of multiple embodiments.

The PWM clock frequency may be in the kHz range and e.g. amount to 64 kHz.

The at least one rotor magnet of the rotor magnet device may be a permanent magnet.

Various embodiments are conceivable with regard to the at least one rotor coil of the rotor. It is e.g. possible that the rotor has at least one printed circuit board (PCB). The at least one printed circuit board may have a multi-layer embodiment. The at least one rotor coil of the rotor may be implemented as one or more spiral-shaped metallic conductor paths of the at least one PCB.

For example, the rotor may comprise a single printed circuit board comprising one or more spiral conductive paths, each of which may form one or more rotor coils. Furthermore, the rotor may comprise a plurality of separate printed circuit boards each comprising one or more spiral-shaped conductive paths, each of which may form one or more rotor coils. A plurality of spiral conductive paths or rotor coils may be electrically connected or electrically series-connected to one another.

The rotor magnet device may comprise a plurality of rotor magnets. The rotor magnets may be arranged such that the rotor magnets surround a region. Furthermore, the magnet device may e.g. have a rectangular or square contour.

In a further embodiment, which may be used in this context, the at least one rotor coil of the rotor is arranged in the region surrounded by the rotor magnets of the magnet device. In this embodiment, a multi-layer printed circuit board having a plurality of layers arranged one on top of the other and a plurality of spiral conductor paths arranged one on top of the other may be used. In this embodiment, the printed circuit board may integrated into the rotor in a relatively simple manner. In this case, the rotor may have an exposing recess in its center, within which the printed circuit board may be arranged. Also, the printed circuit board may comprise a relatively large number of layers and superimposed spiral conductor paths, which allows for effective energy transfer from the stator to the rotor. This may further be aided by a large number of turns of the spiral conductive paths. For example, the number of layers and spiral conductor paths may amount to six or eight. The printed circuit board used may e.g. have a thickness of 1 mm.

In a further embodiment, the rotor comprises a plurality of rotor coils arranged in a region below the magnet device of the rotor. During operation of the planar drive system, the rotor coils may be located between the stator and the magnet device of the rotor. In this embodiment, as well, a multi-layer printed circuit board having a plurality of layers and a plurality of spiral conductor paths arranged one on top of the other may be used. Further, in the region of each layer, a plurality of spiral conductor paths arranged side by side may be provided. The printed circuit board may be disposed on the underside of the rotor. Also, the circuit board may extend over all or substantially all of the surface of the rotor. In this way, a relatively large coil area may be provided, which promotes effective energy transfer from the stator to the rotor. Furthermore, this embodiment is compatible with an embodiment of the rotor without an exposing recess in its center. Since in this embodiment the flying height of the rotor may be reduced by the thickness of the printed circuit board, it may be taken into account to use a relatively flat printed circuit board with a smaller number of layers when compared to the above embodiment. For example, two layers are possible. Furthermore, the printed circuit board used may have a thickness of e.g. 0.3 mm.

In a further embodiment, the rotor has a plurality of rotor coils arranged in the region of lateral outer sides of the rotor. This embodiment, as well, is compatible with an embodiment of the rotor without an exposing recess in the center thereof. In this embodiment, a plurality of multi-layer printed circuit boards having a plurality of layers and a plurality of spiral conductor paths arranged one on top of the other may be used. The printed circuit boards may comprise a relatively large number of layers and stacked spiral conductor paths, which may e.g. amount to six or eight. Also, the printed circuit boards used may have a thickness of e.g. 1 mm. Furthermore, the printed circuit boards may be integrated in spacers of the rotor, which may be present in the region of the lateral outer sides of the rotor.

A wound metallic wire may also be used as the rotor coil. In this context, the following embodiments are conceivable.

In a further embodiment, the at least one rotor coil of the rotor is in the form of a wound wire and surrounds the magnet device of the rotor. In this embodiment, inductive energy transfer from the stator to the rotor may be performed with a high efficiency, and as a result, a relatively large electrical power may be transferred. This embodiment, as well, is compatible with an embodiment of the rotor without an exposing recess in its center. The rotor coil, realized as a wound wire, may be arranged in the region of lateral outer sides of the rotor. Furthermore, the rotor coil may be integrated in a circumferential spacer or a circumferential spacer structure of the rotor. Furthermore, the rotor coil may comprise a plurality of circumferential wire windings.

An embodiment of the rotor without an exposing recess at its center, as indicated above, allows a relatively small design of the rotor with small lateral dimensions.

In a further embodiment, the rotor comprises a rectifier for converting the induced AC voltage into a DC voltage. The DC voltage may be used to supply at least one further device. The further device, which may be a component of the rotor and/or arranged on the rotor, may e.g. be an electronic system. The rectifier may e.g. be a bridge rectifier or a synchronous rectifier. Furthermore, the rectifier may be a voltage amplifier or voltage doubler.

The energizing of stator conductors of the stator serves to drive the rotor as indicated above. The drive of the rotor is based on a magnetic interaction between energized stator conductors of the stator and the magnet device of the rotor. Here, the rotor may be held suspended above the stator as well as additionally moved. As will be explained in more detail below, the stator conductors of the stator may be interconnected to form independently energizable multi-coil or multi-phase systems. In order to drive the rotor, depending on a position of the rotor, a part of the stator conductors or of the multi-phase systems may be energized simultaneously. Driving the rotor may be based on the mean value of the current flowing in energized stator conductors. The ripple current caused by the pulse-width-modulated current, on the other hand, may have no or only a small and thus negligible influence on the driving of the rotor.

The ripple current generated in energized stator conductors or multi-phase systems of the stator may be relatively large, i.e. have a relatively large oscillation width (peak-to-valley value, peak-to-peak amplitude). For example, an oscillation width in the single-digit ampere range is possible, for example in a range up to 4 A. Correspondingly, the alternating magnetic field generated due to the ripple current may have a relatively large oscillation width, which allows for effective inductive energy transfer from the stator to the rotor. The presence of a relatively large ripple current may result from a low inductance of the stator conductors serving as primary coils of the stator. The magnitude of the ripple current may depend on the mean value of the current flowing in energized stator conductors.

The current control implemented in the planar drive system may be referred to as direct current control or DC current control. During operation of the planar drive system, different electrical setpoint current values may be specified for stator conductors or multi-phase systems of the stator as part of the current control, so that different electrical currents may also flow through the stator conductors on average. Compared to the superimposed ripple current, such current changes may be much slower or relate to much longer periods of time. In this respect, despite the different currents on average, the term DC current control may be used.

In order to carry out current control, according to an embodiment the planar drive system comprises a plurality of current controllers, PWM signal generating devices, output stage devices connected to the stator conductors or multi-phase systems, and current measuring devices. The output stage devices may comprise a plurality of output stages. Such components may be components of the stator. The current measuring devices, which may e.g. each comprise an analog-to-digital converter (ADC), may be configured to detect actual current values of stator conductors or multi-phase systems. The actual current values, together with setpoint current values, may be transmitted to the current controllers. With regard to the actual current values, the stator may further have processing devices which process the actual current values obtained with the current measuring devices so that they may be transmitted to the current controllers in processed form. The current controllers may be configured to generate control signals or setpoint voltage signals. The generation of the control signals may be based on the setpoint current values and the (processed) actual current values. The PWM signal generating devices may be configured to generate pulse-width-modulated control signals, which are applied to the output stage devices. As a result, the control signals generated by the current controllers may be converted into the pulse-width-modulated control signals via the PWM signal generating devices. Based on this, pulse-width-modulated or clocked voltage pulses may be applied to stator conductors or multi-phase systems of the stator via the output stage devices, wherein these are periodically energized. The output stage devices may be supplied with an intermediate circuit voltage for this purpose.

In a further embodiment, the planar drive system comprises a main controller which is configured to generate setpoint current values for energizing stator conductors or multi-phase systems of the stator. The setpoint current values may be transmitted to the aforementioned current controllers.

The main controller may further be configured to define a system clock of the planar drive system, according to which the timing of the operation of the planar drive system may be determined. On the basis of the system clock, temporal parameters of the current control such as the PWM clock frequency may be specified in this context.

In a further embodiment, the stator of the planar drive system comprises one or more stator modules. In an embodiment with multiple stator modules, these may be arranged laterally adjacent to one another. Such a stator module may comprise a plurality of the above components, i.e., a plurality of stator conductors or multi-phase systems, current controllers, PWM signal generating devices, output stage devices, current measuring devices, and processing devices. Furthermore, the stator module or each stator module may have a module controller, which may comprise the current controllers, PWM signal generating devices, and processing devices of the respective stator module. The module controller may e.g. be implemented in the form of a field programmable gate array (FPGA).

Current control in such a stator module may be performed in accordance with the manner described above in that actual current values of stator conductors or multi-phase systems are detected with the aid of the associated current measuring devices. These may be fed to the module controller of the stator module, and processed by processing devices of the module controller and transmitted to current controllers of the module controller. Furthermore, setpoint current values generated by the main controller may be transmitted to the current controllers of the module controller. Based on the setpoint current values and the processed actual current values, the current controllers may generate control signals which may be converted into pulse-width-modulated and thus clocked control signals by the PWM signal generating devices of the module controller and applied to output stage devices of the associated stator module.

As indicated above, according to a further embodiment, it is provided that the stator conductors of the stator are interconnected to form multi-phase systems which may be energized independently of each other. Each multi-phase system may have a plurality of coils formed by stator conductors. In this respect, the multi-phase systems may also be referred to as coil systems or multi-coil systems. To drive the rotor, a portion of the multi-phase systems may be energized simultaneously.

With respect to the above embodiment, the stator of the planar drive system may be configured to energize multi-phase systems thereof with a multi-phase current. Here, each coil of an energized multi-phase system may be fed with a corresponding phase of the current. The current control carried out for this purpose with the aid of the stator may be based on center-aligned PWM, in which the coils of a multi-phase system are supplied with voltage pulses centered with regard to one another with respect to the PWM clock frequency or a time grid of the pulse-width modulation.

The multi-phase systems of the stator may be three-phase systems or three-coil systems, each comprising three coils formed by stator conductors and interconnected with a shared star point in each case. During operation of the planar drive system, such coil systems may be energized with a three-phase current. With reference to this embodiment, the output stage devices may be realized in the form of circuits with triple half-bridges.

With respect to independent energizing of multi-phase systems, the stator is adapted to perform separate current control for each multi-phase system. For this purpose, the stator may have the components already mentioned above, i.e., current controllers, PWM signal generating devices, output stage devices connected to the multi-phase systems, current measuring devices, and processing devices. The current measuring devices may be configured to sense actual current values of stator conductors or coils of the multi-phase systems. This may be done by sampling. The processing devices may be configured to process the detected actual current values. Here, a coordinate transformation (Clarke-Park transformation) of the actual current values obtained at a multi-phase system may be carried out. The current controllers may be configured to generate control signals or voltage signals based on setpoint current values and processed actual current values. The PWM signal generating devices may be configured to generate pulse-width-modulated control signals or to convert the control signals output by the current controllers into pulse-width-modulated control signals. Coordinate transformation (inverse Clarke Park transformation) may also be carried out as part of the conversion. The pulse-width-modulated control signals generated by the PWM signal generating devices may be applied to output stage devices, wherein associated multi-phase systems may have periodic voltage pulses applied to them and thereby be energized. Center-oriented voltage pulses may be applied to the multi-phase systems.

It is possible for the stator to comprise a current controller, a PWM signal generating device, an output stage device, and a processing device for each multi-phase system. Also, for each multi-phase system, there may be a current measuring device associated with the respective multi-phase system. The current measuring devices may be configured to sample or periodically sample currents flowing in the associated multi-phase systems. In the above-mentioned embodiment of the multi-phase systems as three-phase systems in star connection, the sampling may in each case relate to two of the three coils of a three-phase system. This is because the currents flowing in the two sampled coils may be used to infer the current flowing in the non-sampled coil. Alternatively, the embodiment deviating from this and described below may be considered.

In a further embodiment, in which the stator conductors of the stator are interconnected to form multi-phase systems which may be supplied with current independently of one another, and the stator is configured to carry out a separate current control for each multi-phase system, the stator comprises a plurality of current measuring devices for carrying out the current control, the current measuring devices each being connected to a group of a plurality of multi-phase systems and thus each being assigned to one such group of multi-phase systems. The current measuring devices are further configured to periodically sample currents flowing in multi-phase systems of the respective associated group, and to perform the sampling of the currents only with respect to one of the multi-phase systems simultaneously. This embodiment, in which the stator has one current measuring device each for a group of a plurality of multi-phase systems, may be characterized by low hardware requirements and thus low costs.

In the above-mentioned embodiment of the multi-phase systems as three-phase systems in star connection, the simultaneous sampling may refer to two of the three coils of a three-phase system in each case. This is because the currents flowing in the two sampled coils may be used to infer the current flowing in the non-sampled coil.

During periodic sampling, actual current values of the currents may be obtained. Sampling may be performed at predetermined times. It may also be considered to perform the sampling of a multi-phase system in time with its pulse-width-modulated current supply. In this context, the sampling times may be selected or synchronized with the clock frequency of the pulse-width modulation in such a way that the actual current values obtained by sampling correspond to the mean value of the respective current. For this purpose, sampling may be performed temporarily in between corresponding voltage pulses (so-called regular sampling method). Also, one measurement may be performed per PWM clock period. This procedure allows for precise current control.

In the above embodiment, only one current measuring device is used for each group of plurality of multi-phase systems. The current measuring device is also configured to perform the current scan only with respect to one of the multi-phase systems of the associated group simultaneously.

In order to provide accurate current control even in such a case, the stator is, according to a further embodiment, configured to perform the periodic sampling of the currents of multi-phase systems of a group with the aid of the associated current measuring device in a time-coordinated manner with their pulse-width-modulated energizing. The stator is also configured to perform the pulse-width-modulated energizing of multi-phase systems of the group and the sampling coordinated therewith with a time offset with regard to one another, or in other words in mutually offset time lapses. The time offset which exists in each case between the pulse-width-modulated energizing of different multi-phase systems of the group concerned and between the sampling of different multi-phase systems of the group or from one multi-phase system to the respective next multi-phase system of the group corresponds to a sampling time period or minimum sampling time period of the current measuring devices. This embodiment may be applied with respect to any group of multi-phase systems of the stator. Pulse-width-modulated energizing of multi-phase systems with a time offset with regard to one another offers the possibility of achieving a relief of an intermediate circuit providing the intermediate circuit voltage.

In the aforementioned embodiment, multi-phase systems of a group are each sampled in coordination with their pulse-width-modulated electrical control. In this context, one current measuring may be carried out per PWM period. Average current values may also be obtained as actual current values, which allows for precise current control. Since only one multi-phase system at a time may be sampled simultaneously with the aid of the associated current measuring device, a plurality of or all multi-phase systems of the relevant group are sampled at offset times or in offset time frames with the aid of the current measuring device and, correspondingly, energized at offset times or in offset time frames on the basis of pulse-width modulation. The above-mentioned time slots may be specified by the clock frequency of the pulse-width modulation, on the basis of which the clocked energizing of the multi-phase systems is carried out.

During operation of the stator, multi-phase systems of a plurality of groups of multi-phase systems, which are assigned to different current measuring devices in a corresponding manner, may also be energized simultaneously. In this case, it is possible that the offset time grids in the different groups are synchronous to one another or, in other words, that in each case multi-phase systems from the different groups are energized synchronously with one another by pulse-width modulation and sampled synchronously with one another.

According to the above-mentioned embodiment, it is further provided that the time offset corresponds to a sampling time period or minimum sampling time period of the current measuring devices. This is the time required by a current measuring device for simultaneous sampling of the currents of an associated multi-phase system. This embodiment takes into account the fact that the rotor and thus the at least one rotor coil of the rotor may be located above or in the area of influence of a plurality of energized multi-phase systems of the stator during operation of the planar drive system. In this way, the rotor coil may be subject to the influence of a resulting alternating magnetic field, which is formed by a superposition of a plurality of alternating magnetic fields, each caused by the ripple currents flowing in the respective multi-phase systems. The pulse-width-modulated electrical control of multi-phase systems described above has the consequence that the ripple currents and thus the alternating magnetic fields caused by them are also offset or out of phase with one another. In this way, depending on the position of the rotor, different constructive as well as destructive or weakening superpositions of alternating magnetic fields with different field strength changes may occur. In a corresponding manner, the AC voltage induced in the rotor coil and thus the energy transferred from the stator to the rotor may vary.

In the aforementioned embodiment, the offset pulse-width-modulated energization of multi-phase systems therefore takes place with a minimum time offset in the form of the sampling time period of the current measuring devices. In this way, it may be achieved that the alternating magnetic fields of energized multi-phase systems are partially or to a relatively large extension constructively superimposed. In this way, the inductive energy transfer from the stator to the rotor may be as effective as possible and largely independent of position, and fluctuations in the quality of the energy transfer may be relatively small. The minimum offset may also prevent a voltage change from occurring at another multi-phase system at the time of sampling a multi-phase system, resulting in a disturbance of the current measuring. The minimum sampling time may e.g. be in the single-digit microsecond range and may e.g. amount to 1.2 μs.

In a further or alternative embodiment, the stator is, in a first operating mode, configured to perform the periodic sampling of the currents of multi-phase systems of a group with the aid of the associated current measuring device in a time-coordinated manner with their pulse-width-modulated current, and to perform the pulse-width-modulated current of multi-phase systems of the group and the sampling coordinated therewith with a time offset from one another, or in other words, in mutually offset time slots. According to the above description, one current measuring may be made per PWM period, and average current values may be obtained as actual current values, which allows for accurate current control. The stator is further configured, in a second operating mode, to perform the pulse-width-modulated energization of multi-phase systems of the group in time synchronism with one another, and the periodic sampling of currents flowing in the multi-phase systems of the group with the aid of the associated current measuring device with a time offset from each other. This embodiment may also be applied with respect to any group of multi-phase systems of the stator. The time offset present in the first operating mode and the time offset present in the second operating mode may correspond to the sampling time period and minimum sampling time period, respectively, of the current measuring devices.

In the first mode of operation, current control is carried out as in the previously described embodiment. This operating mode may be used when power transfer from the stator to the rotor is not required or not foreseen or, in other words, when an AC voltage induced in the at least one rotor coil is not used.

The second operating mode, on the other hand, may be used to effect efficient power transfer from the stator to the rotor in a targeted manner. In the second mode of operation, the energizing of multi-phase systems of a group occurs synchronously with each other, or in other words, without time offset and thereby in a shared time grid. As indicated above, in the operation of the planar drive system, multi-phase systems of multiple groups of multi-phase systems may be energized simultaneously. In this context, in the second mode of operation, multi-phase systems of multiple groups may also be energized in a temporally synchronous manner with respect to one another or in a shared time grid in a pulse-width-modulated manner. The temporally synchronous energizing of multiple multi-phase systems has the consequence that the ripple currents flowing in the respective multi-phase systems and the alternating magnetic fields caused thereby are synchronous with one another and in phase, and are superimposed exclusively or to the greatest possible extension by construction. In this way, relatively large magnetic field strength changes may be brought about and, to that extension, a relatively large alternating voltage may be induced in the at least one rotor coil of the rotor. This allows for an effective and furthermore position-independent energy transfer from the stator to the rotor.

In the second operating mode, a current measuring may also be performed per PWM period. However, due to the time offset in the second operating mode between the sampling of different multi-phase systems of a respective group or from one multi-phase system to the next multi-phase system of the group, only one multi-phase system of the group may be sampled in the second operating mode in a way that is matched to its pulse-width-modulated current that average current values are obtained as actual current values for this multi-phase system of the group. However, this is not possible for one or more other multi-phase systems of the group in question due to the sampling being carried out offset from one another in the second operating mode. As a result, actual current values deviating from the mean current values may be determined for these multi-phase systems. As a result, the accuracy of the current control may be somewhat impaired. As indicated above, however, the second operating mode may only be used for the case of a targeted energy transfer from the stator to the rotor, and thus for a limited time, so that such an impairment may be neglected.

The energizing of multi-phase systems of one or more groups of multi-phase systems of the stator according to the first or second operating mode may be specified or initiated by the main controller of the planar drive system. For this purpose, the main controller may transmit corresponding control signals to one or more current controllers or module controllers in order to specify the respective operating mode.

In a further embodiment, the stator has an optionally switchable influencing device which is configured to influence the current control in such a way that an amplified ripple current in energized stator conductors or in one or more energized multi-phase systems of the stator and thereby an amplified alternating magnetic field may be generated. This may be done in such a way that a mean value of a current flowing in energized stator conductors or multi-phase systems remains unchanged.

The ripple current amplified using the influencing device as well as the amplified alternating magnetic field may have an enlarged oscillation width. The amplified alternating magnetic field may induce an increased alternating voltage, which may also have an increased oscillation width, in the at least one rotor coil of the rotor. In this way, an effective energy transfer from the stator to the rotor may be achieved. Furthermore, it is possible to use the influencing device to influence the magnitude or oscillation width of the ripple current independently of the mean value of the current flowing in electrically controlled stator conductors.

The influencing device may e.g. be configured to generate influencing signals which may be added to the control signals generated by one or more current controllers before they are transmitted to one or more PWM signal generating devices. The influencing signals added to the control signals may e.g. be in the form of a zero-mean AC voltage or may reproduce the effect of such an AC voltage. In this way it may be achieved that the mean value of the output voltage, and thus also the mean value of the current flowing in energized stator conductors, remains the same as indicated above. This condition may apply to a plurality of PWM periods. Alternatively, it is possible for the influencing signals to be added to the pulse-width-modulated control signals generated by one or more PWM signal generating devices before they are applied to corresponding output stage devices.

The influencing signals may be used to amplify the ripple current flowing in energized stator conductors. It is e.g. possible that voltage pulses with different pulse durations and/or mutually inverse polarities are applied to stator conductors or to one or more multi-phase systems as a result of the influencing signals. For example, a plurality of voltage pulses with increased pulse duration and subsequently a plurality of voltage pulses with inverse polarity compared to the preceding voltage pulses may alternately be present in succession.

The stator may have one influencing device or, if the stator is configured with a plurality of stator modules, one influencing device per stator module. It is also possible for the stator to have a separate influencing device for each multi-phase system and thus for each current controller or each PWM signal generating device. One or a plurality of influencing devices may each be integrated in a module controller of a stator module. Activation of one or of a plurality of influencing devices for influencing the current control, as well as deactivation thereof, may be initiated by the main controller of the planar drive system. For this purpose, the main controller may transmit corresponding control signals to one or more influencing devices or module controllers.

A method of operating a planar drive system is proposed. The planar drive system may be as described above or according to one or a plurality of the embodiments described above. The planar drive system comprises a stator and a rotor. The stator comprises a plurality of stator conductors. The rotor comprises a magnet device with at least one rotor magnet. Energizing stator conductors of the stator causes magnetic interaction between energized stator conductors and the magnet device of the rotor to drive the rotor. The energizing of the stator conductors is carried out by a current control based on a pulse-width modulation. Due to the pulse-width-modulated current control, a ripple current is generated in energized stator conductors of the stator and thereby an alternating magnetic field is generated. The rotor comprises at least one rotor coil in which an alternating voltage is induced due to the alternating magnetic field.

The proposed method may be used to effect reliable inductive energy transfer from the stator to the rotor. The ripple current generated by the pulse-width-modulated current and the alternating magnetic field caused by the ripple current in the area of the rotor are used for the energy transfer.

The same features, details, and embodiments may be applied to the method, and the same advantages may be considered as discussed above with respect to the planar drive system.

In this sense, according to a possible embodiment, the stator conductors of the stator are interconnected to form multi-phase systems that may be energized independently of each other. Furthermore, a separate current control is performed for each energized multi-phase system. To carry out the current control, the stator has a number of current measuring devices, each of which is connected to a group of a number of multi-phase systems and is thus assigned to a respective group of multi-phase systems. The current measuring devices are used to periodically sample currents flowing in energized multi-phase systems of the respective associated group. In this case, the currents are sampled simultaneously only with respect to one of the multi-phase systems. This embodiment may be realized with a low hardware effort of the stator.

In addition to the current sampling devices, the stator may have other components as indicated above. These include current controllers, PWM signal generating devices, output stage devices connected to the multi-phase systems, and processing devices.

In a further embodiment, the periodic sampling of the currents of multi-phase systems of a group is carried out with the aid of the associated current measuring device in a time-coordinated manner with their pulse-width-modulated energizing. Furthermore, the pulse-width-modulated energization of multi-phase systems of the group and the sampling coordinated therewith are carried out with a time offset with regard to one another. The time offset which exists in each case between the pulse-width-modulated energizing of various multi-phase systems of the relevant group and between the sampling of various multi-phase systems of the group or from one multi-phase system to the respective next multi-phase system of the group corresponds to a sampling time period or minimum sampling time period of the current measuring devices. This embodiment may be applied with respect to any energized group of multi-phase systems of the stator.

When sampling multi-phase systems of a group coordinated with their pulse-width-modulated current, average current values may be obtained as actual current values, which allows for precise current control. Due to the above-mentioned fact that only one multi-phase system at a time is simultaneously sampled with the aid of the associated current measuring device, a plurality of or all multi-phase systems of the relevant group are sampled with a time offset with regard to one another, or in other words, in mutually offset time grids, and are also supplied with pulse-width-modulated current. The time offset corresponds to the (minimum) sampling time period of the current measuring devices, wherein a transfer of energy from the stator to the rotor may be achieved that is largely independent of the position of the rotor.

In a further embodiment, in a first operating mode, the periodic sampling of the currents of multi-phase systems of a group is carried out with the aid of the associated current measuring device in a time-coordinated manner with their pulse-width-modulated current, and the pulse-width-modulated current of multi-phase systems of the group and the sampling coordinated therewith are carried out with a time offset with regard to one another. Here, mean current values may be obtained as actual current values, which allows for accurate current control. In a second mode of operation, the pulse-width-modulated energization of multi-phase systems of the group are carried out in a time synchronized manner with regard to one another, and the periodic sampling of currents flowing in the multi-phase systems of the group are carried out with a time offset with regard to one another via the associated current measuring device. This embodiment may be applied with respect to one or to a plurality of energized groups of multi-phase systems of the stator. The time offset present in the first mode of operation and the time offset present in the second mode of operation may correspond to the sampling period of the current measuring devices, respectively.

The first operating mode may be used for the case that an energy transfer from the stator to the rotor is not required or not intended. In contrast, the second operating mode may be used for the purpose of causing inductive energy transfer from the stator to the rotor in a targeted manner. Here, multi-phase systems of a plurality of groups of multi-phase systems may also be operated in the second operating mode in order to energize their multi-phase systems synchronously with one another, or in other words, in a common time grid. In this manner, the ripple currents flowing in the respective multi-phase systems and the alternating magnetic fields induced thereby may be in phase with one another and constructively superimposed so that a relatively large alternating voltage may be induced in the at least one rotor coil of the rotor. As indicated above, the accuracy of current control in the second mode of operation may be somewhat affected. However, since the second mode of operation may be used only for a selective transfer of energy from the stator to the rotor, and thereby for a limited time, such degradation may be neglected.

In a further embodiment, the current control is influenced by an optionally switchable influencing device of the stator in such a way that an amplified ripple current is generated in energized stator conductors of the stator and thus an amplified alternating magnetic field. This may be carried out in such a way that a mean value of a current flowing in energized stator conductors remains unchanged. The amplified alternating magnetic field may induce an enlarged alternating voltage in the at least one rotor coil of the rotor, which allows for effective energy transfer from the stator to the rotor.

A stator for a planar drive system for driving a rotor is proposed. The rotor comprises a magnet device comprising at least one rotor magnet and at least one rotor coil. The stator comprises a plurality of stator conductors. The stator is configured to energize the stator conductors. A magnetic interaction may result between energized stator conductors of the stator and the magnet device of the rotor to drive the rotor. The stator is configured to carry out the energizing of the stator conductors by a current control based on a pulse-width modulation. Due to the current control based on pulse-width modulation, a ripple current in energized stator conductors of the stator and thereby an alternating magnetic field may be generated via which an alternating voltage may be induced in the at least one rotor coil of the rotor.

The same features, details, and embodiments may be applied to the stator, and the same advantages may be considered, as discussed above with respect to the planar drive system and for the present method. For example, the following embodiments are conceivable.

In a possible embodiment, the stator comprises one or a plurality of stator modules. In an embodiment of the stator with a plurality of stator modules, these may be arranged laterally next to one another.

In a further embodiment, the stator conductors of the stator are interconnected to form multi-phase systems which may be supplied with current independently of one another. The stator is configured to carry out a separate current control for each multi-phase system. The stator comprises a number of current measuring devices for performing the current control. The current measuring devices are each connected to a group of a plurality of multi-phase systems. The current measuring devices are configured to periodically sample currents flowing in the multi-phase systems of the respective associated group and to carry out the sampling of the currents only with respect to one of the multi-phase systems simultaneously.

In a further embodiment, the stator is configured to carry out the periodic sampling of the currents of multi-phase systems of a group with the aid of the associated current measuring device in a time-coordinated manner with their pulse-width-modulated energization. The stator is also configured to perform the pulse-width-modulated energization of multi-phase systems of the group and the sampling coordinated therewith with a time offset with regard to one another. The time offset that exists between the pulse-width-modulated energizing of different multi-phase systems of the group and between the sampling of different multi-phase systems of the group or from one multi-phase system to the next multi-phase system of the group corresponds to a sampling time period of the current measuring devices.

In a further embodiment, the stator is, in a first operating mode, configured to perform the periodic sampling of the currents of multi-phase systems of a group with the aid of the associated current measuring device in a time-synchronized manner with their pulse-width-modulated energizing, and to perform the pulse-width-modulated energizing of multi-phase systems of the group and the sampling coordinated therewith with a time offset with regard to one another. The stator is further configured to perform, in a second operating mode, the pulse-width-modulated energizing of multi-phase systems of the group in time synchronism with one another, and the periodic sampling of currents flowing in the multi-phase systems of the group with the aid of the associated current measuring device with a time offset with regard to one another. The time offset present in the first operation mode and the time offset present in the second operation mode may correspond to the sampling period of the current measuring devices, respectively.

In a further embodiment, the stator has an optionally switchable influencing device. The influencing device is configured to influence the current control in such a way that an amplified ripple current may be generated in energized stator conductors or multi-phase systems of the stator and thus an amplified alternating magnetic field. This may be carried out in such a way that a mean value of a current flowing in energized stator conductors remains unchanged.

The embodiments explained above may be used individually or in any combination with one another.

FIG. 1 shows a perspective view of an embodiment of a planar drive system 1, which comprises a stator 5 comprising at least a stator module 10 and a rotor 200. The rotor 200 is movably arranged above the stator 5 and the stator module 10 during operation of the planar drive system 1. The stator module 10 comprises a module housing 18 and a stator assembly 100, which is arranged on a top side of the module housing 18. The stator assembly 100 is configured as a planar stator and comprises a flat or planar stator surface 11. The stator surface 11 extends over the entire top surface of the stator assembly 100 and the stator module 10. The stator assembly 100 comprises a plurality of metallic stator conductors 125 that may be supplied with electrical drive currents. The stator conductors 125 may also be referred to as coil conductors or conductor strips.

Figure 3:
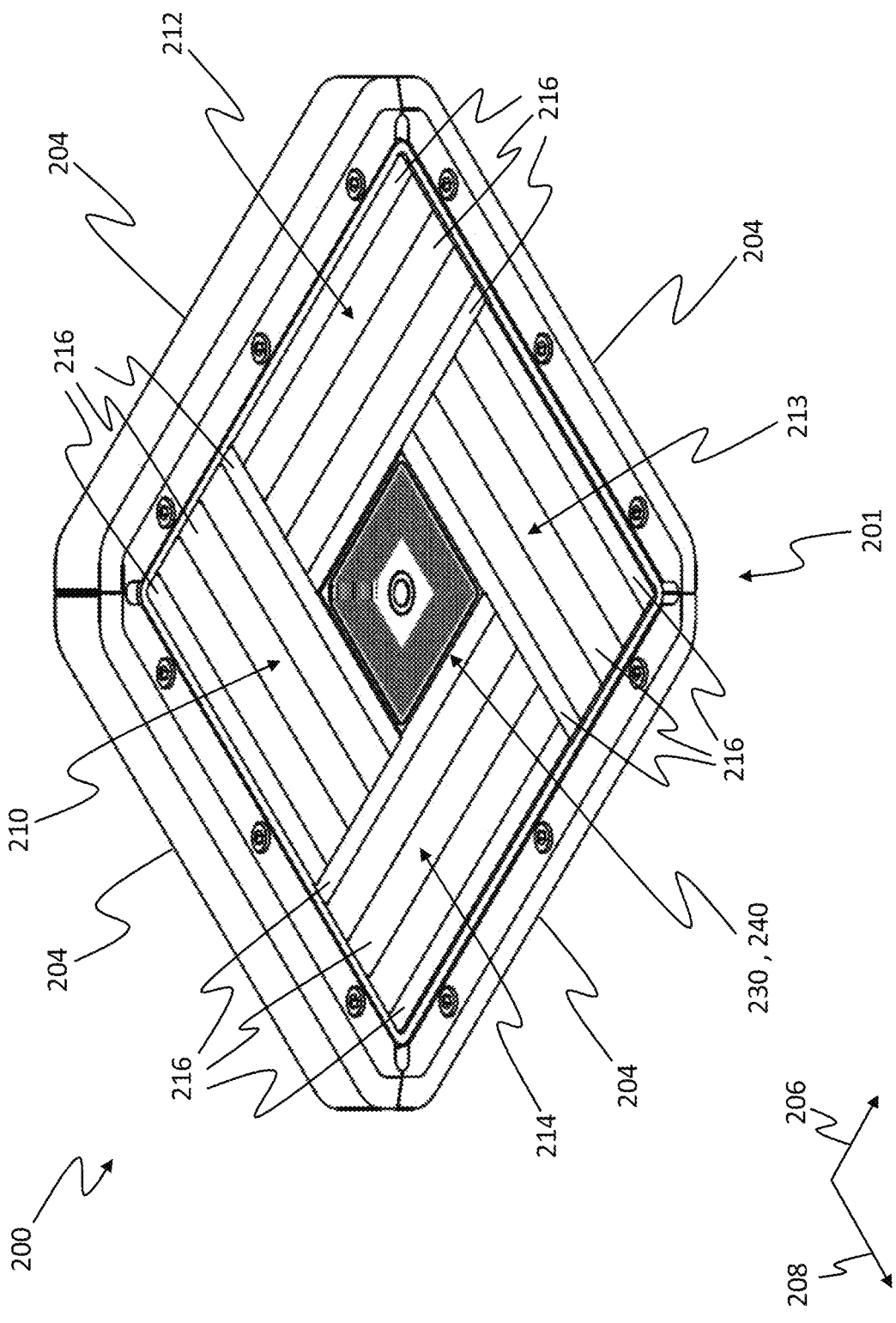
FIG. 3 is a perspective view of the rotor, which has a magnet device and a printed circuit board surrounded by the magnet device.

By energizing stator conductors 125 of the stator module 10, a magnetic field may be generated which may drive the rotor 200 in interaction with a magnet device 201 of the rotor 200 (cf. FIG. 3). The rotor 200 may be held suspended above the stator surface 11 and may also be moved. A movement of the rotor 200 may take place in a first direction 12 as well as in a second direction 14. As shown in FIG. 1, the first and second directions 12, 14 are oriented perpendicularly with regard to each other, and respectively in parallel to the stator surface 11. By moving the rotor 200 in both the first direction 12 and the second direction 14, the rotor 200 may be moved in any direction over the stator surface 11. Moving the rotor 200 is further possible in a third direction 15 oriented perpendicularly with regard to the first direction 12, the second direction 14 and the stator surface 11. In this way, the distance of the rotor 200 to the stator surface 11 may be varied, i.e. the rotor 200 may be raised or lowered above the stator surface 11.

Further electrical and electronic components and devices of the stator module 10 are arranged in the module housing 18. These components serve, among other things, to generate electrical drive currents and thereby to energize stator conductors 125 of the stator module 10. As will be explained in more detail below, the energization is effected by a current control based on pulse-width modulation.

At a lower surface 32 of the module housing 18 opposite to the stator surface 11, connections are provided, which are used to connect the stator module 10 to a plurality of connecting lines 16. The connecting lines 16 may include a power supply line for supplying electrical power to the stator module 10, an input data line, and an output data line. The power supply line may be used to supply electrical power to the stator module 10 to generate drive currents, among other things. Data may be sent to and from the stator module 10 via the input data line and the output data line. In this way, data communication between the stator module 10 and a main controller 500 (cf. FIG. 11) of the planar drive system 1 may be realized. This includes, for example, the transmission of control signals or control data, such as electrical setpoint current values, from the main controller 500 to the stator module 10.

It is clear from FIG. 1 that the module housing 18, the stator assembly 100 and the stator surface 11 are rectangular or square in plan view of the stator surface 11. The stator surface 11 is delimited by four respective straight outer edges 21. Two respective opposing outer edges 21 are oriented in parallel to the first direction 12, and two respective opposing further outer edges 21 are oriented in parallel to the second direction 14. The stator module 10 and the module housing 18 further comprise, between the stator surface 11 and the opposite underside 32, four planar side surfaces 33 which are flush with the outer edges 21 at the stator surface 11.

The stator 5 of the planar drive system 1 may be implemented not only with one stator module 10, but with a plurality of identical examples of the stator module 10 shown in FIG. 1. The plurality of stator modules 10 may be arranged adjacent to one another so that the outer edges 21 and side surfaces 33 of adjacent stator modules 10 are adjacent to one another. In this way, the stator surfaces 11 of the stator modules 10 may form a continuous operating surface over which the rotor 200 may be moved without interruption. This is done by applying an appropriate current to stator conductors 125 of the stator modules 10 and thereby generating a magnetic field that drives the rotor 200.

Figure 2:
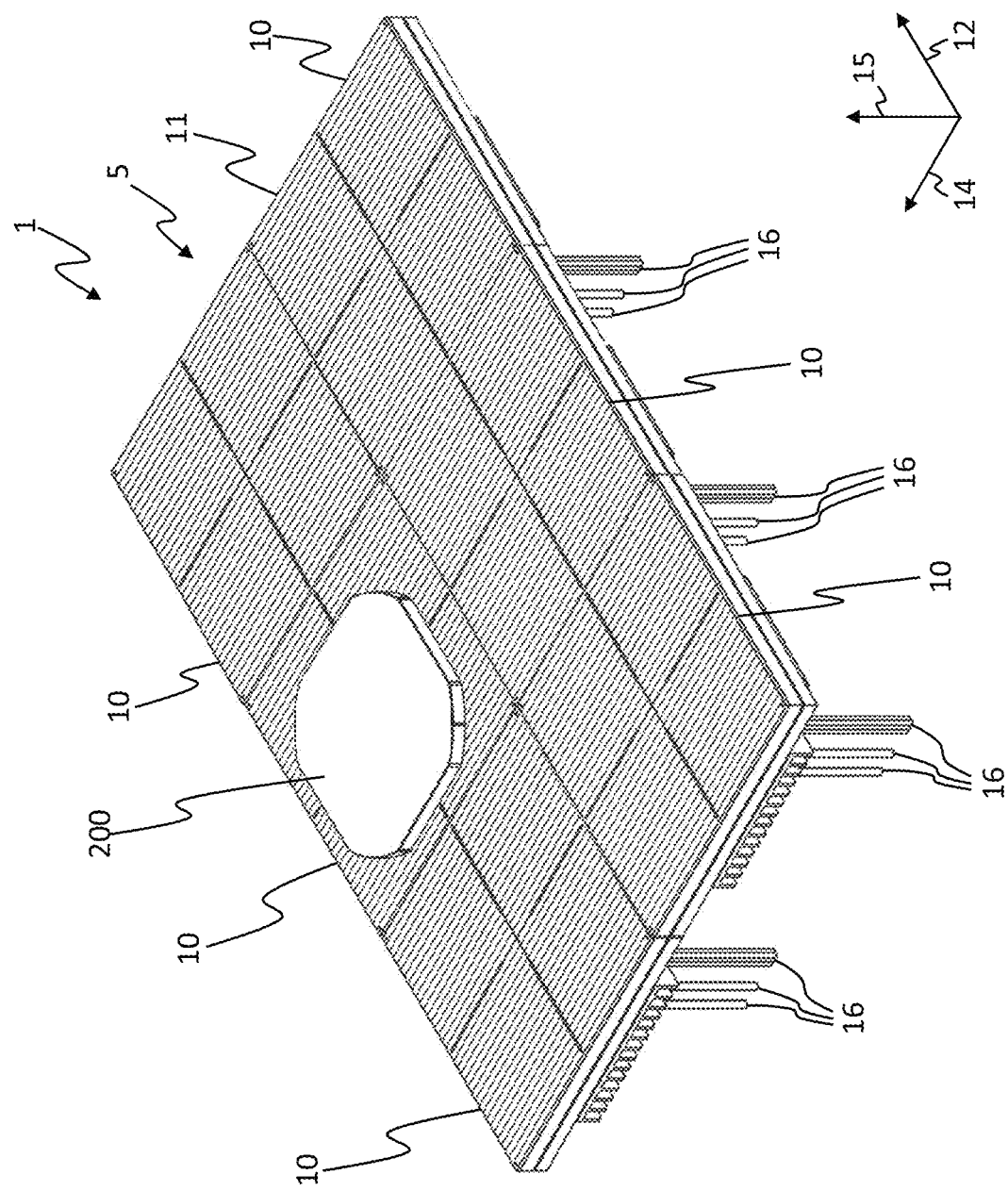
FIG. 2 is a perspective view of the stator with a plurality of stator modules arranged side by side.

By way of illustration, FIG. 2 shows a perspective view of an embodiment of the stator 5 having six stator modules 10 arranged side by side. The stator modules 10 are arranged side by side in two first rows adjacent to each other in the second direction 14 and extending along the first direction 12, and in three second rows or columns adjacent to each other in the first direction 12 and extending along the second direction 14. The stator surfaces 11 of the stator modules 10 form a contiguous and planar operating surface for the rotor 200, and the rotor 200 may be moved seamlessly from the stator surface 11 of one stator module 10 to or across the stator surface 11 of an adjacent stator module 10, respectively.

Apart from the embodiment shown in FIG. 2, other embodiments with other arrangements and/or other numbers of stator modules 10 arranged next to one another may also be considered for the stator 5 of the planar drive system 1. The stator modules 10 may in principle be joined in the first and/or second direction 12, 14 to form a stator 5 of any size.

The above-mentioned power supply and data communication may be implemented in each of the stator modules 10 of the stator 5 via respective dedicated connecting lines 16 of the stator modules 10. Alternative embodiments of the stator modules 10 may further comprise electrical connecting elements via which electrical power and/or data may be transmitted from one stator module 10 to an adjacent stator module 10. Such connecting elements may e.g. be arranged on the side surfaces 33 of the stator modules 10.

FIG. 3 shows an embodiment of the rotor 200 of the planar drive system 1 in a perspective view from below on an underside of the rotor 200. In operation of the planar drive system 1, the underside of the rotor 200 is arranged facing the stator surface 11 of the stator module 10 or of a plurality of stator modules 10 of the stator 5. Also, the rotor 200 or its underside is oriented in parallel or substantially in parallel to the stator surface 11. The rotor 200 comprises a magnet device 201 on the underside. The magnet device 201 has a rectangular or square outer contour, and includes a first magnet assembly 210, a second magnet assembly 212, a third magnet assembly 213, and a fourth magnet assembly 214. The first magnet assembly 210 and the third magnet assembly 213 each comprise elongated rotor magnets 216 arranged side by side in a first rotor direction 206 and extending along a second rotor direction 208 oriented perpendicularly to the first rotor direction 206. The second magnet assembly 212 and the fourth magnet assembly 214 each comprise elongated rotor magnets 216 arranged side-by-side in the second rotor direction 208 and extending along the first rotor direction 206. The rotor magnets 216 are permanent magnets. In operation of the planar drive system 1, the first and third magnet assemblies 210, 213 serve to drive the rotor 200 in the first rotor direction 206. In operation, the second and fourth magnet assemblies 212, 214 serve to drive the rotor 200 in the second rotor direction 208.

The magnet assemblies 210, 212, 213, 214 of the magnet device 201 and their rotor magnets 216 are arranged to surround an area. In the area surrounded by the rotor magnets 216, the rotor 200 according to the embodiment shown in FIG. 3 comprises a first printed circuit board 230 with at least one rotor coil 240. The at least one rotor coil 240, together with the stator conductors 125 of the stator 5, is used for inductive energy transfer from the stator 5 to the rotor 200. As will be discussed in more detail below, the energy transfer is based on the fact that the pulse-width-modulated electrical control of stator conductors 125 generates a ripple current and thereby an alternating magnetic field so that an alternating electrical voltage may be induced in the rotor coil 240. The induced AC voltage may be substantially proportional to the change over time of the magnetic flux passing through the rotor coil 240.

As shown in FIG. 3, the rotor 200 further comprises four spacers 204 surrounding the magnet device 201 and forming lateral outer sides of the rotor 200. When multiple identical rotors 200 are used in the planar drive system 1, the spacers 204 may ensure that a minimum distance is maintained between the magnet devices 201 of the rotors 200 when the spacers 204 of two rotors 200 arranged next to each other are in contact. In this way, it may be avoided that the undersides of the rotors 200 are straightened up from the position parallel to the stator surface 11 by an attractive force between their magnet devices 201 and that the two rotors 200 remain magnetically stuck to each other with their undersides facing each other. The spacers 204 may comprise or be configured of an elastically deformable material.

Figure 4:
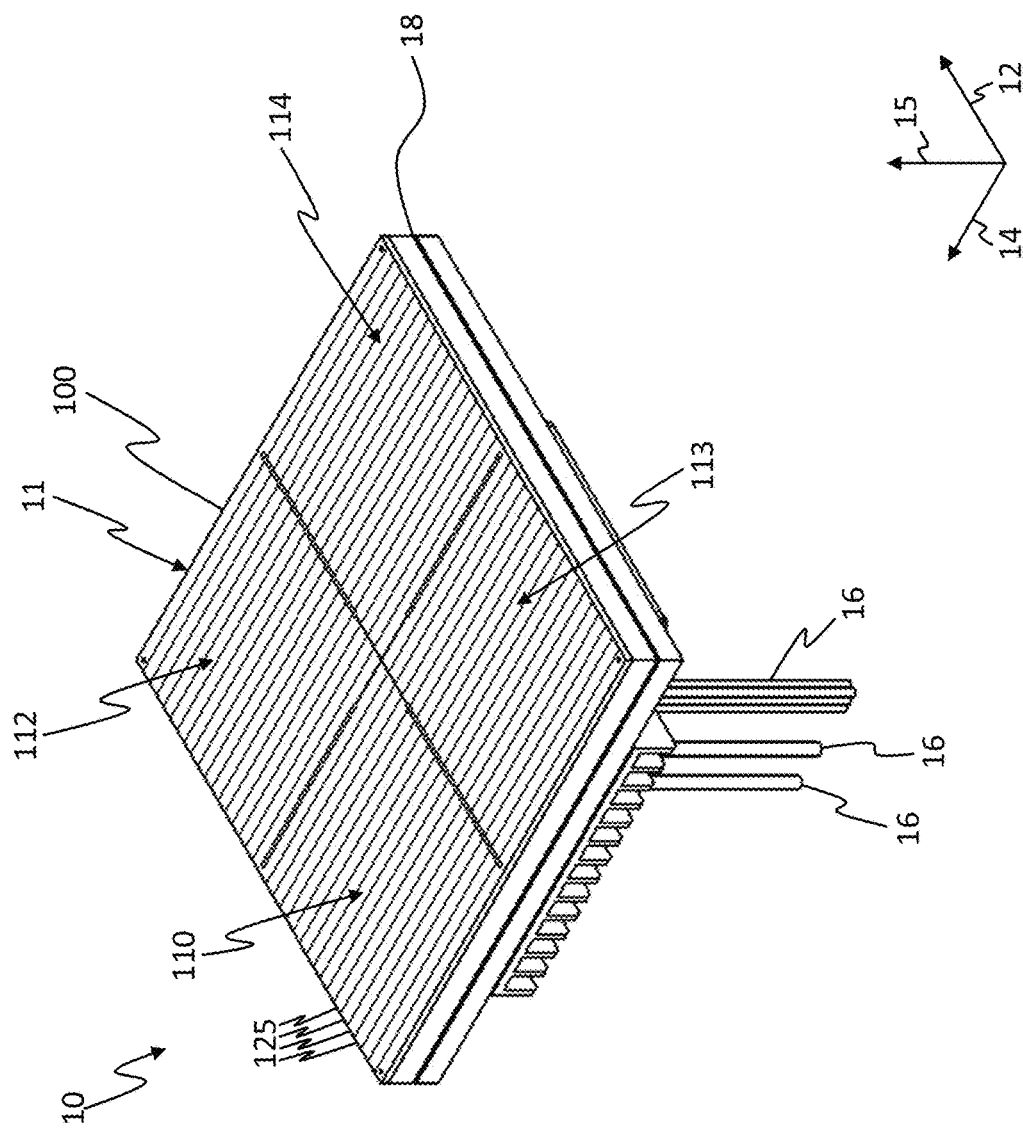
FIG. 4 is a perspective view of the stator module without a rotor.

FIG. 4 shows a perspective view of the stator module 10 without the rotor 200. In an embodiment of the stator 5 with a plurality of stator modules 10, as exemplarily shown in FIG. 2, all stator modules 10 may be of identical or substantially identical design. Therefore, details described above as well as below may be applied with respect to all stator modules 10 of the stator 5.

The stator assembly 100 of the embodiment of the stator module 10 illustrated in FIG. 4 comprises a first stator sector 110, a second stator sector 112, a third stator sector 113, and a fourth stator sector 114. The stator sectors 110, 112, 113, 114 each in turn comprise a portion of respective stator conductors 125 electrically insulated from one another. Each of the stator conductors 125 is entirely arranged within one of the stator sectors 110, 112, 113, 114. The stator sectors 110, 112, 113, 114 are rectangular in shape. The stator sectors 110, 112, 113, 114 may be square in shape such that an extension of the stator sectors 110, 112, 113, 114 in the first direction 12 corresponds to an extension of the stator sectors 110, 112, 113, 114 in the second direction 14. The stator sectors 110, 112, 113, 114 each comprise a quarter of the area, i.e. a quadrant, of the stator assembly 100.

Within the stator sectors 110, 112, 113, 114, the stator conductors 125 may be arranged in a plurality of superimposed stator layers or stator planes, each of the stator layers having only stator conductors 125 extending along either the first direction 12 or the second direction 14. With respect to the orientation and arrangement of the stator conductors 125 and with respect to the stator layers, the stator sectors 110, 112, 113, 114 may have identical or substantially identical structures.

For further illustration, FIG. 5 shows an exploded view of the magnet device 201 of the rotor 200 and the first stator sector 110 with four arranged on top of one another stator layers. Unless differences are described, the second, third and fourth stator sectors 112, 113, 114 are identical in embodiment to the first stator sector 110. According to the embodiment shown in FIG. 5, the first stator sector 110 comprises a first stator layer 104, a second stator layer 106 arranged below the first stator layer 104, and two further stator layers 108 arranged below the second stator layer 106. The first stator layer 104 only comprises stator conductors 125, which are arranged side by side along the first direction 12 and are elongated along the second direction 14. The second stator layer 106 comprises only stator conductors 125, which are arranged side by side along the second direction 14 and elongated along the first direction 12. Correspondingly, a first of the further stator layers 108 disposed below the second stator layer 106 comprises only stator conductors 125 that are elongated along the second direction 14, and a second of the further stator layers 108 disposed below the first of the further stator layers 108 comprises only stator conductors 125 that are elongated along the first direction 12.

The first stator sector 110 may further comprise additional stator layers 108 below the stator layers 104, 106, 108 shown in FIG. 5. Overall, the first stator sector 110 thus comprises alternating first or further stator layers 104, 108 with stator conductors 125 which only extend along the second direction 14, and second or further stator layers 106, 108 with stator conductors 125 which only extend along the first direction 12.

For the stator module 10, apart from the embodiment described with reference to FIG. 5, another embodiment with a different arrangement of stator layers 104, 106, 108 with stator conductors 125 extending in an elongated manner along the first direction 12 and along the second direction 14 may be considered. A possible example is an embodiment in which, as in FIG. 5, the first stator layer 104 with stator conductors 125 extending only along the second direction 14 and, below that, the second stator layer 106 with stator conductors 125 extending only along the first direction 12 is initially provided. In a departure from FIG. 5, the first of the further stator layers 108 disposed below the second stator layer 106 may comprise stator conductors 125 extending only along the first direction 12, and the second of the further stator layers 108 disposed below the first of the further stator layers 108 may comprise stator conductors 125 extending only along the second direction 14. There may be further stator layers 108 therebelow having an orientation of the stator conductors 125 corresponding to and repeating the orientation of the four stator layers 104, 106, 108 described previously.

As shown in FIG. 5, the stator conductors 125 of the first stator sector 110 are combined to stator segments 120, 121 within each of the stator layers 104, 106, 108. In each stator layer 104, 106, 108, the first stator sector 110 comprises three stator segments 120, 121 arranged side by side and adjacent to one another. Each of the stator segments 120, 121 comprises six stator conductors 125 arranged side by side. The first stator sector 110 comprises three first stator segments 120 in the first stator layer 104 and three second stator segments 121 in the second stator layer 106. The first stator segments 120 each comprise six stator conductors 125 arranged side by side and extending along the second direction 14. The second stator segments 121 each comprise six adjacent stator conductors 125 extending along the first direction 12. In each of the other stator layers 108, the first stator sector 110 comprises, alternately or in a different order, three first stator segments 120 or three second stator segments 121. The first and second stator segments 120, 121 have identical dimensions except for their orientation.

In operation of the planar drive system 1, the rotor 200 may be oriented over the stator assembly 100 in such a way that the first rotor direction 206 is oriented along the first direction 12 and the second rotor direction 208 is oriented along the second direction 14. Such an orientation is illustrated in FIG. 5. In this context, the first and third magnetic units 210, 213 of the magnet device 201 of the rotor 200 may interact with the magnetic field generated by the stator conductors 125 of the first stator segments 120 to cause the rotor 200 to move along the first direction 12. The second and fourth magnetic units 212, 214 of the magnet device 201 of the rotor 200 may interact with the magnetic field generated by the stator conductors 125 of the second stator segments 121 to cause the rotor 200 to move along the second direction 14.

Alternatively, other than as shown in FIG. 5, the rotor 200 may be oriented such that the first rotor direction 206 is oriented along the second direction 14 and the second rotor direction 208 is oriented along the first direction 12. Here, the first and third magnetic units 210, 213 may interact with the magnetic field of the second stator segments 121 for driving the rotor 200 in the second direction 14, and the second and fourth magnetic units 212, 214 may interact with the magnetic field of the first stator segments 120 for driving the rotor 200 in the first direction 12.

Figure 6:
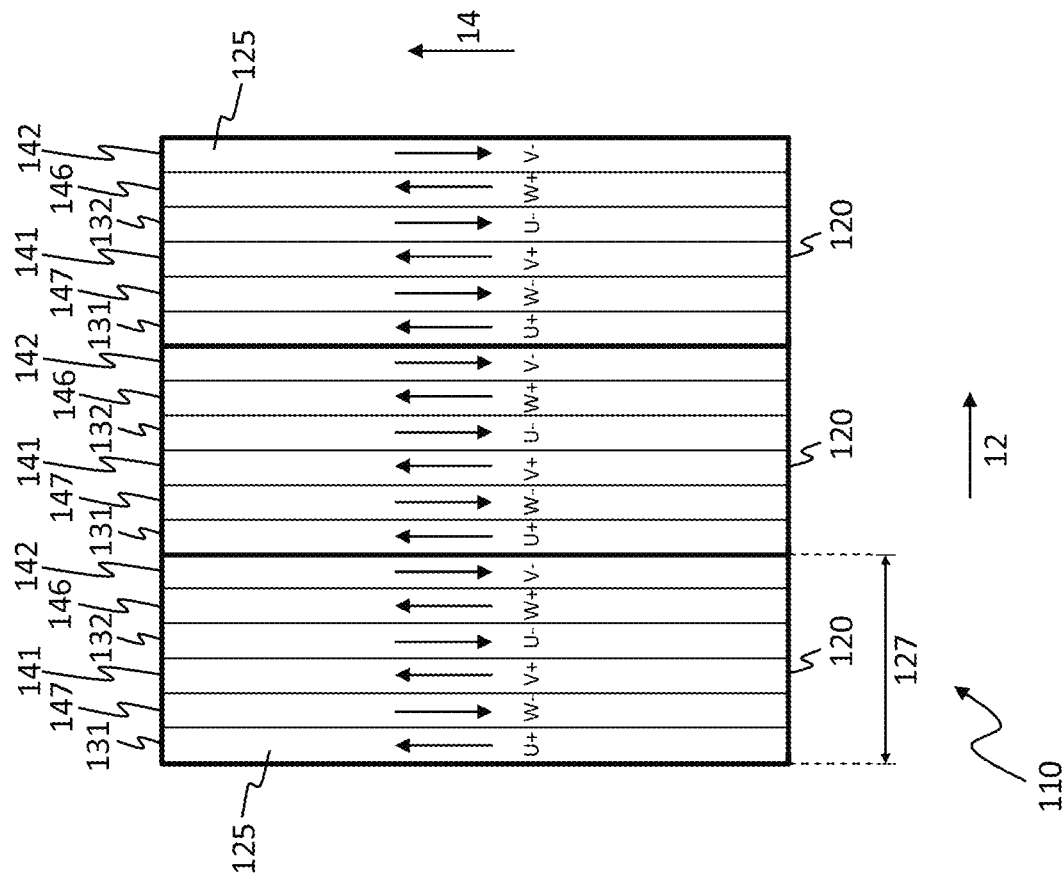
FIGS. 6 and 7 show top views of stator layers of the stator module.
Figure 7:
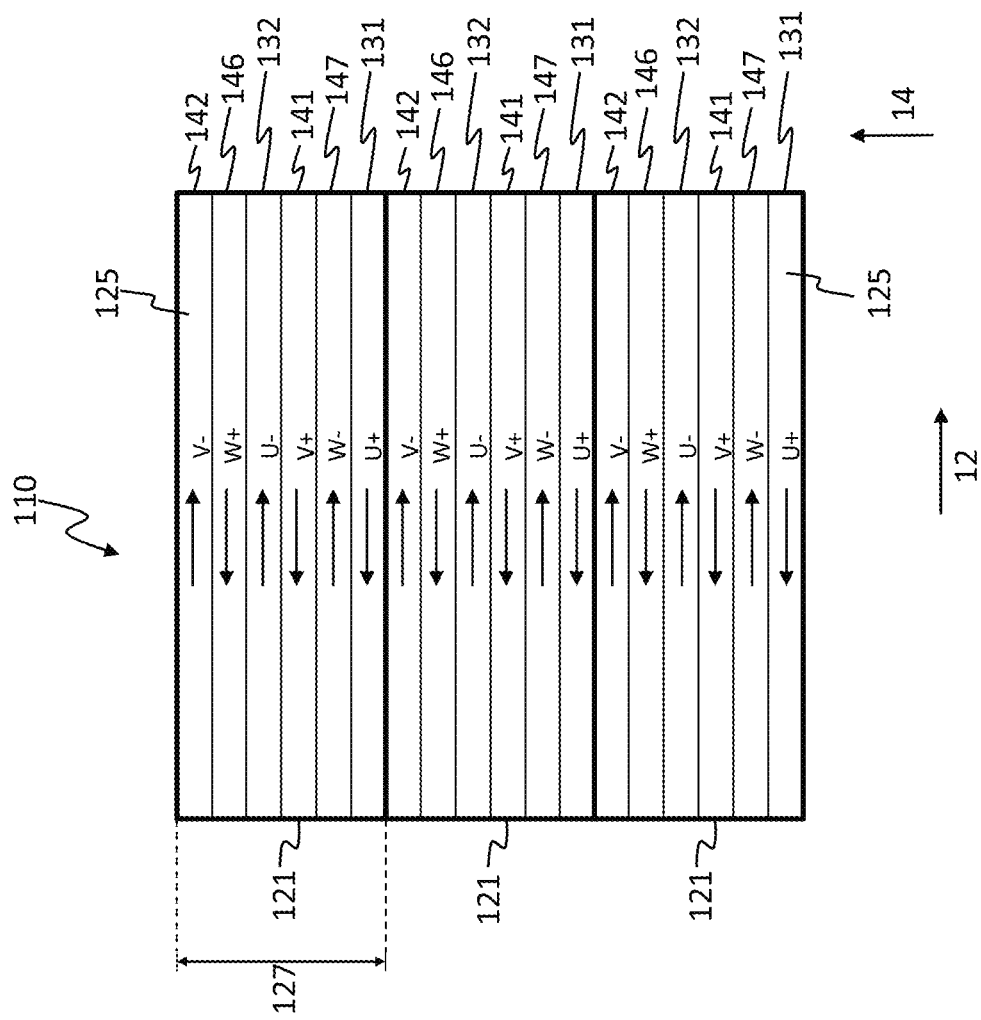

FIG. 6 shows a top view of the first stator segments 120 of the first stator sector 110. A corresponding top view of the second stator segments 121 of the first stator sector 110 is illustrated in FIG. 7. Unless differences are described, the second, third and fourth stator sectors 112, 113, 114 are identical in structure to the first stator sector 110. According to the embodiment shown in FIGS. 6 and 7, the stator segments 120, 121 have a segment width 127 which may e.g. be 40 mm. The stator conductors 125 of each of the individual stator segments 120, 121 of a respective stator layer 104, 106, 108 may each be energized with drive currents independently of the stator conductors 125 of the remaining stator segments 120, 121 of the respective stator layer 104, 106, 108. Therefore, drive currents in one of the stator segments 120, 121 do not necessarily depend on drive currents in another of the stator segments 120, 121. Furthermore, the stator conductors 125 of one of the stator segments 120, 121 may be energized with drive currents while the stator conductors 125 of another, e.g. an adjacent stator segment 120, 121, are de-energized.

The stator conductors 125 of the individual stator segments 120, 121 are each connected to form independently energizable three-phase coil systems, hereinafter also referred to as three-phase systems 150, with a common star point 157 (cf. FIGS. 8 and 9). The three-phase systems 150 may be supplied with a three-phase electrical drive current during operation of the planar drive system 1. In this context, a first phase U, a second phase V and a third phase W of the drive currents may each have a phase offset of 120° with regard to one another.

FIGS. 6 and 7 show a possible distribution of the phases U, V, W to the stator conductors 125 of the first and second stator segments 120, 121. The stator segments 120, 121 each have a first forward conductor 131 and a first return conductor 132 for the first phases U of the drive currents, a second forward conductor 141 and a second return conductor 142 for the second phases V of the drive currents, and a third forward conductor 146 and a third return conductor 147 for the third phases W of the drive currents. Since the individual stator segments 120, 121 may each be energized independently of one another, the drive currents applied to the individual stator segments 120, 121 may be different. In particular, the individual first phases U which may be applied to the various stator segments 120, 121 may be different in each case. In addition, the individual second phases V, to which the various stator segments 120, 121 may be subjected, and the individual third phases W, to which the various stator segments 120, 121 may be subjected, may be different in each case.

Phases U, V and W may each be fed to the forward conductors 131, 141, 146 on a first side of the stator segments 120, 121 and to the return conductors 132, 142, 147 on an opposite second side of the stator segments 120, 121. In addition, phases U, V, and W may be coupled out of the forward conductors 131, 141, 146 on the second side of the stator segments 120, 121, respectively, and out of the return conductors 132, 142, 147 on the first side of the stator segments 120, 121, respectively.

The first forward and return conductors 131, 132 of first stator segments 120 arranged one on top of the other on a plurality of first and further stator layers 104, 108 may each be serially connected. Similarly, the second forward and return conductors 141, 142 and the third forward and return conductors 146, 147 of first stator segments 120 arranged one on top of the other on a plurality of first and further stator layers 104, 108 may each be serially connected. In this case, the phases U, V, W may each be coupled into the forward conductors 131, 141, 146 of one of the first stator segments 120 on one of the first and further stator layers 104, 108, then each of the forward and return conductors 131, 141, 146, 132, 142, 147 associated with the respective phase U, V, W may be passed through on all first and further stator layers 104, 108 of the respective first stator segment 120 and finally be brought together in a star point 157 (cf. FIG. 8). Analogously to the first stator segments 120, the first forward and return conductors 131, 132, the second forward and return conductors 141, 142 and the third forward and return conductors 146, 147 of second stator segments 121 arranged one on top of the other on a plurality of second and further stator layers 106, 108 may also be connected in series and brought together in a star point 157 (cf. FIG. 9).

Figure 8:
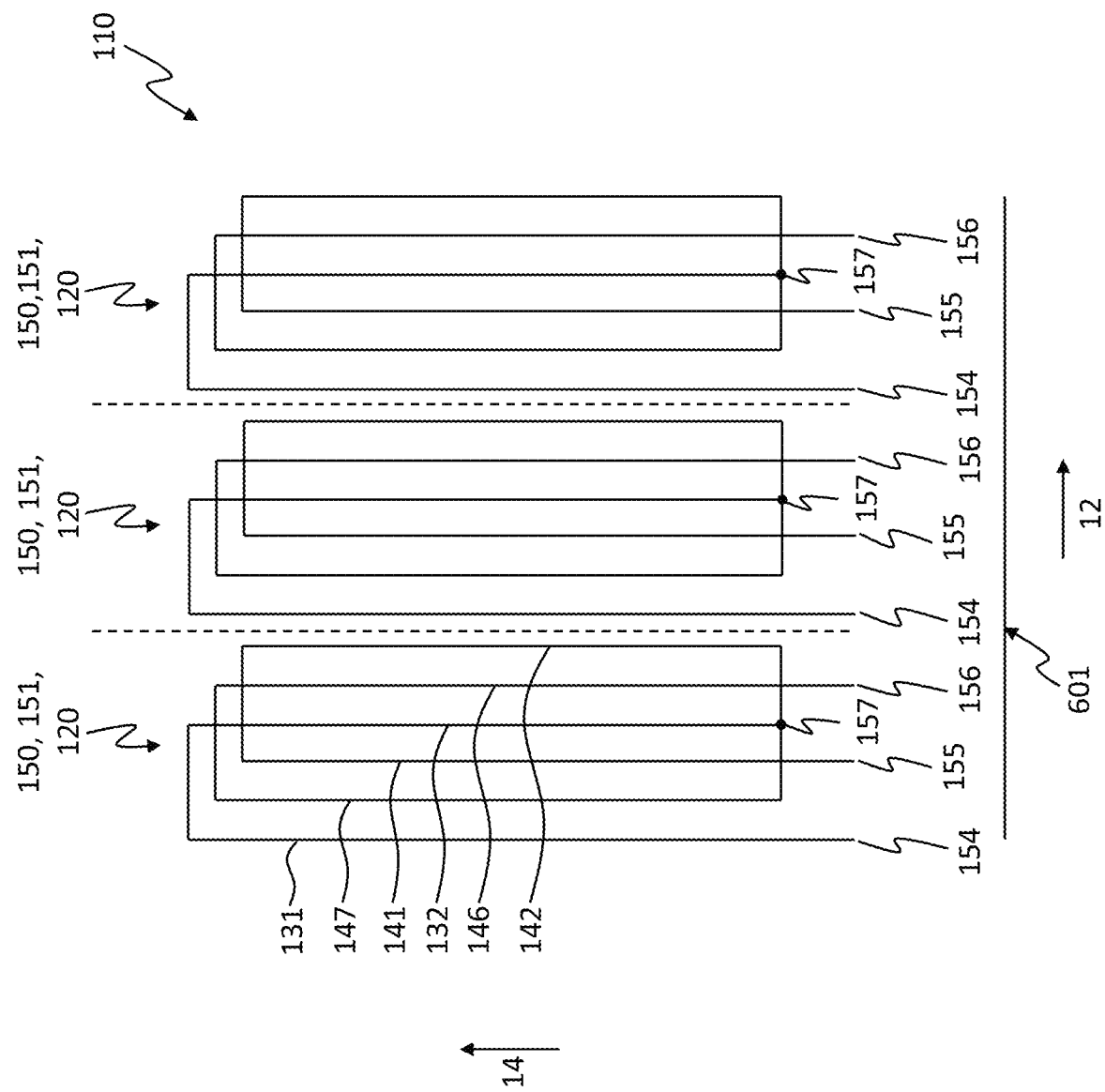
FIGS. 8 and 9 depict equivalent circuit diagrams of three-phase coil systems of the stator module.

FIG. 8 shows an equivalent circuit diagram of the first stator segments 120 of the first stator sector 110, which may be considered for the above-described embodiment. In the equivalent circuit diagram shown in FIG. 8, all superimposed and series-connected stator conductors 125 of the first stator segments 120 are shown as a single conductor. The depicted first forward conductor 131 comprises all of the superimposed and series-connected forward conductors 131 of the first stator segments 120 in various first and further stator layers 104, 108, and the depicted first return conductor 132 comprises all of the superimposed and series-connected first return conductors 132 of the first stator segments 120 in various first and further stator layers 104, 108. Similarly, the illustrated second return conductor 141, second return conductor 142, third return conductor 146, and third return conductor 147 each comprise all of the second return conductor 141, second return conductor 142, third return conductor 146, and third return conductor 147 of the first stator segments 120 that are arranged one on top of the other and connected in series in various first and further stator layers 104, 108.

As shown in FIG. 8, the stator conductors 125 or the forward and return conductors 131, 132, 141, 142, 146, 147 of the individual first stator segments 120 are each connected to form three-phase systems 150. With reference to the first stator segments 120, these are also referred to as first three-phase systems 151. A first connecting point 154 for feeding the first phases U, a second connecting point 155 for feeding the second phases V and a third connecting point 156 for feeding the third phases W are each arranged on a first side 601 of the individual first stator segments 120 oriented along the first direction 12. The first connecting point 154 may be connected to a first forward conductor 131 arranged in one of the first or further stator layers 104, 108. The second connecting point 155 may be connected to a second forward conductor 141 arranged in one of the first or further stator layers 104, 108. The third connecting point 156 may be connected to a third forward conductor 146 arranged in one of the first or further stator layers 104, 108. In addition, a star point 157 is arranged on the first side 601 of each of the first stator segments 120. In each of the star points 157, a first return conductor 132 of one of the first or further stator layers 104, 108, a second return conductor 142 of one of the first or further stator layers 104, 108, and a third return conductor 147 of one of the first or further stator layers 104, 108 may be connected to one another.

Figure 9:
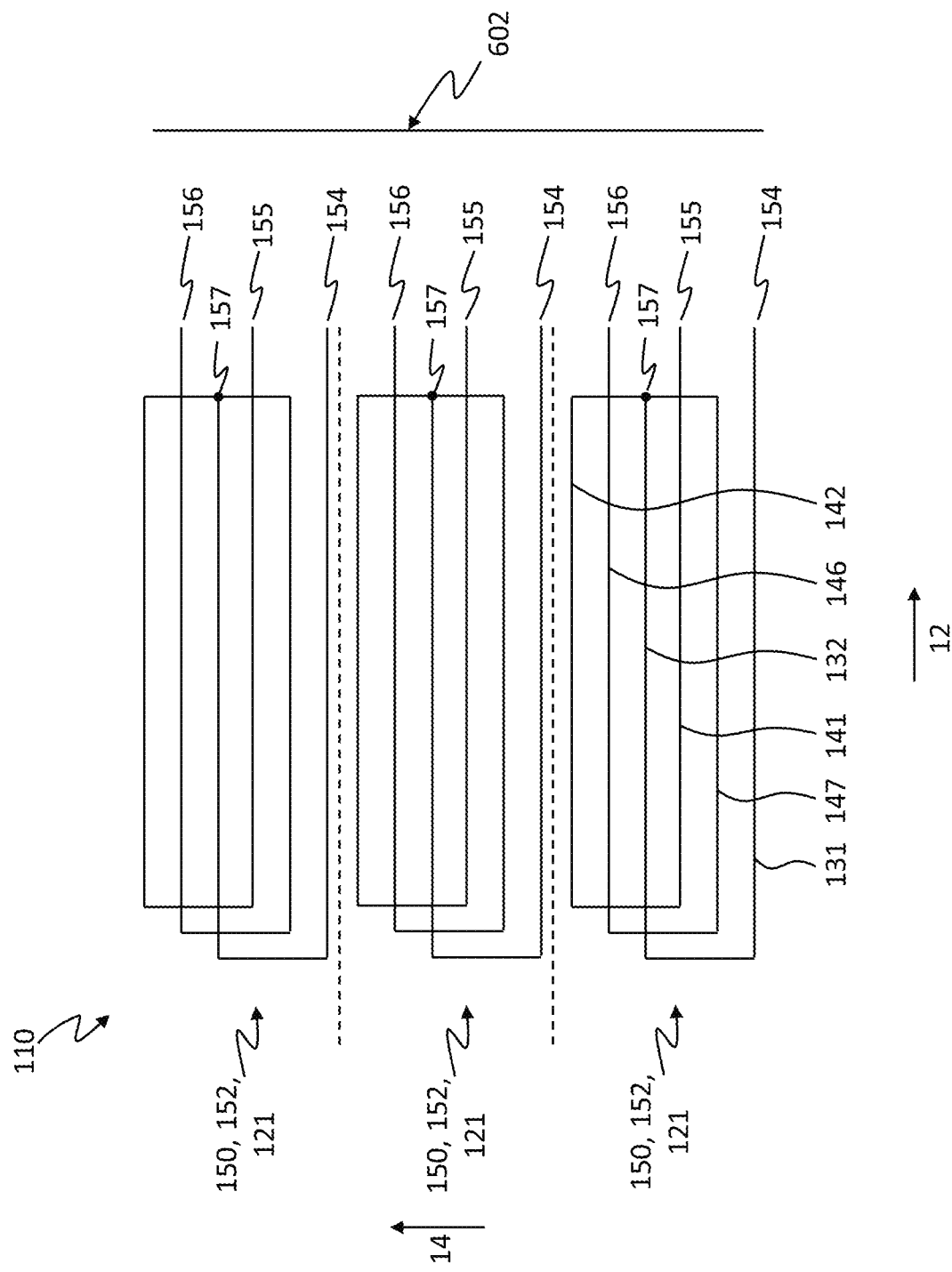

FIG. 9 shows an equivalent circuit diagram of the second stator segments 121 of the first stator sector 110, which may be considered for the embodiment described above. In the equivalent circuit diagram shown in FIG. 9, as in the equivalent circuit diagram of the first stator segments 120 shown in FIG. 8, all stator conductors 125 of the second stator segments 121, which are arranged one on top of the other and connected in series, are shown as a single conductor. The stator conductors 125 or the forward and return conductors 131, 132, 141, 142, 146, 147 of the second stator segments 121 are each connected to form three-phase systems 150. With reference to the second stator segments 121, these are also referred to as second three-phase systems 152. A first connecting point 154 for feeding the first phases U, a second connecting point 155 for feeding the second phases V and a third connecting point 156 for feeding the third phases W are each arranged at a second side 602 of the second stator segments 121 oriented along the second direction 14. The first connecting point 154 may be connected to a first forward conductor 131 arranged in one of the second or further stator layers 106, 108. The second connecting point 155 may be connected to a second forward conductor 141 arranged in one of the second or further stator layers 106, 108. The third connecting point 156 may be connected to a third forward conductor 146 arranged in one of the second or further stator layers 106, 108. In addition, a star point 157 is arranged on the second side 602 of each of the second stator segments 121. At each of the star points 157, a first return conductor 132 of one of the second or further stator layers 106, 108, a second return conductor 142 of one of the second or further stator layers 106, 108, and a third return conductor 147 of one of the second or further stator layers 106, 108 may be interconnected.

Based on the embodiment of the first stator sector 110 shown in FIGS. 8 and 9, it is clear that the first three-phase systems 151 representing the first stator segments 120 and the second three-phase systems 152 representing the second stator segments 121 of the first stator sector 110 are arranged in a manner rotated by 90° with respect to each other. The first stator sector 110 comprises three first three-phase systems 151 and three second three-phase systems 152, and the magnetic field generated by the first three-phase systems 151 may provide for movement of the rotor 200 along the first direction 12. The magnetic field generated by the second three-phase systems 152 may provide for movement of the rotor 200 along the second direction 14. This embodiment correspondingly applies to the second, third, and fourth stator sectors 112, 113, 114.

Consequently, the stator assembly 100 of the stator module 10 illustrated in FIG. 4 comprises twelve first three-phase systems 151 and twelve second three-phase systems 152, and thus a total of twenty-four three-phase systems 150. The stator assembly 100 may be realized in the form of a multi-layer printed circuit board, the stator layers 104, 106, 108 each being arranged in different layers of the printed circuit board. In order to achieve an interconnection of the forward and return conductors 131, 141, 146, 132, 142, 147 according to the equivalent circuit diagrams shown in FIGS. 8 and 9, the stator assembly 100 may comprise electrical connecting structures, such as horizontal connecting structures and vertical connecting structures.

By suitably energizing three-phase systems 150 of the one or at least one stator module 10 of the stator 5, the rotor 200 may be driven as indicated above. Here, a part of the three-phase systems 150 may be energized simultaneously. This applies to three-phase systems 150 which are located in the area of the rotor 200. In this context, the one or each stator module 10 of the stator 5 may have position sensors, such as Hall sensors, via which the current position of the rotor 200 may be detected. In an embodiment of the stator 5 with a plurality of stator modules 10, as shown for example in FIG. 2, a part of the three-phase systems 150 of one or more adjacent stator modules 10 may be electrically controlled simultaneously in a corresponding manner in order to drive the rotor 200.

Figure 10:
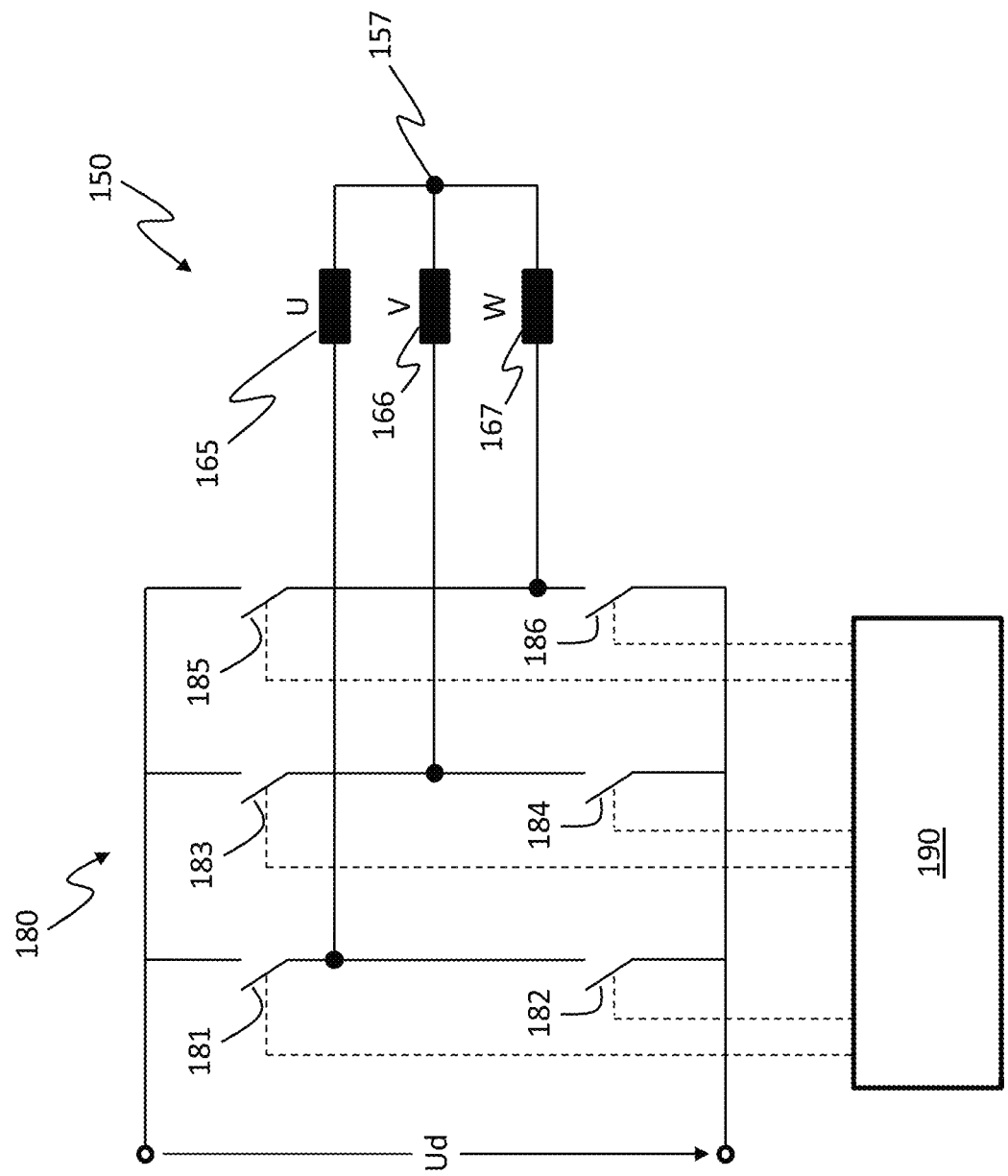
FIG. 10 shows an interconnection of a coil system with an output stage device.

Energizing of three-phase systems 150 of the one or of each stator module 10 of the stator 5 is carried out, as has been indicated above, by current control based on pulse-width modulation. As shown in FIG. 10 with reference to a single three-phase system 150 of a stator module 10, an output stage device 180 of the stator module 10 associated with and connected to the three-phase system 150 may be used for this purpose, among other things. In the present case, the three-phase system 150 comprises a first coil 165, a second coil 166 and a third coil 167, which are interconnected in a common star point 157. With reference to the equivalent circuit diagrams shown in FIGS. 8 and 9, the first coil 165 may comprise first forward and return conductors 131, 132, the second coil 166 may comprise second forward and return conductors 141, 142, and the third coil 167 may comprise third forward and return conductors 146, 147. In operation, the first coil 165 may be used to energize the first phase U of a three-phase drive current, and the second coil 166 may be used to energize the second phase V and the third coil 167 may be used to energize the third phase W of the drive current.

According to the embodiment shown in FIG. 10, the output stage device 180 is connected to an electrical DC link voltage Ud of a DC link or DC link memory of the relevant stator module 10. In the present embodiment, the output stage device 180 comprises a first switch 181, a second switch 182, a third switch 183, a fourth switch 184, a fifth switch 185, and a sixth switch 186. The first and second switches 181, 182 are connected to the first coil 165 and may form a first output stage associated with the first coil 165. The third and fourth switches 183, 184 are connected to the second coil 166 and may form a second output stage associated with the second coil 166. The fifth and sixth switches 185, 186 are connected to the third coil 167 and may form a third output stage associated with the third coil 167.

The output stage device 180 shown in FIG. 10 comprising the switches 181, 182, 183, 184, 185, 186 may be configured in the form of a driver circuit with three half bridges. In this embodiment, the switches 181, 182, 183, 184, 185, 186 may be implemented in the form of transistors.

In operation, deviating from the illustration in FIG. 10, one of the two first and second switches 181, 182 is closed in each case, and the other of the two first and second switches 181, 182 is open in each case. Correspondingly, one of the two third and fourth switches 183, 184 and one of the two fifth and sixth switches 185, 186 are open, respectively, and the other of the two third and fourth switches 183, 184 and the other of the two fifth and sixth switches 185, 186 are closed, respectively. Depending on the switching states of the switches 181, 182, 183, 184, 185, 186 of the output stage device 180, electrical voltages or voltage pulses with a voltage amount equal to the supply voltage Ud or a reference or ground potential may be applied to the coils 165, 166, 167 of the three-phase system 150.

In FIG. 10, it is indicated that the output stage device 180 is connected to a module controller 190 of the associated stator module 10. In operation, a pulse-width-modulated periodic control of the output stage device 180 or of its switches 181, 182, 183, 184, 185, 186 may be effected via the module controller 190. In this way, the coils 165, 166, 167 of the three-phase system 150 may be supplied with pulse-width-modulated periodic voltage pulses at the level of the DC link voltage Ud and thereby be appropriately energized.

Figure 11:
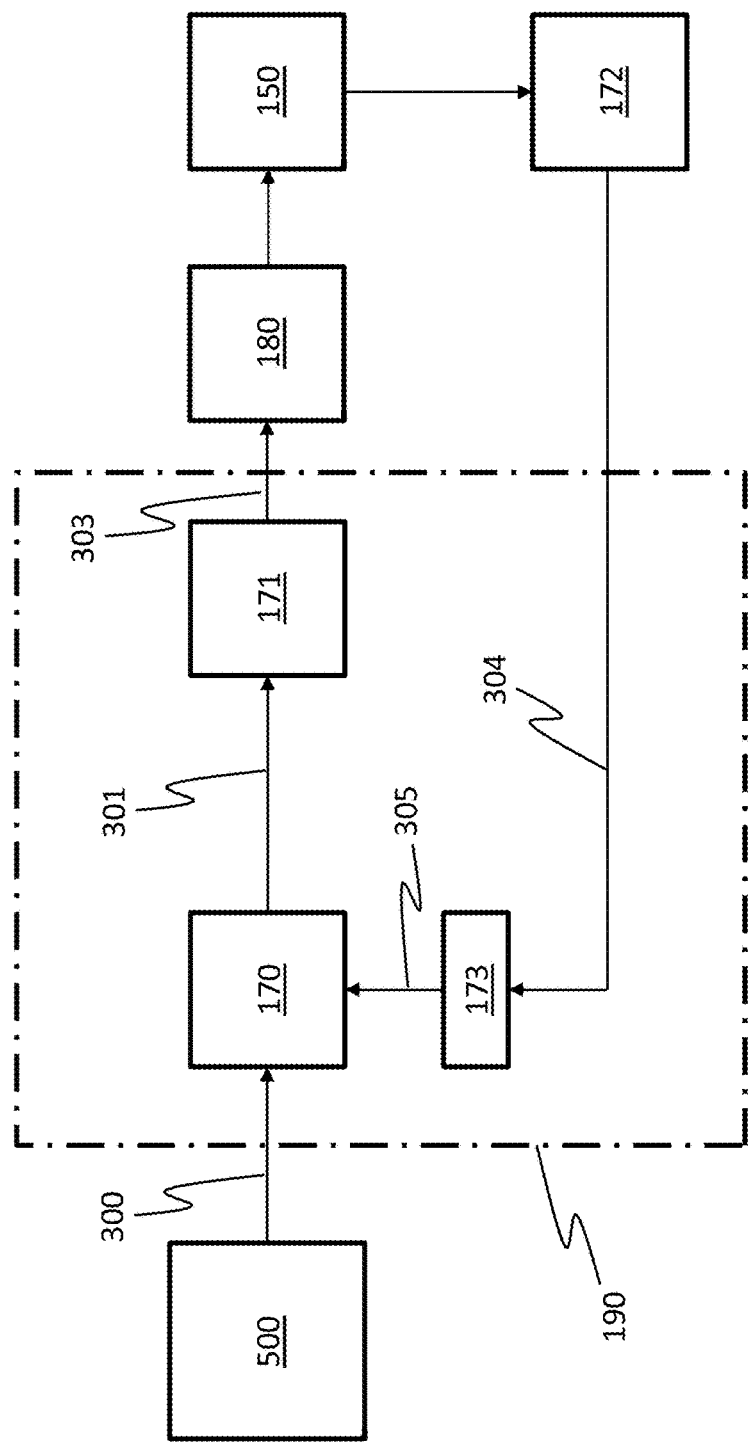
FIG. 11 shows a control loop for current control of a coil system based on pulse-width modulation.

For further illustration, FIG. 11 shows a block diagram of a control loop for current control of a three-phase system 150 of a stator module 10 based on pulse-width modulation, as may be applied to the planar drive system 1. The control loop shown in FIG. 11 comprises an external main controller 500 of the planar drive system 1, a module controller 190, an output stage device 180, a three-phase system 150, and a current measuring device 172. The module controller 190, the output stage device 180, the three-phase system 150, and the current measuring device 172 are components of a stator module 10 of the stator 5 of the planar drive system 1. With reference to the stator module 10 shown in FIG. 4, the module controller 190, the output stage device 180 and the current measuring device 172 may be integrated in the module housing 18.

The module controller 190 shown in FIG. 11 comprises a current controller 170, a PWM signal generating device 171, and a processing device 173. The module controller 190 may be implemented in the form of an FPGA.

The electrical current measuring device 172, which may comprise an analog-to-digital converter, and which is suitably connected to the three-phase system 150, is configured to detect actual current values of the three-phase system 150. This may be carried out by periodic sampling at predetermined times. During current measuring, only the currents of two of the three coils of the three-phase system 150 may be sampled. This is because the currents flowing in the two sampled coils may be used to infer the current flowing in the non-sampled coil. This is due to the star connection of the coils of the three-phase system 150.

As shown in the control loop of FIG. 11, during operation of the planar drive system 1, target current values 300 are generated by the main controller 500 and transmitted to the current controller 170. Furthermore, actual current values 304 obtained from the current measuring device 172 by sampling at the three-phase system 150 are forwarded to the processing device 173, which processes them, and as a result, processed actual current values 305 are transmitted to the current controller 170. The processed actual current values 305 may relate to a two-phase reference system (d/q system). In this sense, a coordinate transformation, i.e., a Clarke Park transformation, may be carried out during processing by the processing device 173. In this context, the actual current values 304 relating to the three-phase system 150 may be transformed into the processed actual current values 305 relating to the two-phase reference system. The reference current values 300 generated by the main controller 500 and forwarded to the current controller 170 may also be related to the two-phase reference system.

Based on the target current values 300 and the processed actual current values 305, control signals 301 are generated by the current controller 170 and transmitted to the PWM signal generating device 171. The control signals 301, which may also be based on the two-phase reference system, may be reference voltage signals or may reproduce such voltage signals. Based thereon, pulse-width-modulated control signals 303 are generated by the PWM signal generating device 171, which are applied to the output stages or switches of the output stage device 180. In other words, the control signals 301 output by the current controller 170 are converted into the pulse-width-modulated control signals 303 by the PWM signal generating device 171. During the conversion by the PWM signal generating device 171, another coordinate transformation, i.e., an inverse Clarke Park transformation, may be carried out. In this context, the control signals 301 originating from the current controller 170 and relating to the two-phase reference system may be transformed into the control signals 303 relating to the three-phase system 150 and further pulse-width-modulated. Based on the pulse-width-modulated control signals 303, pulse-width-modulated clocked voltage pulses may be applied to the three-phase system 150 or its coils via the output stage device 180, wherein corresponding drive currents may flow therein.

As indicated above, the one or each stator module 10 of the stator 5 comprises twenty-four three-phase systems 150. In this context, the one or each stator module 10 is configured to perform a current control of its own for each of the associated three-phase systems 150, and in this respect a current control independent of other three-phase systems 150, in accordance with the control loop shown in FIG. 11. Therefore, for each associated three-phase system 150, the one or each stator module 10 comprises a current controller 170, a PWM signal generating device 171, a processing device 173 and an output stage device 180. Consequently, twenty-four current controllers 170, twenty-four PWM signal generating devices 171, and twenty-four processing devices 173 are provided per stator module 10, which are integrated into the associated module controller 190, and twenty-four output stage devices 180.

Figure 12:
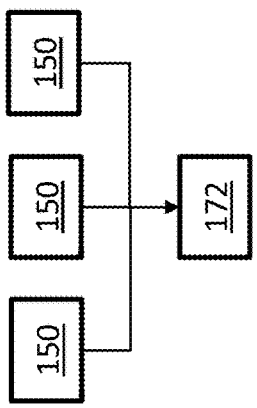
FIG. 12 is an arrangement comprising a current measuring device connected to three coil systems.

With respect to current measuring, on the other hand, the following embodiment is provided in order to keep hardware requirements low. In this context, the one or each stator module 10 of the stator 5 has a plurality of current measuring devices 172, each of which is connected to a group of three three-phase systems 150, and is thereby assigned to a respective such group of three three-phase systems 150 for current sampling. FIG. 12 illustrates this embodiment for a current measuring device 172. The current measuring devices 172 are further configured to carry out the periodic sampling of the electric currents only with respect to one of the associated three-phase systems 150 simultaneously.

With respect to the above implementation with twenty-four three-phase systems 150, the one or each stator module 10 of the stator 5 comprises eight current measuring devices 172 in a corresponding manner. As explained above with reference to FIGS. 8 and 9, the twenty-four three-phase systems 150 of a stator module 10 comprise twelve first three-phase systems 151 and twelve second three-phase systems 152, wherein the first three-phase systems 151 may cause the rotor 200 to move along the first direction 12, and the second three-phase systems 152 may cause the rotor 200 to move along the second direction 14. In this regard, the one or each stator module 10 may be configured such that a group of three three-phase systems 150, each associated with a current measuring device 172, comprises either only three first three-phase systems 151 or only three second three-phase systems 152.

The main controller 500 of the planar drive system 1 shown in FIG. 11 is suitably connected to a stator module 10 of the stator 5, and in an embodiment of the stator 5 comprising a plurality of stator modules 10 as shown for example in FIG. 2, to the plurality of stator modules 10 to allow for data communication between the main controller 500 and the stator module or modules 10. As described above, appropriate data lines and, in the case of multiple stator modules 10, interconnected stator modules 10 may be used for this purpose. In operation, the main controller 500 may transmit setpoint current values to one or more current controllers 170 of one or more stator modules 10, allowing pulse-width-modulated current to be applied to the associated three-phase systems 150. With reference to generating and transmitting the setpoint current values, the main controller 500 may take into account a current position of the rotor 200. Corresponding position data may be transmitted to the main controller 500 by one or more stator modules 10. Such position data may be obtained using position sensors of the one or of the plurality of stator modules 10, as indicated above.

The main controller 500 may further be configured to define a system clock of the planar drive system 1, according to which the timing of the operation of the planar drive system 1 may be determined. As part of the data communication between the main controller 500 and the one or more stator modules 10 of the stator 5, the system clock may also be transmitted. Based on the system clock, timing parameters of current control such as a pulse-width modulation clock frequency may be specified. The PWM clock frequency may be in the kHz range and may e.g. amount to 64 kHz.

Figure 13:
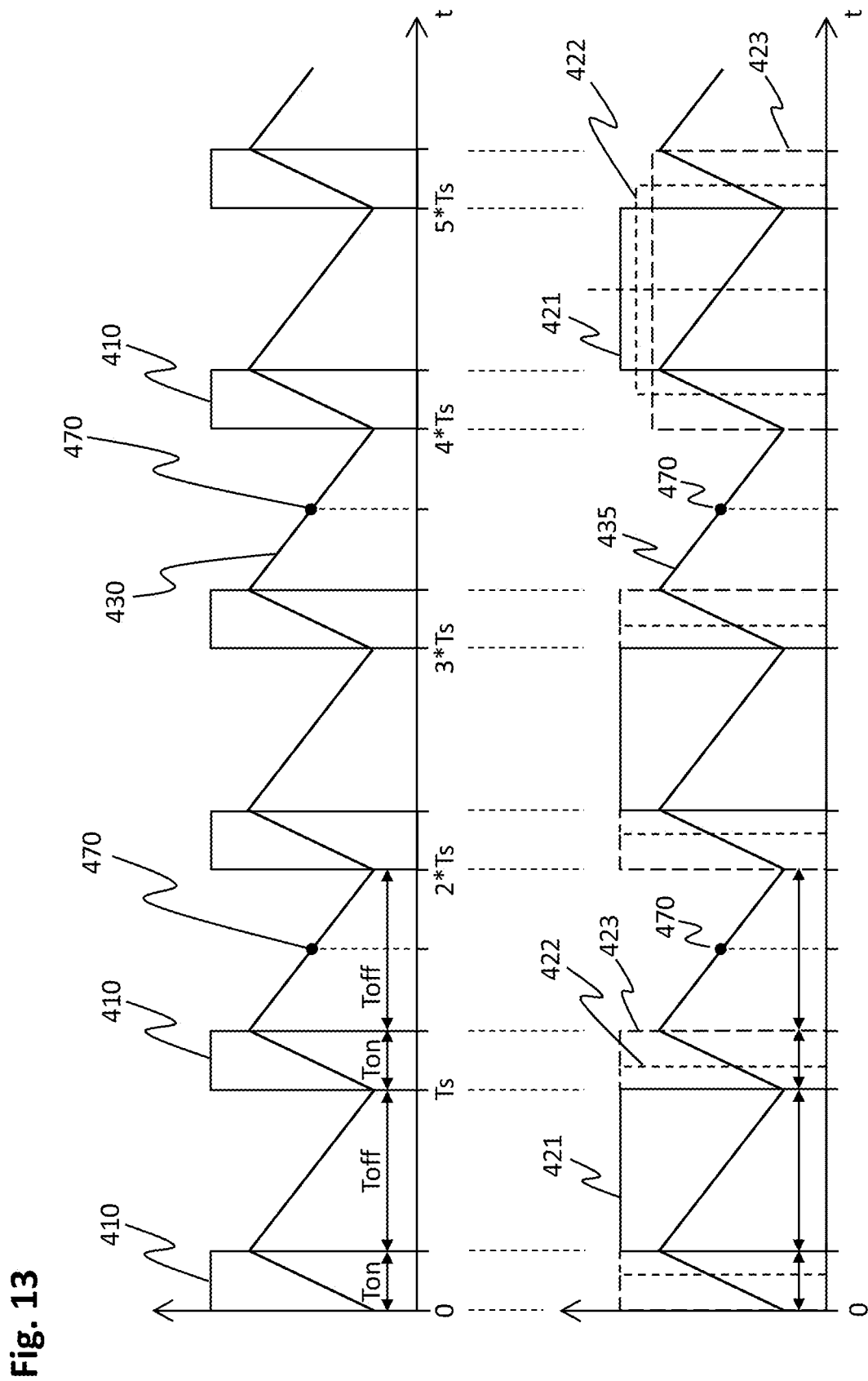
FIG. 13 shows temporal voltage and current curves in pulse-width-modulated energization of a single-phase and a three-phase coil system.

FIG. 13 shows possible electrical voltage and current characteristics as a function of time t, as they may occur with a pulse-width-modulated periodic electrical control of coil systems. The upper diagram of FIG. 13 shows, for simplified illustration, corresponding conditions with a control of a single-phase coil system, which only comprises one coil. The coil system is supplied with an electrical drive voltage specified by the clock frequency of the pulse-width modulation, and thus with periodic first voltage pulses 410. The voltage comprises a nearly rectangular shape with two voltage levels. In addition, a period duration Ts of the pulse-width modulation, as well as a pulse duration Ton and a time-out duration Toff are shown. During the pulse duration Ton, in which voltage is applied to the coil system, a first voltage pulse 410 is present in each case. During the time-out period Toff, no voltage is applied to the coil system.

Due to a smoothing effect of the coil system, the electric current flowing in the coil system follows the first voltage pulses 410 in such a way that a triangular-shaped first current curve 430 is provided. Provided that the first voltage pulses 410 are applied to the coil system, the result is an increase in the current or current amount, and otherwise a decrease. In this way, the current flowing in the coil system oscillates back and forth about a mean value with the clock frequency of the pulse-width modulation and thus the period Ts. The mean value of the current depends on the duty cycle, i.e. the ratio of the pulse duration Ton to the period duration Ts. The current flowing in the coil system thus has an alternating current component, referred to as ripple current, which is associated with the occurrence of a magnetic field that changes over time.

In comparison, the lower diagram of FIG. 13 shows corresponding conditions as they may exist with an electrical control of a three-phase coil system with three coils. This type of control, which is based on center-aligned PWM, may be used in the three-phase systems 150 of the planar drive system 1 and may be realized with the aid of the control loop described above with reference to FIG. 11 and the components described above, such as the output stage devices 180.

As shown in FIG. 13 below, the three-phase coil system is supplied with three drive voltages specified by the clock frequency of the pulse-width modulation, and thus with three periodic voltage pulses 421, 422, 423 with different pulse widths or pulse durations. These are referred to as second voltage pulses 421, third voltage pulses 422, and fourth voltage pulses 423 in the following. The three voltages comprise nearly rectangular curves with two voltage levels. The second voltage pulses 421 may refer to the first phase U, the third voltage pulses 422 to the second phase V and the fourth voltage pulses 423 to the third phase W of a three-phase drive current. Correspondingly, for example, with reference to the three-phase system 150 shown in FIG. 10, it is possible for the first coil 165 to be supplied with the second voltage pulses 421, the second coil 166 to be supplied with the third voltage pulses 422, and the third coil 167 to be supplied with the fourth voltage pulses 423. This may be achieved by switching the switches 181, 182, 183, 184, 185, 186 of the associated output stage device 180 in accordance therewith.

The electrical control is such that a second, third and fourth voltage pulse 421, 422, 423 are centered with regard to each other, and thus the centers of the respective voltage pulses 421, 422, 423 are superimposed. To illustrate this aspect, a second, third and fourth voltage pulse 421, 422, 423 with different pulse heights are shown on the right side of the lower diagram of FIG. 13. The depiction with the different pulse heights only serves to emphasize the centered arrangement of the second, third and fourth voltage pulses 421, 422, 423. This is because second, third and fourth voltage pulses 421, 422, 423 with matching voltage magnitudes are applied to the coils of the three-phase coil system during actuation, as is illustrated for the other second, third and fourth voltage pulses 421, 422, 423 shown in FIG. 13.

The lower diagram of FIG. 13 further shows an electrical second current curve 435 that may occur in one of the three coils of the three-phase coil system supplied with the three drive voltages and thus in the second, third and fourth voltage pulses 421, 422, 423. This may e.g. be the first phase U of the three-phase drive current and, with reference to the three-phase system 150 shown in FIG. 10, the first coil 165. The second current curve 435 also has a triangular shape, due to a smoothing effect of the coil system, and oscillates back and forth about a mean value with the clock frequency of the pulse-width modulation. An increase in the current magnitude occurs when all three drive voltages are not at the same (upper or lower) voltage level. If, on the other hand, the three voltages have the same voltage level, the current amount is reduced. The ripple current provided here also leads to the occurrence of an alternating magnetic field.

For the two other coils of the three-phase coil system, triangular electrical current curves corresponding to the second current curve 435, and which are affected by the ripple current are provided. Here, too, an increase in the amount of current occurs in each case when all three drive voltages are not at the same voltage level, and a decrease in the amount of current occurs otherwise. At least one of the current curves may have an appearance inverse with regard to the second current curve 435, i.e., the current changes occur with an inverse sign relative to the second current curve 435.

In an energized three-phase system 150 of the planar drive system 1, the electric drive currents flowing in the associated coils are similarly superimposed with a ripple current. The occurrence of the ripple current is associated with a time-varying magnetic field. This effect is used in the planar drive system 1 to induce an AC electrical voltage in the at least one rotor coil 240 of the rotor 200, thereby transferring electrical energy from the stator 5 to the rotor 200. The ripple current may be relatively large, i.e., have a relatively large oscillation width. For example, an oscillation width in the single-digit ampere range is possible, e.g. in a range up to 4 A. In a corresponding manner, the alternating magnetic field generated due to the ripple current may have a relatively large oscillation width, thereby allowing for an effective inductive energy transfer from the stator 5 to the rotor 200. The magnitude of the ripple current may depend on the mean value of the current flowing in energized three-phase systems 150.

FIG. 13 shows that the first current curve 430 in the single-phase coil system may be equivalent to the second current curve 435 in the three-phase coil system. Therefore, the upper diagram of FIG. 13 may serve as an equivalence plot for the three-phase coil system, and the first current curve 430 may also refer to one of the three coils of the three-phase coil system. In this aspect, the first voltage pulses 410 may be viewed as effective and current-amount-magnifying substitute pulses for the second, third and fourth voltage pulses 421, 422, 423 actually applied to the three-phase coil system. This relationship is indicated in FIG. 13 by the dashed lines between the upper and lower diagrams. The equivalent diagram of driving a single-phase coil system for driving a three-phase coil system is used in a corresponding manner in figures described below, such as FIGS. 14, 15, 17 and 19.

FIG. 13 also shows current measuring points 470 at which the coil systems may be sampled to obtain actual electrical current values. The periodic sampling is timed to match the pulse-width-modulated periodic energizing in such a way that the current measuring points 470 are located midway between successive first voltage pulses 410 and second, third and fourth voltage pulses 421, 422, 423. In this way, it may be achieved that the actual current values obtained by sampling correspond to the mean value of the respective current (so-called regular sampling method). This procedure allows for accurate current control.

In the lower diagram of FIG. 13, the current measuring times 470 are located between the second, third and fourth voltage pulses 421, 422, 423, respectively. In the upper diagram of FIG. 13, which may be used as an equivalence diagram, the current measuring times 470 are shown in a manner corresponding to the lower diagram. In this way, the current measuring time points 470 are not provided between all of the first voltage pulses 410. However, it is also possible to provide the current measuring times 470 between all first voltage pulses 410 and thus perform one measurement per PWM clock period, as shown for example in FIG. 14.

The current control in the planar drive system 1 according to the control loop shown in FIG. 11 may be carried out in such a way that the three-phase systems 150 to be energized with current are controlled in a pulse-width-modulated manner according to FIG. 13 and thus supplied with current. In this case, pulse-width-modulated control signals 303 are generated using the setpoint current values 300 specified by the main controller 500, which are transmitted to the respective output stage devices 180 (cf. FIG. 11). In this way, voltage pulses with predetermined duty cycles and pulse durations are applied to the three-phase systems 150 to be energized, with the result that they are energized. The mean values of the electric currents flowing in the three-phase systems 150 are based on the setpoint current values 300 specified by the main controller 500. A change in the setpoint current values 300 may cause a change in the pulse-width-modulated control signals 303 and thus in the duty cycles and pulse durations of the voltage pulses, which also causes the mean values of the currents to change. Compared to the superimposed ripple current, such current changes may be much slower or may refer to much longer periods of time. As a result, the current control performed in the planar drive system 1 may also be referred to as direct current control or DC current control (Direct Current), despite the different currents present over larger periods of time.

As explained above with reference to FIG. 12, the one or each stator module 10 of the stator 5 has eight current measuring devices 172, each of which is connected to a group of three three-phase systems 150 and each of which is used to sample current in such a group of three-phase systems 150. The current measuring devices 172 are configured to carry out the sampling of the currents flowing in the associated three-phase systems 150 only with respect to one of the three-phase systems 150 simultaneously.

In this context, the following embodiment may be applied to the planar drive system 1. Here, the one or each stator module 10 of the stator 5 is configured to periodically sample three-phase systems 150 of a group with the aid of the associated current measuring device 172, as described above, in each case in a time-coordinated manner with respect to their pulse-width-modulated current. In this way, average current values may be obtained as actual current values, which makes accurate current control possible. Since only one three-phase system 150 at a time may be simultaneously scanned with the aid of the relevant current measuring device 172, the one or each stator module 10 of the stator 5 is further configured to carry out the pulse-width-modulated energizing of three-phase systems 150 of the group and the sampling coordinated therewith with the aid of the associated current measuring device 172 in each case with a time offset relative to one another, and thus in mutually offset time slots, as explained in more detail below with reference to FIGS. 14 and 15. The time offset exists in each case between the pulse-width-modulated energizing of different three-phase systems 150 of the relevant group and between the sampling of different three-phase systems 150 of the group. This embodiment may be provided with respect to all current measuring devices 172 and associated groups of three-phase systems 150 of the stator 5 of the planar drive system 1.

The pulse-width-modulated energizing of three-phase systems 150 of a stator module 10 having a time offset with regard to one another makes it possible to achieve a relief of the DC link of the stator module 10. This is because the three-phase systems 150 at issue cannot draw current from the DC link at the same time, but are offset with regard to one another, which also allows lower current peaks to occur in the DC link.

In operation of the planar drive system 1, a plurality of three-phase systems 150 may be energized simultaneously to drive the rotor 200. This may be controlled by the main controller 500 by the main controller 500 outputting corresponding setpoint current values 300 for associated current controllers 170 (cf. FIG. 11). It is also possible that a plurality of three-phase systems 150 of different groups, which are thus assigned to different current measuring devices 172 for current sampling, are energized simultaneously. In an embodiment of the stator 5 with a plurality of stator modules 10 (cf. FIG. 2), a plurality of simultaneously energized three-phase systems 150 may also be components of a plurality of adjacent stator modules 10, depending on the position of the rotor 200.

In case of simultaneous energizing of a plurality of three-phase systems 150, the above-mentioned time offset refers in each case to the three-phase systems 150 of a group which are assigned to a current measuring device 172. With reference to different groups of three-phase systems 150 of the stator 5, on the other hand, the mutually offset time rasters may be synchronous, i.e. three-phase systems 150 of different groups as well as, if necessary, of different stator modules 10 may be energized with pulse-width modulation synchronously with regard to one another and sampled synchronously with regard to one another.

Furthermore, when a plurality of three-phase systems 150 are energized simultaneously, the rotor 200 and thus the at least one rotor coil 240 of the rotor 200 used for inductive energy transfer may be located in the area of influence of the plurality of energized three-phase systems 150 and may be exposed to the influence of a resulting alternating magnetic field formed by a superposition of a plurality of alternating magnetic fields, each caused by the ripple currents flowing in the three-phase systems 150. The alternating voltage induced in the rotor coil 240 of the rotor 200 depends on the resulting alternating magnetic field. A pulse-width-modulated energizing of three-phase systems 150 offset in time with respect to one another results in the ripple currents flowing in the three-phase systems 150 and thus the temporal curve of the alternating magnetic fields induced thereby being offset in time with respect to one another or out of phase.

Figure 14:
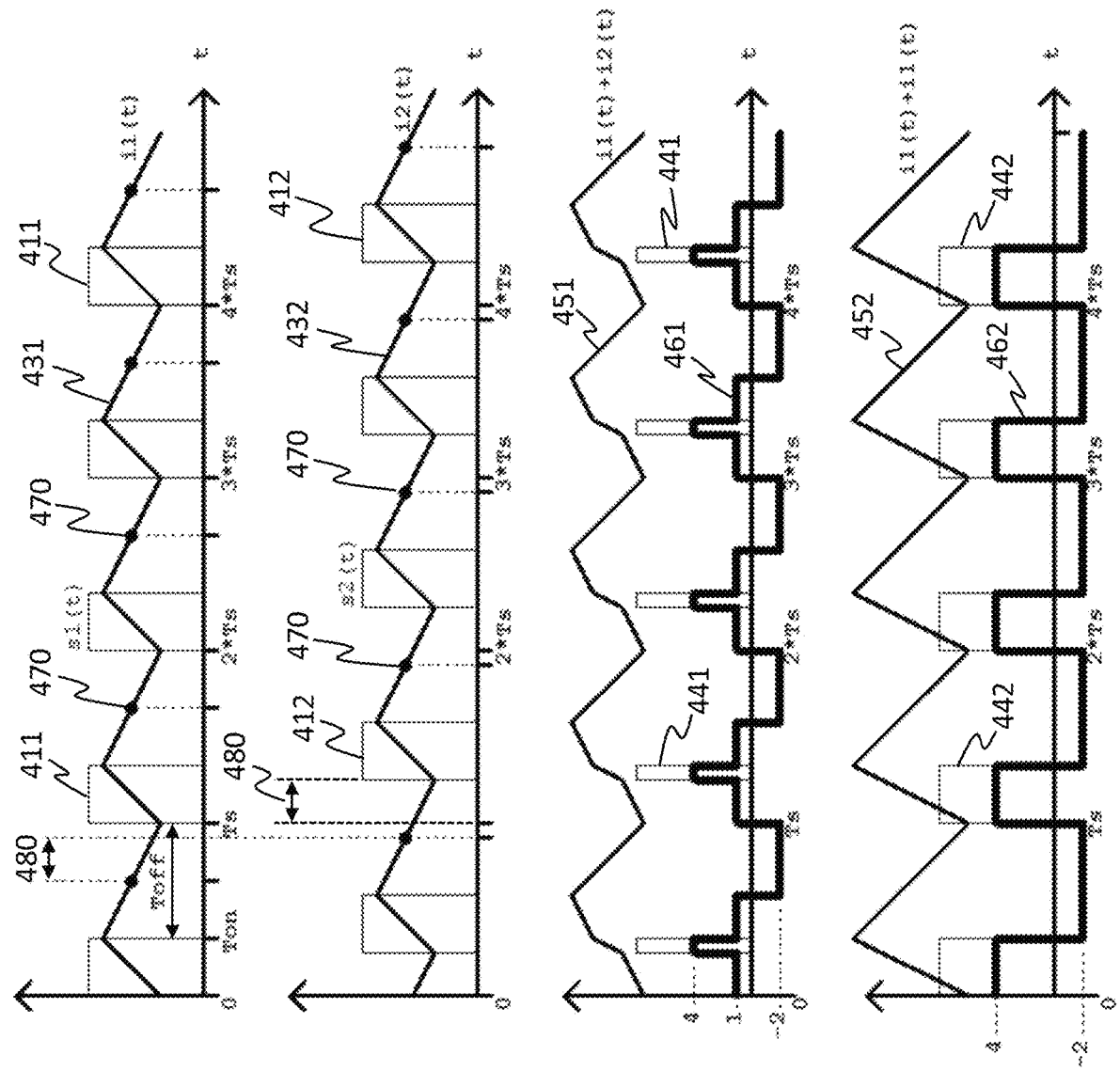
FIG. 14 shows temporal voltage and current curves, effective current curves and curves of a magnetic field strength change in an offset and a temporally synchronized pulse-width-modulated energization of two coil systems.

In FIG. 14, this relationship is illustrated by two adjacent energized coil systems. With reference to the stator 5 of the planar drive system 1, this may e.g. be two three-phase systems 150 arranged side by side and on top of one another. The two upper diagrams of FIG. 14 show electrical voltage and current characteristics as a function of time t, as they may exist with an offset pulse-width-modulated electrical control of the two coil systems. A first of the two coil systems is supplied with a first electrical drive voltage $s1(t)$ and thus with periodic fifth voltage pulses 411, so that a first electrical current $i1(t)$ flowing in the first coil system has a triangular third current curve 431. In a corresponding manner, a second of the two coil systems is supplied with a second electrical drive voltage $s2(t)$ and thus with periodic sixth voltage pulses 412, so that a second electrical current $i2(t)$ flowing in the second coil system has a triangular fourth current curve 432. Furthermore, in both coil systems, a current sampling adapted to the respective pulse-width-modulated control takes place at current measuring points 470, which are in each case located centrally between successive fifth voltage pulses 411 or sixth voltage pulses 412.

According to the two upper diagrams of FIG. 14, the periodic electrical control and thus energization of the two coil systems, as well as the periodic sampling coordinated with this, are each carried out in mutually offset time grids specified by the clock frequency of the pulse-width modulation. Thus, there is a time offset 480 between the fifth and sixth voltage pulses 411, 412, as well as between the current measuring times 470 relating to the first and second coil systems. Due to the time offset 480, a temporary increase in the amount of current in one of the two coil systems may occur, while at the same time a decrease occurs in the amount of current in the other of the two coil systems.

With respect to the fifth and sixth voltage pulses 411, 412, the time offset 480 may be related to the rising edges of the fifth and sixth voltage pulses 411, 412, as shown in FIG. 14. Alternatively, the time offset 480 may be related to the midpoints of the fifth and sixth voltage pulses 411, 412. With respect to the falling edges of the fifth and sixth voltage pulses 411, 412, however, this is not the case. This is because it is possible that the duty cycles (i.e. the ratios Ton/Ts) are different for the current control of the two coil systems, although the same current is controlled in each case. This may be caused by parameter scattering or other tolerances. If the duty cycles are different (even if only slightly), then the time offset 480 between the current measuring instants 470 is not equal to the time interval of the falling edges of the fifth and sixth voltage pulses 411, 412, but is equal to the time interval of the centers of the fifth and sixth voltage pulses 411, 412.

The penultimate diagram of FIG. 14 shows the first time curve of a virtual summation current 451, which is formed by adding the currents $i1(t)$, $i2(t)$ and the third and fourth current characteristics 431, 432, respectively. Further shown are first time ranges 441 in which there is a temporal overlap of the offset fifth and sixth voltage pulses 411, 412, as well as the temporal first curve of a magnetic field strength change 461. The first curve of the magnetic field strength change 461 relates to the temporal overlap of the alternating magnetic fields of the two coil systems. With reference to the first curve of the magnetic field strength change 461, a fictitious magnitude scale is indicated on the ordinate. In the first time ranges 441, the first curve of the virtual summation current 451 has the largest changes in the current amount with respect to time t. The first curve of the magnetic field strength change 461 is based on the alternating magnetic fields caused by the currents $i1(t)$, $i2(t)$ in the two coil systems, and is dependent on the first curve of the virtual summation current 451. In the first time ranges 441, the largest constructive superpositions of the alternating magnetic fields caused by the coil systems occur, resulting in the largest change in the magnetic field strength. Outside of the first time ranges 441, however, in which there are partially weakening superpositions of the alternating magnetic fields due to the mutually offset energizing of the two coil systems, the change in the magnetic field strength is smaller.

In comparison, the last or lowermost diagram of FIG. 14 shows conditions for the case of a temporally synchronous electrical control of the two coil systems, i.e. when the two coil systems are each energized with the first current $i1(t)$. Further shown are the temporal second curve of a virtual summation current 452, formed by twice adding the first current $i1(t)$ and the third current curve 431, respectively, second time ranges 442 corresponding to the fifth voltage pulses 411, and the temporal second curve of a magnetic field strength change 462 dependent on the second curve of the virtual summation current 452. The second curve of the magnetic field strength change 462 refers to the superposition of the alternating magnetic fields of the two coil systems. In the case of the temporally synchronous control of the coil systems, exclusively constructive superpositions of the alternating magnetic fields caused by the coil systems occur, which are largest in the second time ranges 442. Insofar, the change in the magnetic field strength is also larger for the temporally synchronous control than for the temporally offset control of the coil systems, as may be seen from a comparison of the different progressions of the magnetic field strength change 461, 462. This applies in a corresponding manner to an alternating electric voltage inducible in the at least one rotor coil 240 of the rotor 200.

In the planar drive system 1, groups of three three-phase systems 150 are associated with each of the current measuring devices 172 (cf. FIG. 12). As further indicated above, an embodiment of the planar drive system 1 may be used in which the one or each stator module 10 of the stator 5 is configured to carry out the energization of three-phase systems 150 of a group and the periodic sampling coordinated therewith, in each case with a time offset from one another.

Figure 15:
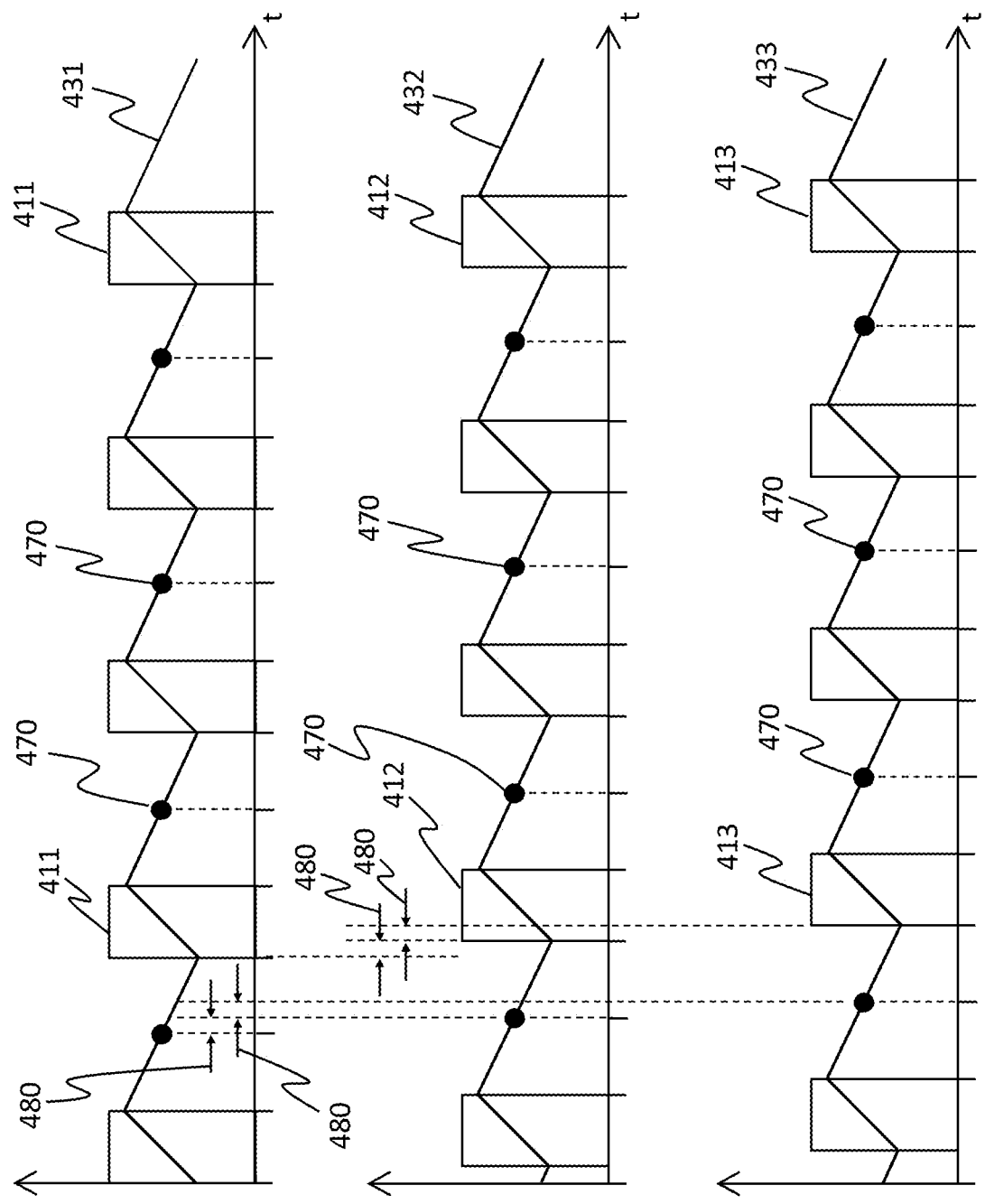
FIG. 15 shows temporal voltage and current curves of three coil systems, which are energized in an offset manner with regard to one another.

FIG. 15 illustrates this embodiment with possible voltage and current curves as a function of time t for such a group of three coil systems, all of which are energized. A first of the three coil systems is energized with periodic fifth voltage pulses 411 so that a triangular third current curve 431 is present in the first coil system. Similarly, a second and a third coil system are driven with periodic sixth voltage pulses 412 and periodic seventh voltage pulses 413, respectively, resulting in a triangular fourth current curve 432 and a triangular fifth current curve 433 in the second and third coil systems, respectively. In each of the coil systems, current sampling is carried out over in time with the respective electrical drive, i.e., at current measuring times 470, which are each centrally located between successive fifth, sixth and seventh voltage pulses 411, 412, 413. One current sample is taken per PWM period. Multiple current samples, e.g. two samples per PWM period are conceivable, as well.

As shown in FIG. 15, the electrical activation and thus energization as well as the coordinated sampling of the three coil systems are carried out at an offset with regard to one another. Between the periodic control of the first coil system and the periodic control of the second coil system, as well as between the periodic control of the second coil system and the periodic control of the third coil system, there is a time offset 480 in each case. In a corresponding manner, there is a time offset 480 occurs between the periodic sampling of the first coil system and the periodic sampling of the second coil system, as well as between the periodic sampling of the second coil system and the periodic sampling of the third coil system, respectively. With respect to the fifth, sixth and seventh voltage pulses 411, 412, 413, the time offset 480 may be related to the rising edges of the fifth, sixth and seventh voltage pulses 411, 412, 413, according to FIG. 14. Alternatively, the time offset 480 may be related to the midpoints of the fifth, sixth and seventh voltage pulses 411, 412, 413.

Another effect that may occur when coil systems are driven at offset times is that the magnetic field strength change of the resulting magnetic field may be dependent on location. In a corresponding manner, an alternating electric voltage inducible in the at least one rotor coil 240 of the rotor 200 may be dependent on the position of the rotor 200.

Figure 16:
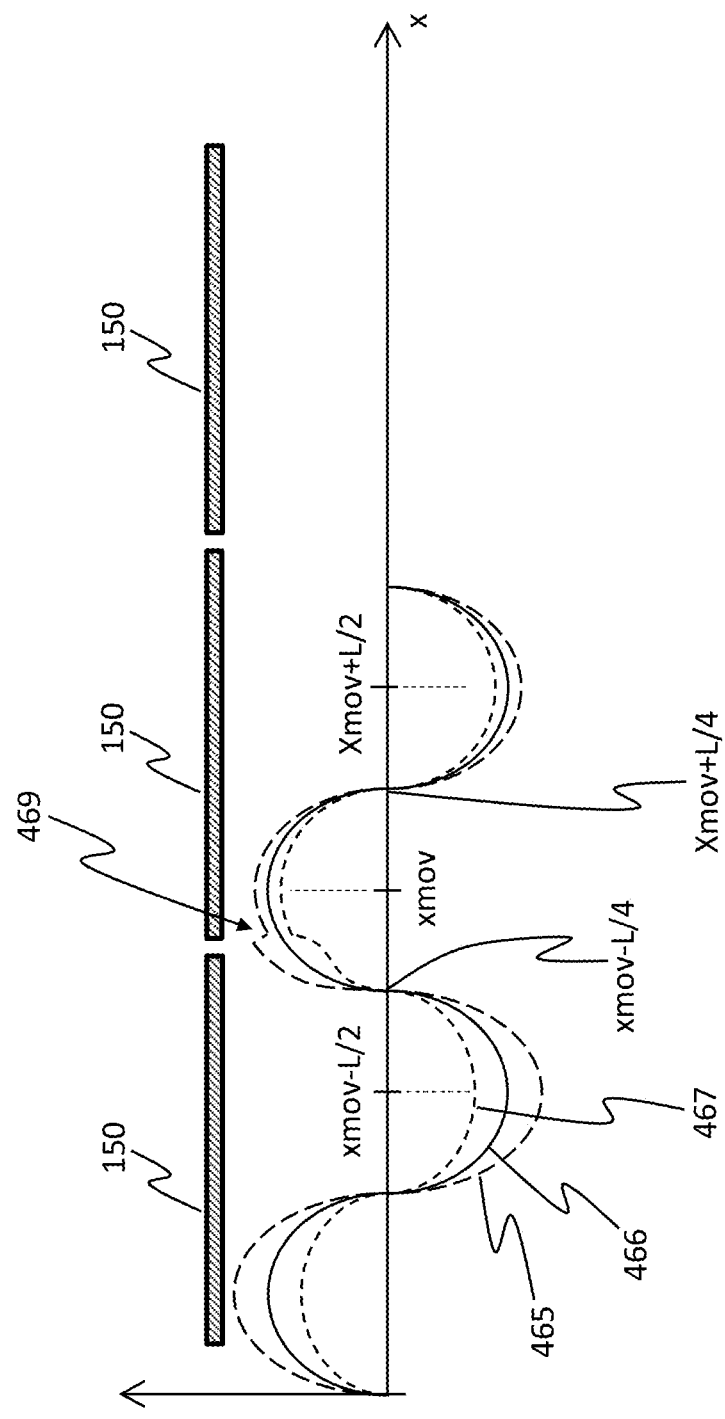
FIG. 16 depicts local curves of a magnetic field strength at different times during pulse-width-modulated energization of two coil systems.

For further illustration, FIG. 16 shows an arrangement of three adjacent three-phase systems 150 and spatial curves of a magnetic field strength 465, 466, 467 as a function of a location x. In the following, these are referred to as the first curve of the magnetic field strength 466, the second curve of the magnetic field strength 465 and the third curve of the magnetic field strength 467. The three-phase systems 150 may be first three-phase systems 151 or second three-phase systems 152 of the stator 5, as explained above with reference to FIGS. 8 and 9. In a corresponding manner, the location x may refer to the first direction 12 or the second direction 14. Of the three-phase systems 150 shown in FIG. 16, only two three-phase systems 150, i.e. the left-hand three-phase system 150 and the middle three-phase system 150 in FIG. 16, are energized. The curves of the magnetic field strength 465, 466, 467, which respectively illustrate the local strength of the resulting magnetic field generated by the two energized three-phase systems 150, relate to three different points in time. The spatial first curve of the magnetic field strength 466, which is shown with a solid line and has a continuous sinusoidal shape, may illustrate a time mean value of the strength of the resulting magnetic field.

In the arrangement shown in FIG. 16, the left and center three-phase systems 150 are electrically driven in the manner described above in a pulse-width-modulated manner, wherein the three-phase systems 150 are energized and the currents flowing in the three-phase systems 150 are subject to a ripple current. This results in the magnetic fields generated by the energized three-phase systems 150, and thus also in the resulting magnetic field, fluctuating over time in terms of magnetic field strength, as is evident from the different curves of magnetic field strength 465, 466, 467 present at different times.

According to FIG. 16, the left and the middle three-phase systems 150 are further driven at a time offset with regard to one another in a pulse-width-modulated manner. This may result in the magnetic fields generated by the three-phase systems 150 having different magnetic field strengths in a transition region of the three-phase systems 150. In this way, the resulting magnetic field may exhibit a jump or bend 469 in the form of relatively large local changes in magnetic field strength in the transition region, as shown in FIG. 16 for the dashed second and third progressions of magnetic field strength 465, 467. The second and third curves of the magnetic field strength 465, 467 thus have, in contrast to the first curve of the magnetic field strength 466, a sinusoidal shape only outside of the transition region. The offset control of the three-phase systems 150 in the present case consequently leads to the fact that the efficiency of an inductive energy transfer in the transition region of the three-phase systems 150 may be lower than in the remaining region penetrated by the resulting magnetic field. Insofar, the inductive energy transfer may be location-dependent, and thus dependent on the position of the rotor 200.

In FIG. 16, moreover, on the x-axis a plurality of positions denoted by xmov−L/2, xmov−L/4, xmov, xmov+L4 and xmov+L/2 are indicated, in which the curves of the magnetic field strength 465, 466, 467 have peaks and zero crossings. The variable L may be a width of a three-phase system 150 or of a stator segment 120, 121, and correspond to the segment width 127 shown in FIGS. 6 and 7. By xmov, a center position of the rotor 200 may further be indicated, at which the center of the rotor 200 and at least one rotor coil 240 of the rotor 200 may be located.

In order to suppress as far as possible, in the above-described embodiment of the planar drive system 1 comprising three-phase systems 150 electrically controlled in an offset manner with respect to one another, any impairment of the inductive energy transmission due to the offset control, the following configuration may also be considered with respect to the planar drive system 1. In this context, the one or each stator module 10 of the stator 5 is configured such that the time offset 480 present during the offset actuation of three-phase systems 150 (cf. FIGS. 14 and 15) is as small or minimal as possible. For this purpose, the time offset 480 may correspond to a sampling time period or minimum sampling time period of the current measuring devices 172, which the current measuring devices 172 require for simultaneously sampling the currents of an associated three-phase system 150. In this way, during the offset energizing of three-phase systems 150 and the coordinated sampling thereof, it may be achieved that the alternating magnetic fields of the energized three-phase systems 150 at least partially or to a relatively large extent constructively overlap. As a result, the inductive energy transfer from the stator 5 to the rotor 200 may be as effective as possible and, moreover, may also be largely independent of position, and variations in the magnitude of the energy transfer may be relatively small. The minimum sampling time period, which may also be referred to as the sampling time, may e.g. be in the single-digit microsecond range and may e.g. be 1.2 μs.

Alternatively, the embodiment described in the following may be applied to the planar drive system 1. In this case, the one or each stator module 10 of the stator 5 is configured, in a first operating mode, to carry out the periodic sampling of the currents of three-phase systems 150, which are assigned to a current measuring device 172 for current sampling, with the aid of the associated current measuring device 172, in each case in a time-coordinated manner with their pulse-width-modulated energizing, and to carry out the pulse-width-modulated energizing of three-phase systems 150 of the group and the sampling coordinated therewith with a time offset with respect to one another. The one or each stator module 10 of the stator 5 is further configured, in a second operating mode, to carry out the pulse-width-modulated energizing of three-phase systems 150 of a group, which is assigned to a current measuring device 172, in each case time-synchronized with regard to one another in terms of time, and to carry out the periodic sampling of currents flowing in the three-phase systems 150 of the group with the aid of the associated current measuring device 172 with a time offset from one another. This embodiment may also be provided with respect to all current measuring devices 172 and associated groups of three-phase systems 150 of the stator 5 of the planar drive system 1.

The time offset provided in the first mode of operation and the time offset provided in the second mode of operation may each correspond to the aforementioned sampling time period and minimum sampling time period, respectively, of the current measuring devices 172. Moreover, in the first operating mode as well as in the second operating mode, one current sampling may be performed per PWM period, respectively.

In the first mode of operation, current control and timing of current sampling of three-phase systems 150 associated with a current measuring device 172 is carried out in the offset manner described above, as also shown in the top two diagrams of FIG. 14 and in FIG. 15. The first mode of operation may be used when inductive power transfer from the stator 5 to the rotor 200 is not required, or inducing an AC voltage in the at least one rotor coil 240 of the rotor 200 is not used. In the first mode of operation, as indicated above, mean current values may be obtained as actual current values, which makes accurate current control possible.

In contrast to this, the second operating mode may be used to cause inductive energy transfer from the stator 5 to the rotor 200 in the most efficient manner possible. In the second operating mode, the pulse-width-modulated energizing of three-phase systems 150 of a group, which are assigned to a current measuring device 172, takes place synchronously in time with one another, and thus in a common time grid.

Figure 17:
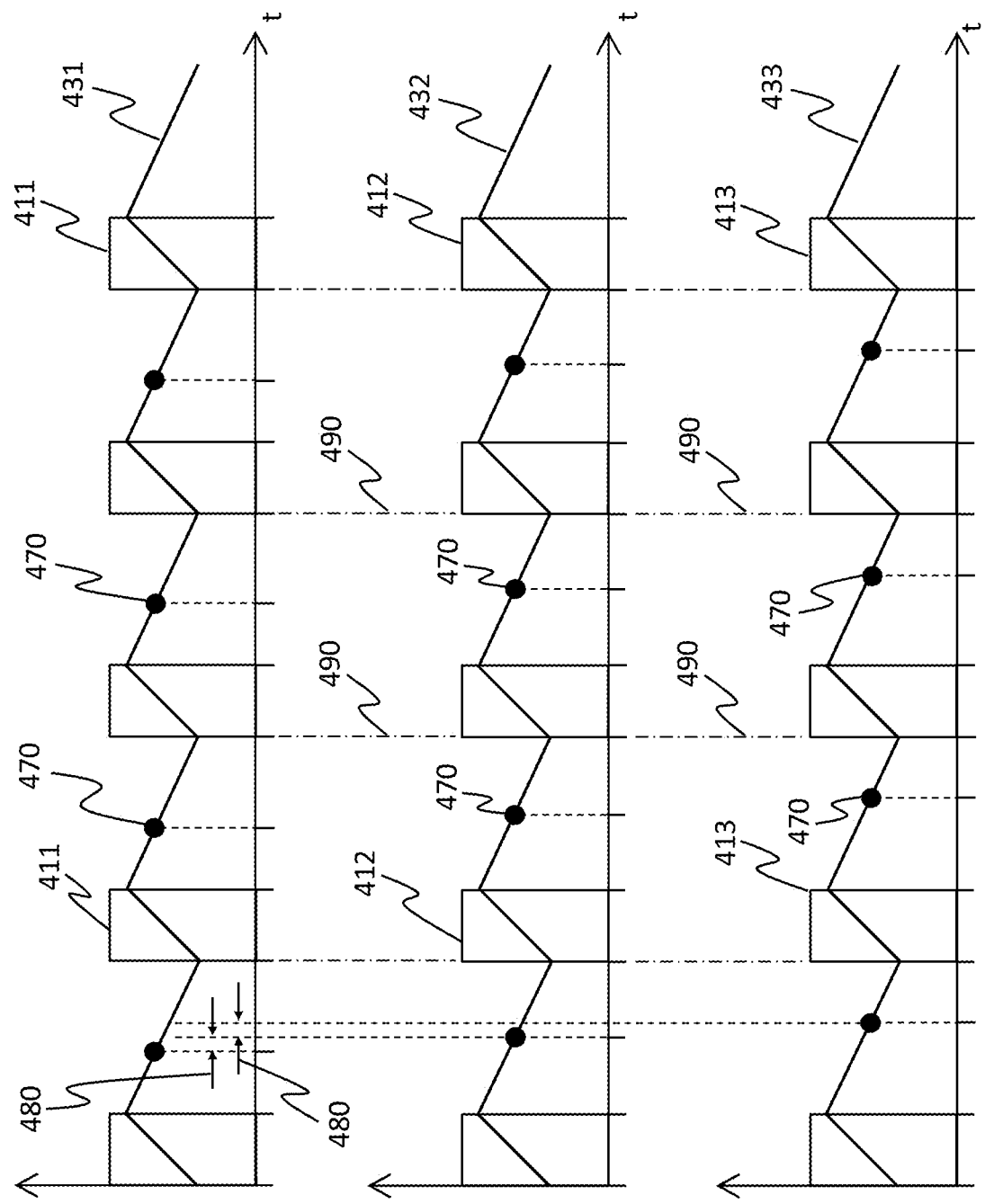
FIG. 17 shows temporal voltage and current curves of three coil systems which are energized synchronously and for which the current is measured with a time offset.

FIG. 17 illustrates the second mode of operation by showing possible voltage and current curves as a function of time t for a group of three coil systems, all of which are energized. A first of the three coil systems is energized with periodic fifth voltage pulses 411 so that a triangular electrical third current curve 431 is present in the first coil system. Similarly, a second and a third coil system are driven with periodic sixth voltage pulses 412 and periodic seventh voltage pulses 413, respectively, resulting in a triangular fourth current curve 432 and a triangular fifth current curve 433 in the second and third coil systems, respectively. The fifth, sixth and seventh voltage pulses 411, 412, 413 applied to the coil systems for pulse-width-modulated energization are synchronous in time with each other, and are on a joint time grid. The time grid is indicated in FIG. 17 by grid lines 490. Here, the grid lines 490 and thus the time grid refer to the rising edges of the fifth, sixth and seventh voltage pulses 411, 412, 413. Alternatively, the grid lines 490 and thus the time grid may also refer to the falling edges or the centers of the fifth, sixth and seventh voltage pulses 411, 412, 413.

As indicated above, during operation of the planar drive system 1, a plurality of three-phase systems 150 may be energized simultaneously to drive the rotor 200. For this purpose, the main controller 500 may transmit corresponding setpoint current values 300 to associated current controllers 170 (cf. FIG. 11). It is also possible that a plurality of three-phase systems 150 of different groups, which are thus assigned to different current measuring devices 172 for current sampling, are energized simultaneously. In an embodiment of the stator 5 with a plurality of stator modules 10 (cf. FIG. 2), a plurality of simultaneously energized three-phase systems 150 may further be components of a plurality of adjacent stator modules 10. In this respect, the stator 5 or the or each stator module 10 of the stator 5 may be configured in such a way that in the second operating mode a plurality of or all three-phase systems 150 to be energized, which may be components of different groups as well as possibly of different stator modules 10, are energized in a time-synchronous manner with respect to one another and thus in a common time raster in a pulse-width-modulated manner.

When a plurality of three-phase systems 150 of the stator 5 are energized synchronously in time, as is carried out in the second operating mode, the ripple currents flowing in the respective three-phase systems 150 and the alternating magnetic fields caused thereby may be synchronous with one another and in phase, and may be superimposed exclusively or to the greatest possible extent due to. In this manner, relatively large changes in magnetic field strength may be effected, as shown above with reference to the last diagram of FIG. 14. Accordingly, a relatively large alternating voltage may be induced in the at least one rotor coil 240 of the rotor 200, allowing for effective inductive energy transfer from the stator 5 to the rotor 200. Moreover, the location-dependent effect explained with reference to FIG. 16 may be avoided, so that the energy transfer may be independent of the position of the rotor 200.

In the second mode of operation, the periodic sampling of three-phase systems 150 of a group is performed with a time offset with regard to one another via the associated current measuring device 172. This is because, as indicated above, only one associated three-phase system 150 may be sampled simultaneously at a time using the current measuring devices 172. In this sense, in the second operating mode, only one three-phase system 150 of a group which is assigned to a current measuring device 172 may also be sampled with the aid of the relevant current measuring device 172 in such a coordinated manner with respect to its pulse-width-modulated energizing that mean current values are obtained as actual current values for this three-phase system 150. However, this is not possible for the other three-phase systems 150 of the group because the sampling is carried out at an offset with regard to one another.

This aspect is also shown in FIG. 17. Here, only the second coil system is sampled in such a way that its pulse-width-modulated current may be recorded as actual current values. For this purpose, the current measuring points 470 are located centrally between the sixth voltage pulses 412. The first and third coil systems are sampled at an offset with regard to one another. Compared to the sampling of the second coil system, the current measuring times 470 are shifted forward in time for the first coil system and backward in time for the third coil system. Therefore, between the periodic sampling of the first coil system and the periodic sampling of the second coil system, and also between the periodic sampling of the second coil system and the periodic sampling of the third coil system, a time offset 480 occurs in each case. In this way, the current measuring times 470 are not centrally located centrally between the sixth voltage pulses 412 and seventh voltage pulses 413 for either the first coil system or the third coil system, and in this respect it is not possible to obtain mean current values as actual current values for either the first or the third coil system. The time offset 480 may in this context also correspond to a sampling time period or minimum sampling time period of the current measuring devices 172.

As a result, when the planar drive system 1 is operated in the second operating mode, the accuracy of the current control may be affected. For example, one or more energized three-phase systems 150 may experience currents that deviate from the target current values. However, the second operating mode may only be used in a targeted manner to effect an effective inductive energy transfer from the stator 5 to the rotor 200, and thus for a limited time, so that such a degradation may be neglected.

The energization of three-phase systems 150 of the stator 5 of the planar drive system 1 according to the first or second operating mode may be specified or initiated by the main controller 500 of the planar drive system 1. To this end, the main controller 500 may transmit corresponding control signals to one or a plurality of current controllers 170 or to one or a plurality of module controllers 190 of one or more stator modules 10 to specify the respective operating mode.

To achieve efficient inductive energy transfer from the stator 5 to the rotor 200, the embodiment described in the following may also be used for the planar drive system 1. This embodiment is based on intervening in a targeted manner in the current control described above with reference to FIG. 11 in such a way that the ripple current flowing in energized three-phase systems 150 is amplified.

Figure 18:
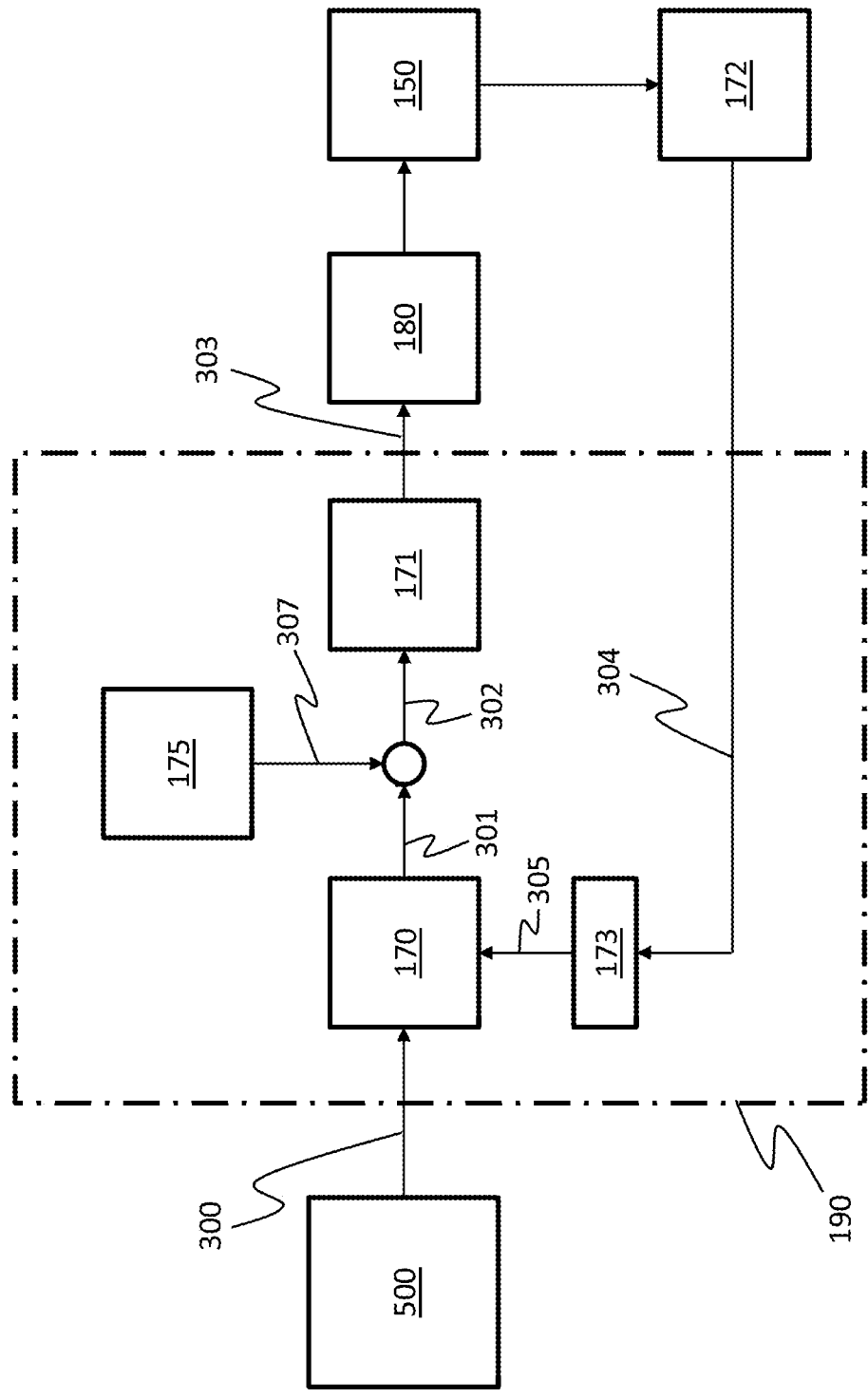
FIG. 18 shows a further control loop for current control of a coil system on the basis of pulse-width modulation, the control loop having an additional influencing device for influencing the current control.

By way of illustration, FIG. 18 shows a block diagram of a further control loop for current control of a three-phase system 150 based on pulse-width modulation, as may be provided for this purpose in the planar drive system 1. The control loop shown in FIG. 18 is substantially the same as the control loop of FIG. 11, and comprises, in addition to the main controller 500, components explained above such as a module controller 190, an output stage device 180, a three-phase system 150 and a current measuring device 172. The module controller 190 comprises a current controller 170, a PWM signal generating device 171 and a processing device 173. For details of these components and their interaction, reference is made to the above description of FIG. 11.

A further component of the control loop shown in FIG. 18 is an optionally switchable influencing device 175, which, as shown in FIG. 18, may be a component of the module controller 190. If the influencing device 175 is not activated or not switched on, the current control of the three-phase system 150 takes place in the manner described above, as described with reference to FIG. 11.

When the influencing device 175 is activated or switched on, influencing signals 307 are generated by the influencing device 175, as shown in FIG. 18, which are added to the control signals 301 output by the current controller 170. The influencing signals 307 may be a mean-value free AC voltage. It is also possible for the influencing signals 307 to represent a mean-value free AC voltage or the effect of such an AC voltage. Adding the influencing signals 307 to the control signals 301 results in a change or modulation of the control signals 301, so that influenced control signals 302 are transmitted to the PWM signal generating device 171. Based on this, pulse-width-modulated control signals 303 are generated by the PWM signal generating device 171, which are applied to the output stages or switches of the output stage device 180 as described above. Since the PWM signal generating device 171 receives influenced control signals 302 instead of the control signals 301, the pulse-width-modulated control signals 303 generated by the PWM signal generating device 171 are also subject to being influenced by the influencing device 175, in such a manner that an amplified ripple current flows in the three-phase system 150 energized by the output stage device 180.

The amplified ripple current generated using the influencing device 175 may have a larger oscillation width than the ripple current present in uninfluenced operation without the influencing device 175. In a corresponding manner, the alternating magnetic field induced by the amplified ripple current as well as the alternating voltage inducible in the at least one rotor coil 240 of the rotor 200, may have a larger oscillation width. The above-described use of influencing signals 307, which are in the form of an averaging-free alternating voltage or reproduce the effect of such an alternating voltage, further allows for the mean value of the current flowing in the energized three-phase system 150 and influenced by the influencing device 175 to remain the same. This condition may refer to a plurality of PWM periods. Moreover, the influencing device 175 may be used to influence the magnitude or oscillation width of the ripple current independently of the mean value of the current flowing in the three-phase system 150.

Figure 19:
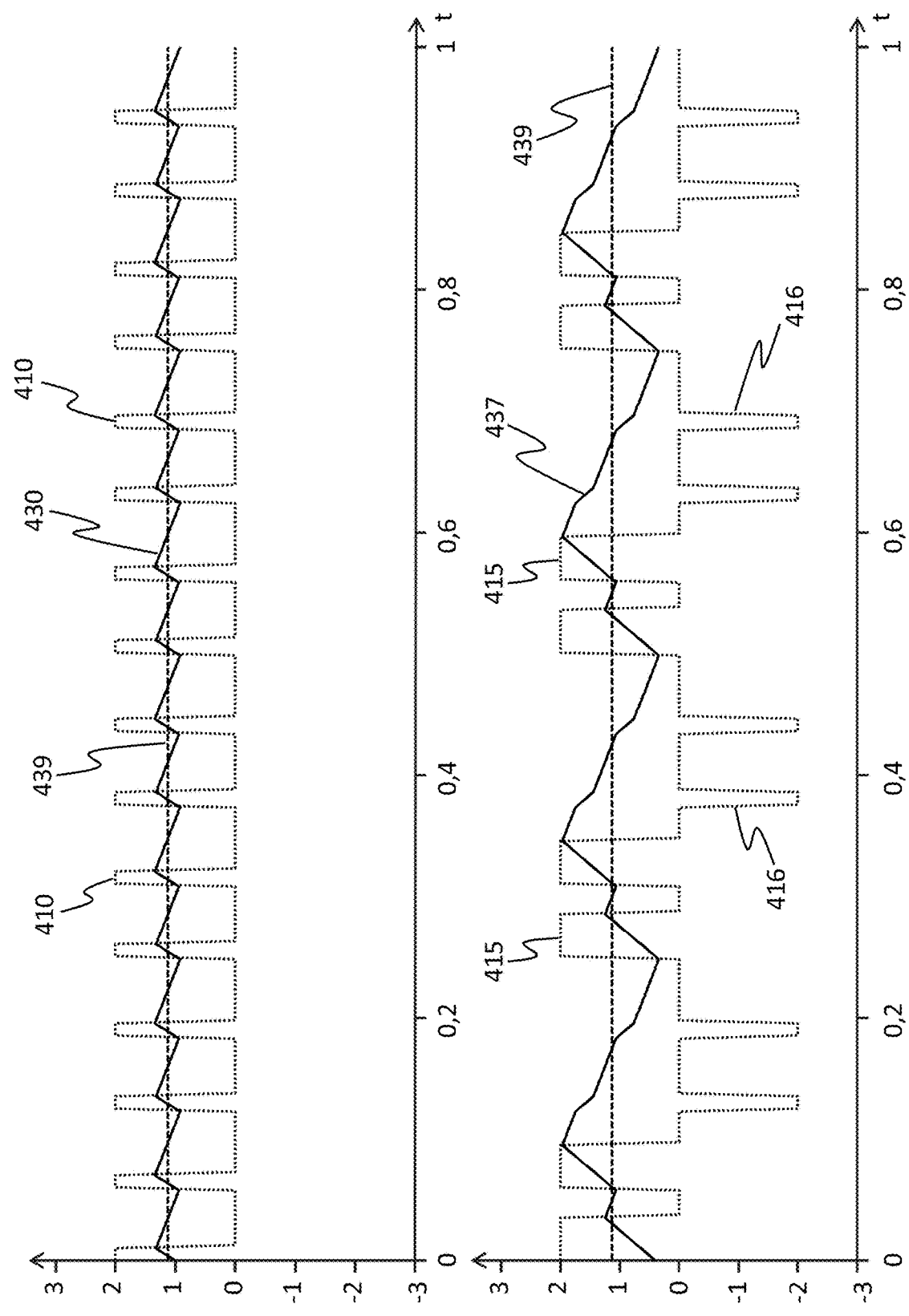
FIG. 19 depicts temporal voltage and current curves over time for pulse-width-modulated energization of a coil system in an uninfluenced state and in a state influenced by the influencing device.

By way of further illustration, FIG. 19 shows possible electrical voltage and current curves as a function of time t, such as may occur when a coil system is energized by pulse-width modulation in an uninfluenced state and in a state influenced by the influencing device 175. The upper diagram of FIG. 19 illustrates the uninfluenced electrical energizing of the coil system. Periodic first voltage pulses 410 are applied to the coil system in such a way that a triangular electrical first current curve 430 is present in the coil system. The current oscillates back and forth about a current mean value 439. With reference to the current, a fictitious scale of magnitude is indicated on the ordinate. Also indicated on the abscissa with respect to time t is a fictitious magnitude scale.

In comparison, the lower diagram of FIG. 19 shows possible conditions as they may exist in the electrical control of the coil system influenced by the influencing device 175. In the example shown here, two eighth voltage pulses 415 and two ninth voltage pulses 416 are alternately applied to the coil system in a periodic manner. In order to achieve the desired effect of a constant mean current value, the eighth and ninth voltage pulses 415, 416 may e.g. be voltage pulses originating from the first voltage pulses 410, in which twice the pulse width of the first voltage pulses 410 is added (eighth voltage pulses 415) or subtracted (ninth voltage pulses 416). In this way, the pulse width of the eighth voltage pulses 415 may be larger than the pulse width of the unaffected first voltage pulses 410 by a factor of three. With reference to the ninth voltage pulses 416, the subtraction would result in a negative pulse width with an absolute value corresponding to the pulse width of the first voltage pulses 410. Thus, as an equivalent to this, the ninth voltage pulses 416 are generated such that the ninth voltage pulses 416 have the same pulse duration as the unaffected first voltage pulses 410 and an inverse polarity with respect to the first voltage pulses 410, and thus with respect to the eighth voltage pulses 415. Due to the periodic eighth and ninth voltage pulses 415, 416, a triangular electrical third current curve 437 is established in the coil system, which has a wider oscillation width compared to the unaffected first current curve 430. Here, the current oscillates back and forth around the same mean value 439, as well, but with respect to a plurality of PWM periods or period durations.

With reference to the control loop shown in FIG. 18, it is possible that the one or each stator module 10 of the stator 5 comprises a single influencing device 175. In this case, the influencing device 175 of a stator module 10 may be configured to influence the control signals 301 generated by one, a plurality of or all current controllers 170 of the associated stator module 10 in the manner described above. It is also possible that the one or each stator module 10 has its own influencing device 175 for each three-phase system 150 of the stator module 10 and thus for each current controller 170. In this embodiment, the one or each stator module 10 may have twenty-four influencing devices 175, each of which may be used to influence the control signals 301 using a respective current controller 170. The influencing device 175 or the plurality of influencing devices 175 of a stator module 10 may be integrated into the associated module controller 190, as shown in FIG. 18.

For influencing the current control, a further embodiment differing from FIG. 18 may be considered, in which the influencing signals 307 generated by an influencing device 175 are added to the pulse-width-modulated control signals 303 generated by a PWM signal generating device 171, so that changed or influenced pulse-width-modulated control signals are applied to output stages or switches of an output stage device 180. This may be used in a corresponding manner to influence the electrical control of a three-phase system 150, and thereby cause an amplified ripple current. In such an embodiment, as well, the or each stator module 10 of the stator 5 may comprise a single influencing device 175 or a plurality of or twenty-four influencing devices 175 via which the pulse-width-modulated control signals 303 from one, a plurality of or all of the PWM signal generating devices 171 of the associated stator module 10 may be influenced.

As described above, in operation of the planar drive system 1, a plurality of three-phase systems 150 may be simultaneously energized to drive the rotor 200. The plurality of three-phase systems 150 that are simultaneously energized may be components of plurality of groups, i.e., may be associated with a plurality of current measuring devices 172, and may also be components of a plurality of stator modules 10. In this context, it is possible to intervene in the current control of a plurality of or all three-phase systems 150 to be energized using one or more influencing devices 175 in such a way that an amplification of the ripple current is effected. In this way, an amplification of the alternating magnetic fields generated by the three-phase systems 150 and thus of the resulting alternating magnetic field, and in a corresponding manner an amplification of the alternating voltage inducible in the at least one rotor coil 240 of the rotor 200 may be caused. This allows for effective inductive energy transfer from the stator 5 to the rotor 200.

The activation of one or of a plurality of influencing devices 175 for influencing the current control of one or more three-phase systems 150, as well as the deactivation thereof, may be initiated by the main controller 500 of the planar drive system 1. For this purpose, the main controller 500 may transmit corresponding control signals to one or to a plurality of influencing devices 175 or to one or to a plurality of module controllers 190 of one or of a plurality of stator modules 10.

The embodiment described with reference to FIGS. 18 and 19, in which current control may be influenced, may be combined with embodiments of the planar drive system 1 described above. This includes the embodiment in which an offset energization of three-phase systems 150 takes place (cf. FIG. 15), as well as the embodiment having a first and second operating mode, wherein in the second operating mode three-phase systems 150 are energized synchronously with regard to one another (cf. FIG. 16). With reference to the latter embodiment, it may be provided in this context both to energize three-phase systems 150 synchronously with regard to one another in the second operating mode and to influence the current control of the respective three-phase systems 150 by activating one or a plurality of influencing devices 175 in such a way that an amplified ripple current flows in the three-phase systems 150.

Other possible details that may be considered with respect to the rotor 200 and the at least one rotor coil 240 of the rotor 200 used for inductive energy transfer are discussed in the following.

Figure 20:
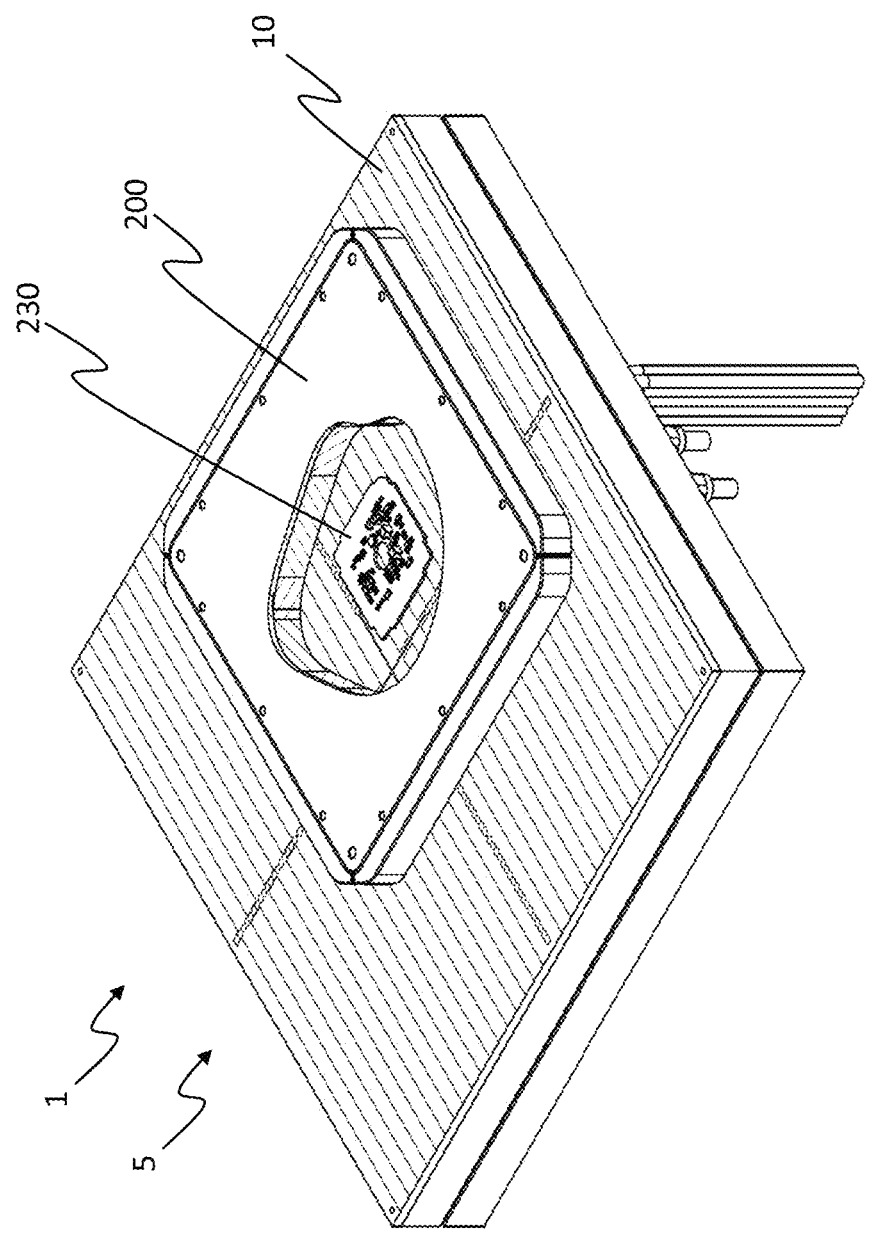
FIG. 20 is a perspective view of the stator module and the rotor, with the printed circuit board of the rotor shown in a partially sectional view of the rotor.

As described above with reference to FIG. 3, the rotor 200 may comprise a first printed circuit board 230 comprising at least one rotor coil 240 disposed in the area surrounded by the rotor magnets 216 of the magnet device 201 of the rotor 200. In this manner, the first circuit board 230 may be integrated into the rotor 200 relatively easily. To further illustrate this embodiment, FIG. 20 shows a perspective view of a stator module 10 of the stator 5 and the rotor 200, wherein the rotor 200 is shown in a partially sectional view. Based on this illustration, a possible size and location of the first circuit board 230 of the rotor 200 become apparent. Here, the first printed circuit board 230 has a rectangular or square contour. Also for illustrative purposes, FIG. 21 shows a top view of the stator module 10 and the rotor 200, wherein contours of the magnet device 201 and the first circuit board 230, as well as a rotor coil 240 are shown of the rotor 200.

Figure 21:
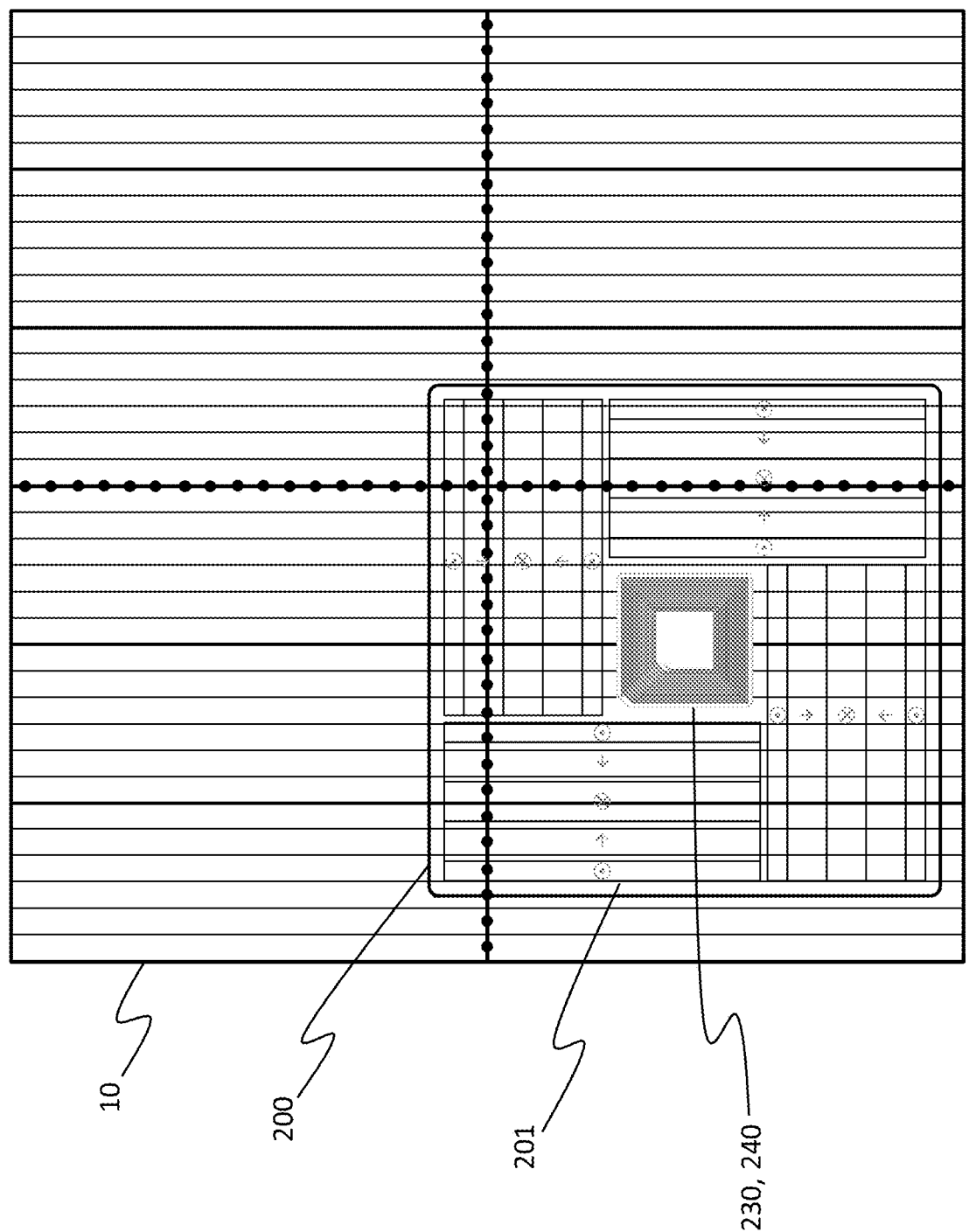
FIG. 21 is a top view of the stator module and rotor.

The first circuit board 230 shown in FIGS. 3, 20, and 21 may e.g. have a thickness of 1 mm. Furthermore, the first printed circuit board 230 may be multi-layered, and may include a plurality of rotor coils 240 arranged on top of one another and electrically inter-connected. This may allow for an effective inductive energy transfer from the stator 5 to the rotor 200. The rotor coils 240 may be realized by interconnected spiral conductor paths of the multi-layer first printed circuit board 230.

Figure 22:
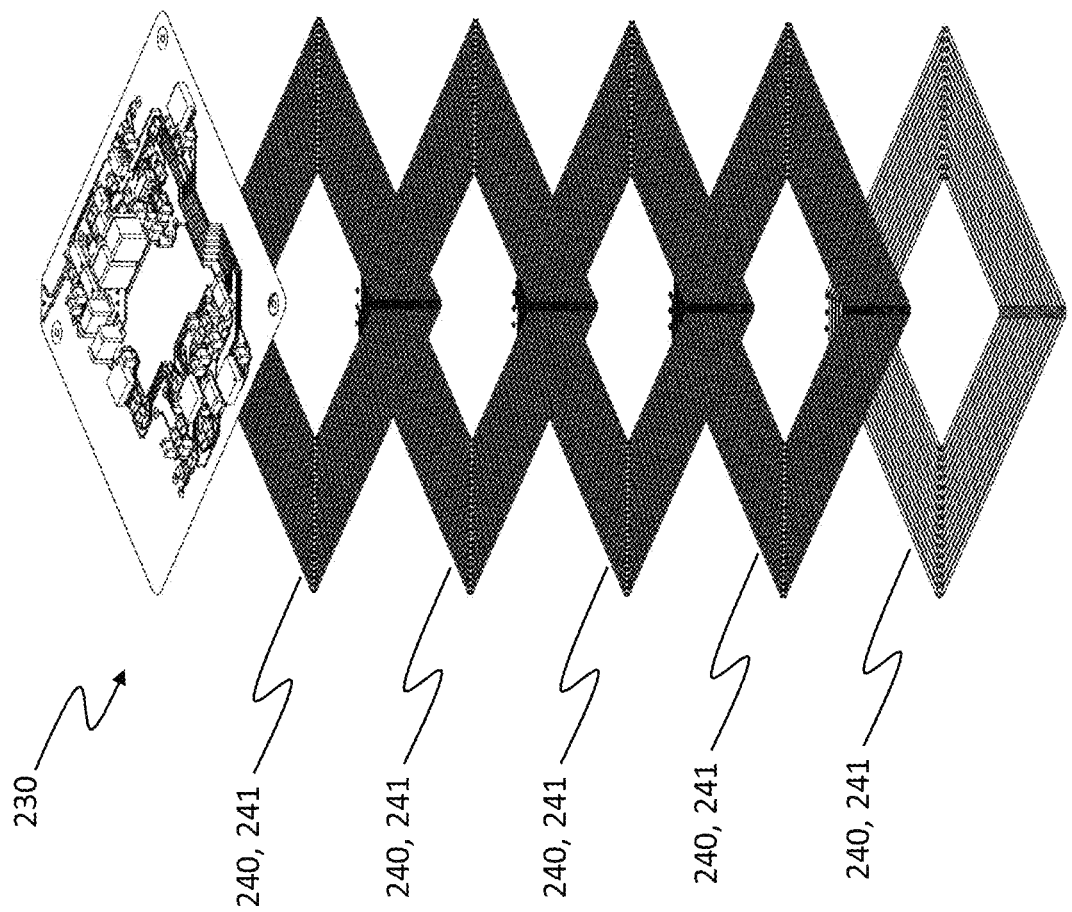
FIG. 22 is an exploded view of the printed circuit board of the rotor of FIG. 20 with a plurality of rotor coils.

To illustrate this embodiment, FIG. 22 shows an exploded view of components of the first printed circuit board 230. The first printed circuit board 230 comprises a plurality of spiral metallic first conductive paths 241 arranged in different layers of the first printed circuit board 230, each forming a rotor coil 240. The first conductive paths 241 may be electrically connected in series via electrical vertical connecting structures of the first circuit board 230.

Figure 23:
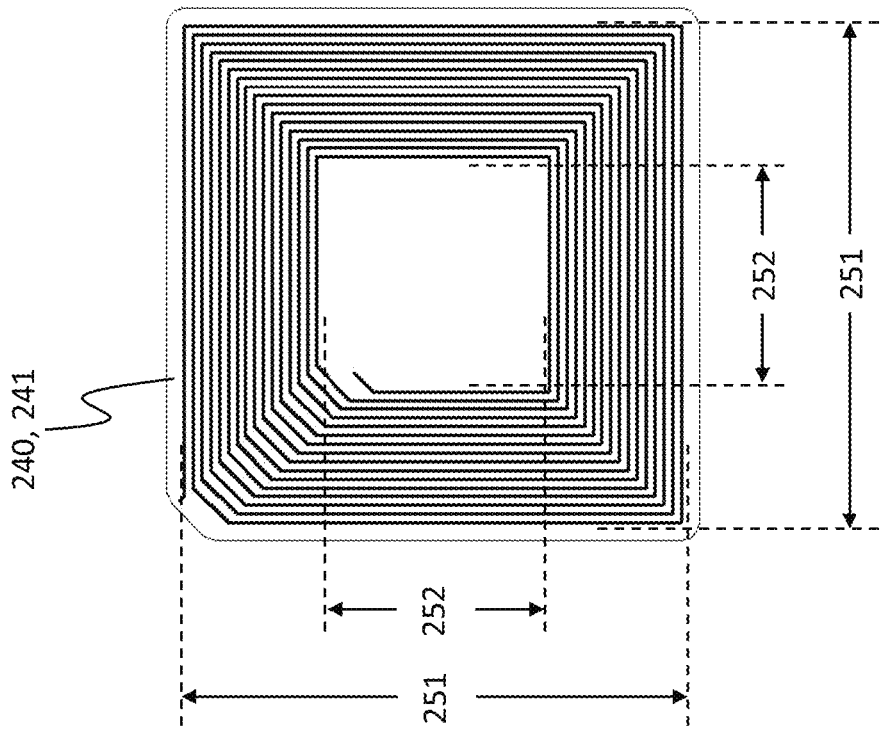
FIG. 23 is a top view of a rotor coil.

FIG. 23 shows a top view illustration of a spiral-shaped first circuit path 241 of the first circuit board 230 serving as a rotor coil 240. The structure shown may apply with respect to all of the first circuit paths 241 of the first circuit board 230. The first conductive path 241 has a substantially rectangular or square outer contour, and encloses a substantially rectangular or square inner region. Also, the first conductive path 241 has a relatively high number of windings. In FIG. 23 further indicates an outer width 251 relating to the outer contour and an inner width 252 relating to the inner contour of the first conductor path 241. Here, the outer width 251 may be 0.85 L, for example, and the inner width 252 may be 0.4 L, for example. As described above, the variable L may be a width of a three-phase system 150 or a stator segment 120, 121, and may correspond to the segment width 127 shown in FIGS. 6 and 7.

Figure 24:
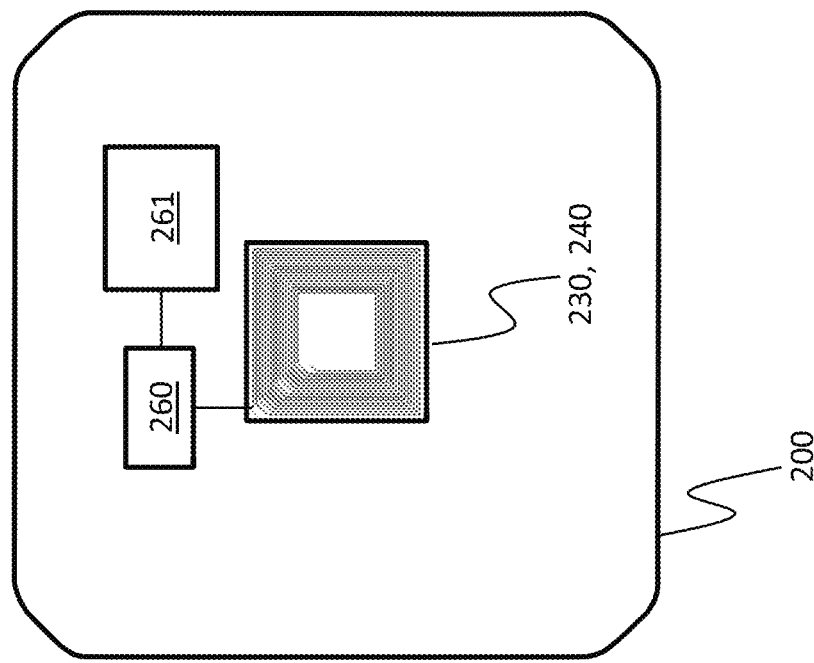
FIG. 24 shows a depiction of the rotor with the printed circuit board, a rectifier and a further device.

With respect to utilizing an AC voltage induced in the at least one rotor coil 240, the rotor 200 may further include a rectifier 260, as shown in FIG. 24. The rectifier 260, which is suitably electrically connected to the one or to a plurality of rotor coils 240, may be used to convert the induced AC voltage into a DC voltage. The rectifier 260 may e.g. be a bridge rectifier or a synchronous rectifier. In addition, the rectifier 260 may e.g. be implemented as a voltage amplifier or voltage doubler.

The DC voltage provided by the rectifier 260 may be used to supply electrical energy to at least a further device 261. As indicated in FIG. 24, the further device 261 may be part of the rotor 200 and/or arranged on the rotor 200. Also, the further device 261 is suitably electrically connected to the rectifier 260. For example, the further device 261 may be an electronic device. It is further possible for the DC voltage provided by the rectifier 260 to electrically power a plurality of further devices, which may be components of the rotor 200 and/or arranged on the rotor 200.

An embodiment of the rotor 200 comprising a rectifier 260 for electrically supplying at least a further device 261 may be considered in a corresponding manner with respect to the embodiments described in the following with reference to FIGS. 25 to 31.

Figure 25:
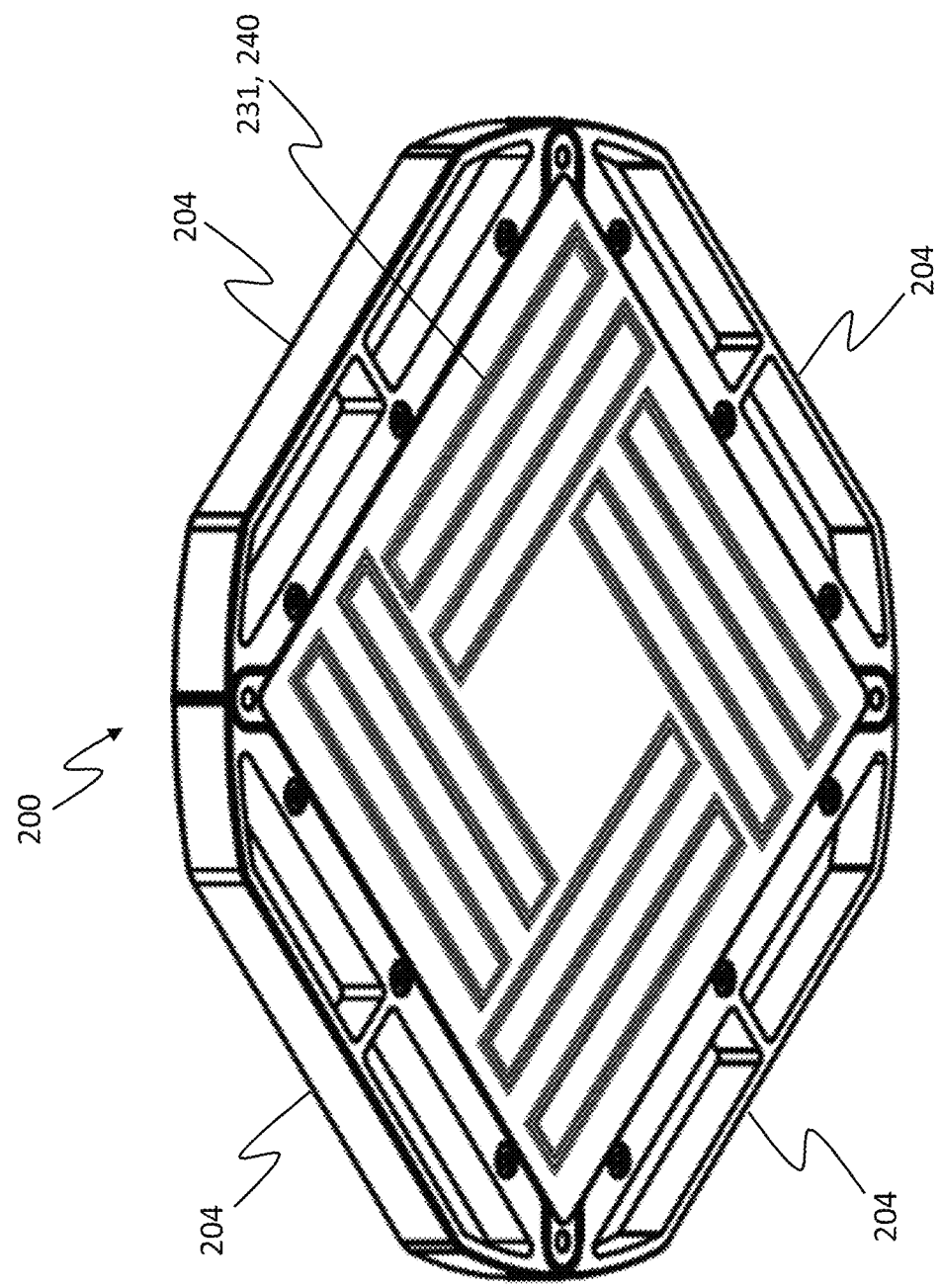
FIG. 25 is a perspective view of a further embodiment of the rotor with a printed circuit board arranged on an underside of the rotor.
Figure 26:
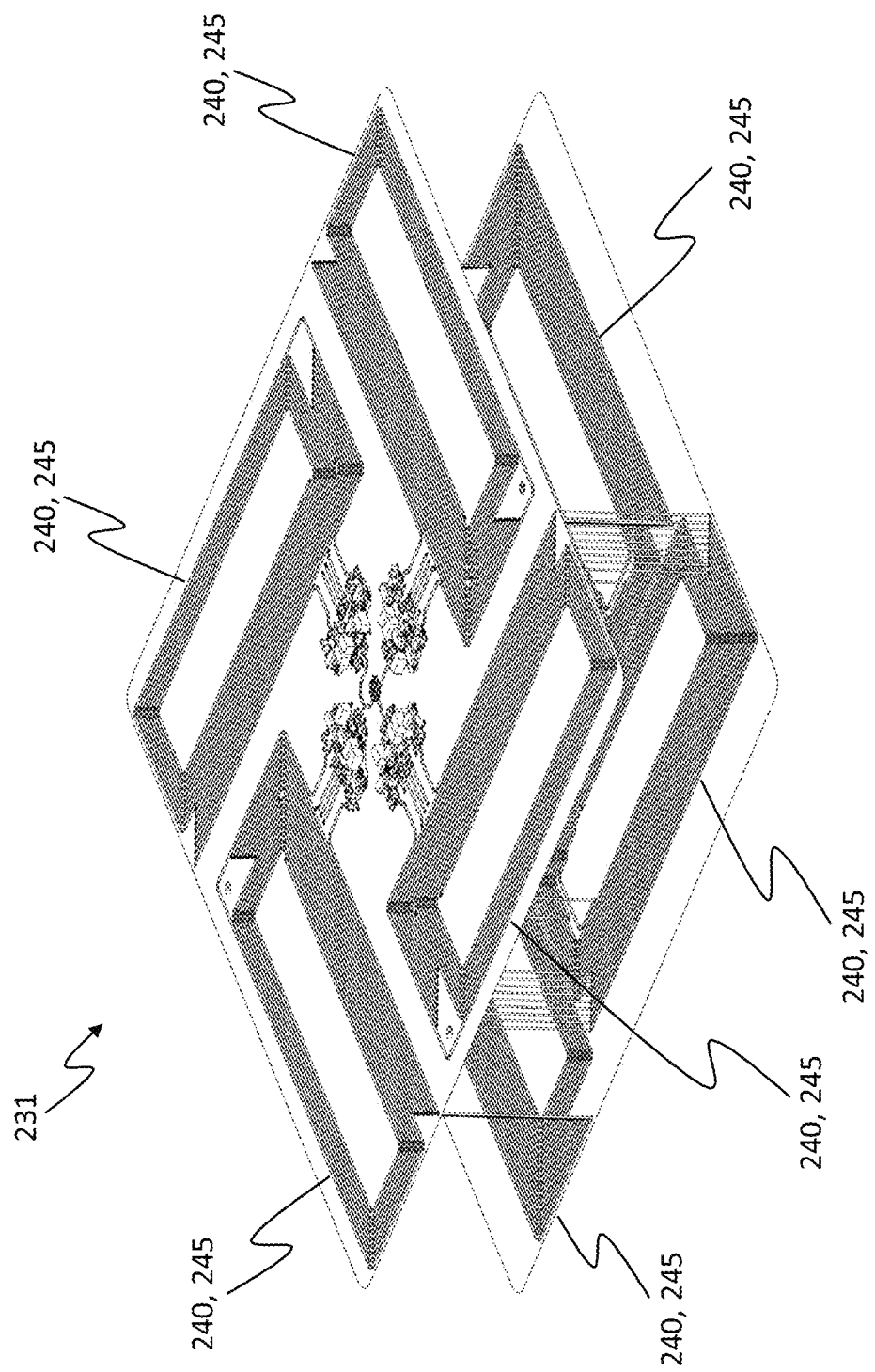
FIG. 26 is an exploded view of the printed circuit board of the rotor of FIG. 25 with a plurality of rotor coils.

FIG. 25 shows in a perspective bottom view from below a further embodiment which may be provided for the rotor 200. Here, the rotor 200 has a second printed circuit board 231 with a plurality of rotor coils 240, which is arranged on the underside and is located below the magnet device 201 shown in FIG. 21. The second circuit board 231 extends over substantially the entire surface of the rotor 200, and in this manner a relatively large coil area may be provided, which promotes effective energy transfer from the stator 5 to the rotor 200. The second printed circuit board 231 may also have a multi-layer embodiment.

In the embodiment shown in FIG. 25, the flying height of the rotor 200 may be reduced by the thickness of the second printed circuit board 231. Therefore, it may be considered to implement the second printed circuit board 231 with a smaller thickness and a smaller number of layers compared to the first printed circuit board 230 shown in FIGS. 3, 20 and 21. For example, an embodiment of the second printed circuit board 231 with a thickness of 0.3 mm and, as shown in an exploded view in FIG. 26, with two layers is possible. According to FIG. 26, in each of the two layers the second circuit board 231 has four side-by-side spiral metallic second conductor paths 245, each of which forms a rotor coil 240. The second conductive paths 245, which may have a lower number of windings than the first conductive paths 241 (cf. FIG. 23), may be interconnected by suitable electrical connecting structures.

Figure 27:
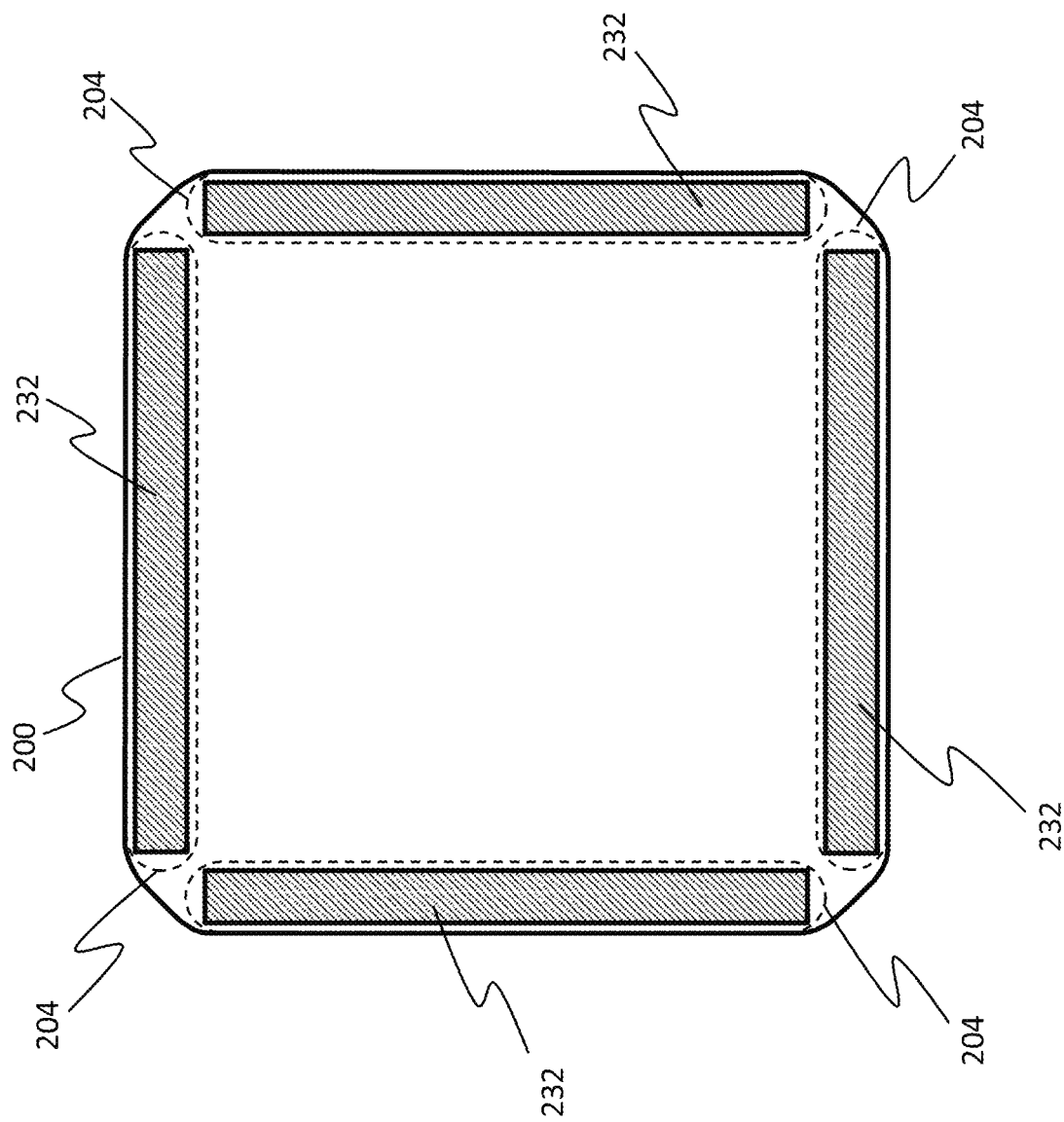
FIG. 27 is a depiction of a further embodiment of the rotor having a plurality of printed circuit boards in the region of lateral outer sides.
Figure 28:
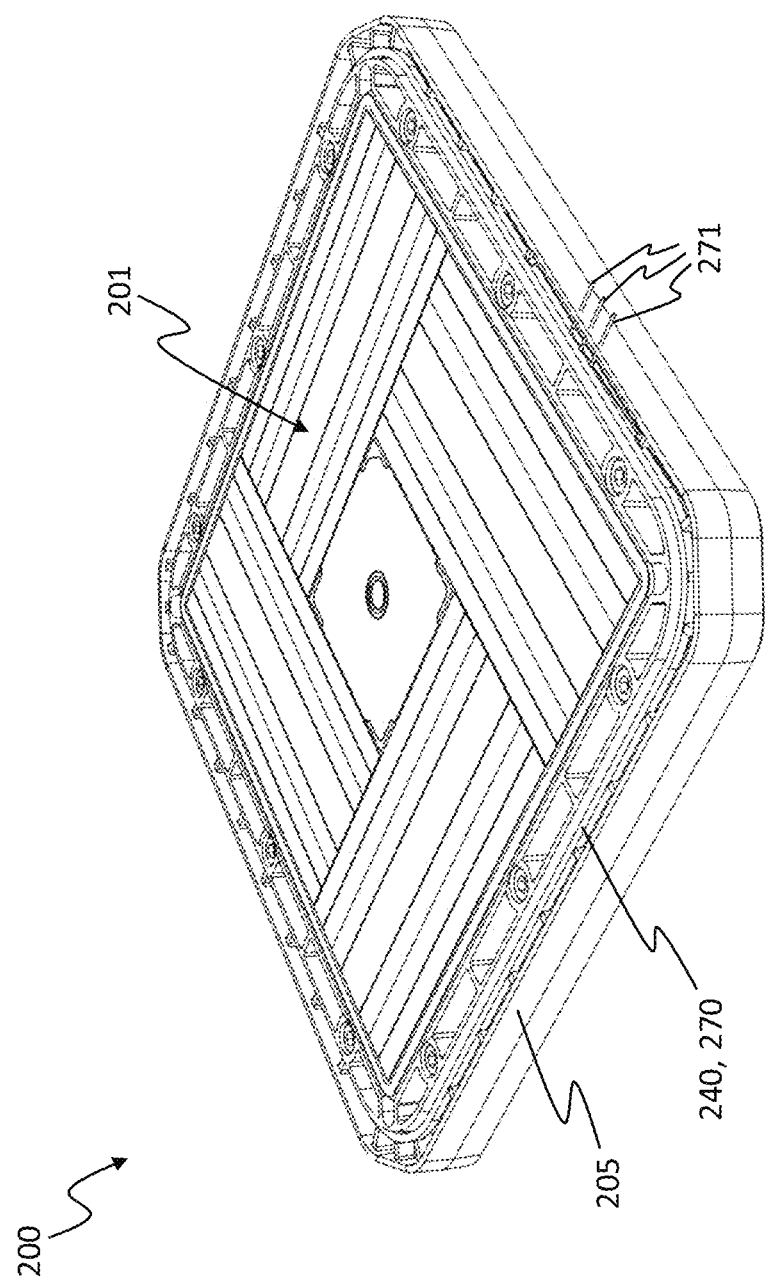
FIGS. 28 to 31 show different depictions of a further embodiment of the rotor, in which the rotor comprises a rotor coil in the form of a circumferential wound wire.

FIG. 27 shows a further embodiment which may be used with respect to the rotor 200. In this context, the rotor 200 comprises a plurality of or four third printed circuit boards 232, which are arranged in the area of lateral outer sides of the rotor 200. The third printed circuit boards 232 may be multi-layer printed circuit boards and have a thickness of e.g. 1 mm. Furthermore, the third printed circuit boards 232 may have a plurality of spiral conductor layers arranged one on top of the other and serving as rotor coils 240. The number of layers may e.g. correspond to the first circuit board 230 shown in FIG. 22. Furthermore, the third printed circuit boards 232 may be integrated into spacers 204 of the rotor 200, which may be present in the area of the lateral outer sides of the rotor 200.

Another embodiment for the rotor 200 is e.g. a modification of the embodiment shown in FIG. 27 in that the rotor 200 comprises only two third printed circuit boards 232 instead of four third printed circuit boards 232, which are arranged in the area of lateral outer sides of the rotor 200 or are integrated in spacers 204 of the rotor 200. Here, the two third printed circuit boards 232 may extend in different lateral directions. With reference to FIG. 27, e.g. only the two printed circuit boards 232 arranged at the top and left in the depiction of FIG. 27 may be provided.

FIGS. 28 to 31 show, by perspective views and views from below, a further embodiment which may be considered for the rotor 200. In this embodiment, the rotor 200 comprises a rotor coil 240 which is in the form of a wound or multi-wound metallic wire 270. In this embodiment, the rotor coil 240 comprises a plurality of circumferential wire windings. Also, the rotor coil 240 is arranged in the region of lateral outer sides of the rotor 200, and surrounds or revolves around the magnet device 201 of the rotor 200. In this way, inductive energy transfer from the stator 5 to the rotor 200 may be carried out with a high efficiency, and a relatively large electric power may be transferred.

Figure 31:
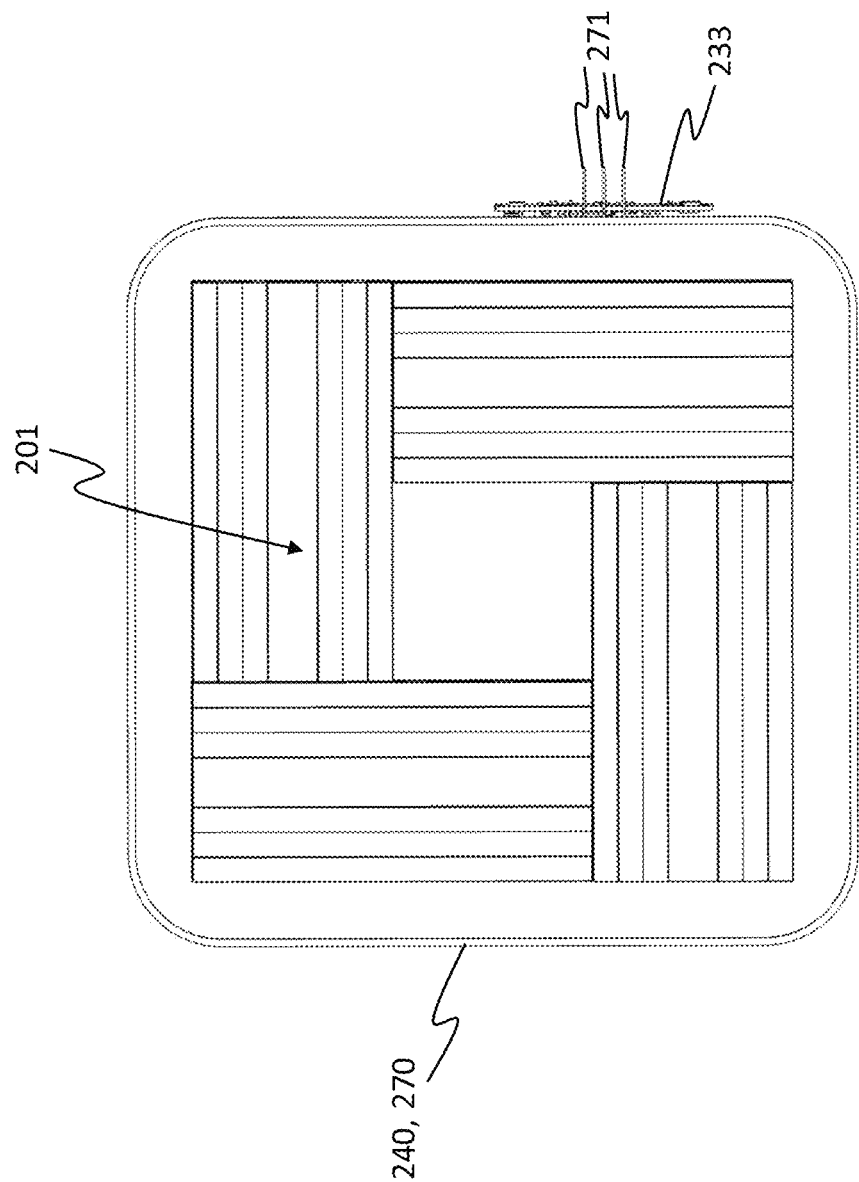

According to the embodiment shown in FIGS. 28 to 31, the rotor 200 further comprises a circumferential spacer structure 205 and a fourth circuit board 233. The spacer structure 205 may comprise or be formed of an elastically deformable material or plastic. The rotor coil 240 is integrated into the spacer structure 205, as will be apparent with reference to FIGS. 28 and 29. To illustrate this embodiment, the spacer structure 205 is omitted in FIG. 30. For further illustration, FIG. 31 shows only the rotor coil 240, the magnet device 201, and the fourth printed circuit board 233 of the rotor 200.

Figure 29:
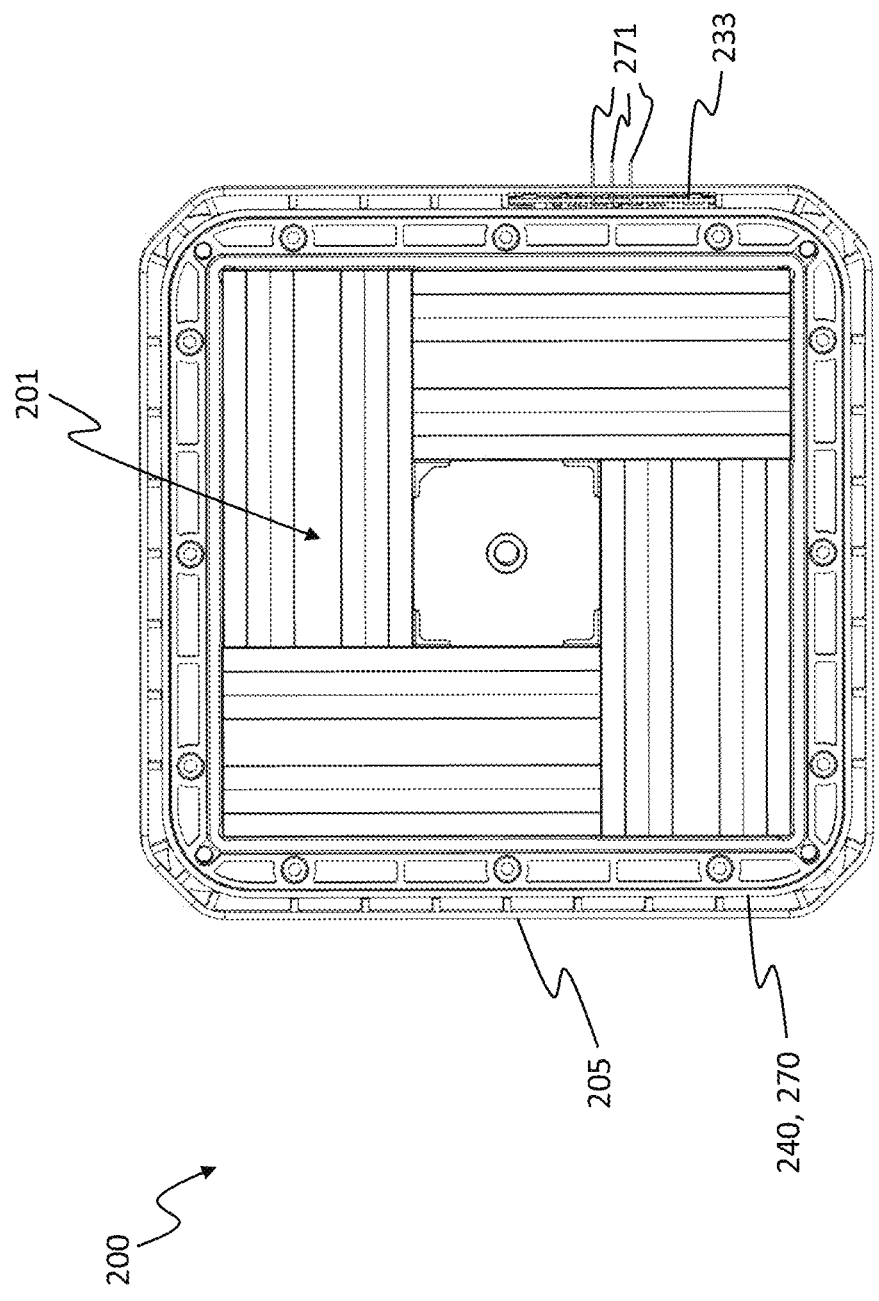
Figure 30:
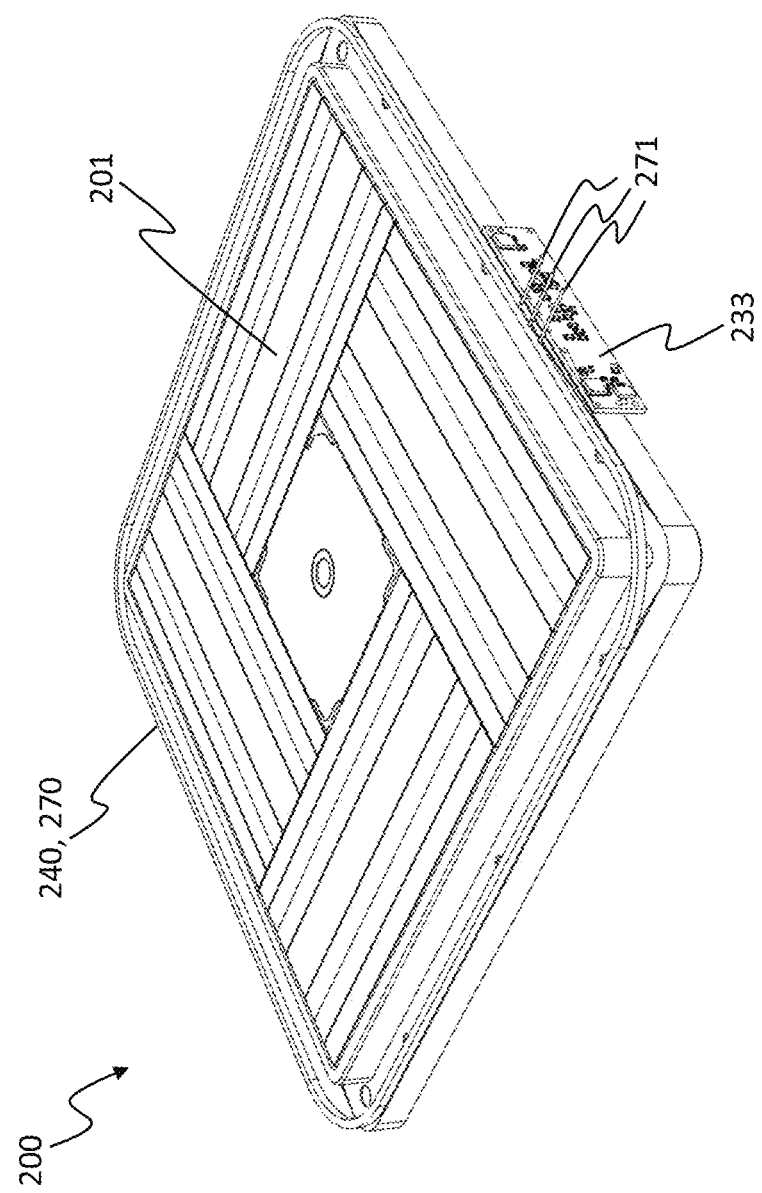

The fourth printed circuit board 233 of the rotor 200 is also integrated into the spacer structure 205 (see FIG. 29). The fourth printed circuit board 233 may comprise components described above with reference to FIG. 24, such as a rectifier 260 electrically connected to the rotor coil 240, via which an AC voltage induced in the rotor coil 240 may be converted into a DC voltage. In this way, as also described above with reference to FIG. 24, at least one further device 261 may be electrically supplied via the DC voltage provided by the rectifier 260. The further device 261 may also be integrated on the fourth printed circuit board 233.

FIGS. 28 to 31 further illustrate wire connections 271 of the rotor coil 240, which is in the form of a wound wire 270, via which the rotor coil 240 may be contacted and electrically connected to the fourth circuit board 233. According to the embodiment illustrated in FIGS. 28 to 31, the rotor coil 240 has three wire connections 271, wherein one of the wire connections 271 may serve as an intermediate tap. In this context, the rotor coil 240 may e.g. have seventy wire windings, wherein a division of sixty wire windings and ten wire windings may be realized via the intermediate tap. As a result, it is possible to short-circuit the ten wire windings of the rotor coil 240 within the framework of a load modulation not described further herein. All seventy wire windings or sixty wire windings of the rotor coil 240 may be used for power transmission. Provided that load modulation is not used, the rotor coil 240 may also have only two wire connections 271 and no intermediate tap. It is additionally noted that, in contrast to the illustration in FIGS. 28 and 29, the wire connections 271 cannot protrude laterally from the rotor 200 or from the spacer structure 205.

With the described method and planar drive system 1, an electrical power of e.g. a maximum of 10 W, e.g. a maximum of 1 W or e.g. a maximum of 100 mW may be transmitted from the stator 5 to the rotor 200. However, other or larger power values are possible, as well.

The transmitted electrical energy may be used for various applications. A non-exhaustive series of applications is described in the following. The transmitted energy may also be used simultaneously for a combination of the applications described below.

To provide more power to the rotor 200 than the inductively transferred electrical power from the stator 5 to the rotor 200, the rotor 200 may comprise a charging circuit for charging an energy storage device and an energy storage device, such as an accumulator or capacitor. Inductively transmitted power may be used to charge the energy storage device via a connection between the rotor coil 240 and the charging circuit. The charged energy storage device may then deliver the stored energy back to electronic components on the rotor 200.

The electrical power available on the rotor 200 may be used to drive an electric motor on the rotor 200. This may be used to grip or attach or rotate or lift an object on the rotor 200, or to move other mechanical components or chains of effect, such as robots.

Furthermore, a communication device, in particular a communication device serving for wireless communication, may be operated on the rotor 200. This communication device may be used for data exchange between the rotor 200 and the stator 5 or the planar drive system 1 or other communication partners.

The electrical energy available on the rotor 200 may also be used to operate a sensor on the rotor 200 that may e.g. measure a temperature or distances to surrounding objects.

The rotor 200 may also include an illuminant that may be powered by the transmitted or stored energy. The generated light may e.g. be used as building lighting, and for the purpose of efficient room lighting, such a rotor 200 may follow a person through the building with appropriate sensors to provide targeted room lighting at a person's location. Furthermore, the generated light may e.g. be in the infrared spectrum and may also serve for communication or trigger a signal in corresponding sensors, e.g. in order to open a lock separating separate working spaces of the planar drive system 1.

The transmitted electrical energy on the rotor 200 may also be used to operate a compressor for gases, such as the room air, or a vacuum pump on the rotor 200. The gas, gas mixture, or room air generated in this manner with positive pressure or negative pressure relative to the atmosphere may e.g. be used to manipulate products being transported on a rotor 200. For example, a positive pressure may be used to inflate or hold open a package of a product or a negative pressure may be used to exhaust air from a package, particularly a food package, prior to sealing a package. Furthermore, products may be sucked or held onto a rotor 200 with the help of negative pressure.

The electrical power on the rotor 200 may also be used to power a Peltier element, which is an electrothermal transducer. The Peltier element on the rotor may be used to both cool and heat a product being transported on the rotor 200. Thus, e.g. food products may be cooled during transport by the planar drive system 1 so that they spoil less quickly. Furthermore, a product to which a solder has been applied may be selectively heated so that the solder is kept liquid until a subsequent processing step.

Although the invention has been further illustrated and described in detail by embodiments, the invention is not limited by the disclosed examples and other variations may be derived therefrom by those skilled in the art without departing from the protective scope of the invention.

TABLE 1

| List of reference numerals: 1-210 |
|---|
| 1 Planar drive system |
| 5 Stator |
| 10 Stator module |
| 11 Stator surface |
| 12 First direction |
| 14 Second direction |
| 15 Third direction |
| 16 Connecting line |
| 18 Module housing |
| 21 Outer edge |
| 32 Underside |
| 33 Side surfaces |
| 100 Stator assembly |
| 104 First stator layer |
| 106 Second stator layer |
| 108 Further stator layer |
| 110 First stator sector |
| 112 Second stator sector |
| 113 Third stator sector |
| 114 Fourth stator sector |
| 120 First stator segment |
| 121 Second stator segment |
| 125 Stator conductor |
| 127 Segment width |
| 131 First forward conductor |
| 132 First return conductor |
| 141 Second forward conductor |
| 142 Second return conductor |
| 146 Third forward conductor |
| 147 Third return conductor |
| 150 Three-phase system |
| 151 First three-phase system |
| 152 Second three-phase system |
| 154 First connecting point |
| 155 Second connecting point |
| 156 Third connecting point |
| 157 Star point |
| 165 First coil |
| 166 Second coil |
| 167 Third coil |
| 170 Current controller |
| 171 PWM signal generating device |
| 172 Current measuring device |
| 173 Processing device |
| 175 Influencing device |
| 180 Output stage device |
| 181 First switch |
| 182 Second switch |
| 183 Third switch |
| 184 Fourth switch |
| 185 Fifth switch |
| 186 Sixth switch |
| 190 Module controller |
| 200 Rotor |
| 201 Magnet device |
| 204 Spacer |
| 205 Spacer structure |
| 206 First rotor direction |
| 208 Second rotor direction |
| 210 First magnet assembly |

TABLE 2

List of reference numerals: 212-602

212 Second magnet assembly
213 Third magnet assembly
214 Fourth magnet assembly
216 Rotor magnet
230 First printed circuit board
231 Second printed circuit board
232 Third printed circuit board
233 Fourth printed circuit board
240 Rotor coil
241 First conductor path
245 Second conductor path
251 Outer width
252 Inner width
260 Rectifier
261 Further device
270 Wire
271 Wire connection
300 Set current values
301 Control signals
302 Influenced control signals
303 Pulse-width-modulated control signals
304 Actual current values
305 Processed actual current values
307 Influencing signals
410 First voltage pulse
411 Fifth voltage pulse
412 Sixth voltage pulse
413 Seventh voltage pulse
212 Second magnet assembly
213 Third magnet assembly
421 Second voltage pulse
422 Third voltage pulse
423 Fourth voltage pulse
430 First current curve
431 Third current curve
432 Fourth current curve
433 Fifth current curve
435 Second current curve
437 Third current curve
439 Mean current value
441 First time range
442 Second time range
451 First curve of virtual summation current
452 Second curve of virtual summation current
461 First curve of magnetic field strength change
462 Second curve of magnetic field strength change
465 Second curve of magnetic field strength
466 First curve of magnetic field strength
467 Third curve of magnetic field strength
469 Bend
470 Current measuring point
480 Time offset
490 Grid line
500 Main controller
601 First side
602 Second side

TABLE 3

List of reference symbols i1 First current
i2 Second current
s1 First access voltage
s2 Second access voltage
t Time
Ton Pulse duration
Toff Timeout duration
Ts Period duration
X Path
Ud Intermediate circuit voltage
U First phase
V Second phase
W Third phase

The invention claimed is:

1. A planar drive system comprising:
   a stator, and
   a rotor;
   wherein the stator comprises a plurality of stator conductors,
   wherein the rotor comprises a magnet device comprising at least one rotor magnet,
   wherein the stator is configured for energizing the stator conductors,
   wherein a magnetic interaction is producible between energized stator conductors of the stator and the magnet device of the rotor in order to drive the rotor via the magnetic interaction,
   wherein the stator is configured to carry out the energizing of the stator conductors by a current control based on a pulse-width modulation (PWM), so that the energized stator conductors are supplied with an electrical voltage clocked via the pulse-width modulation, and thus with pulse-width-modulated periodic voltage pulses,
   wherein, due to the current control based on the pulse-width modulation, a ripple current is generated in the energized stator conductors of the stator and an alternating magnetic field is generated thereby, and
   wherein the rotor comprises at least one rotor coil in which an alternating voltage is induced due to the alternating magnetic field.

2. The planar drive system according to claim 1, wherein the rotor comprises a rectifier for converting the induced alternating voltage into a direct voltage.

3. The planar drive system according to claim 1, wherein the magnet device of the rotor comprises a plurality of rotor magnets surrounding a region, and wherein the at least one rotor coil of the rotor is arranged in the region surrounded by the rotor magnets.

4. The planar drive system according to claim 1, wherein the at least one rotor coil comprises a plurality of rotor coils arranged in a region below the magnet device of the rotor.

5. The planar drive system according to claim 1, wherein the at least one rotor coil comprises a plurality of rotor coils arranged in a region of lateral outer sides of the rotor.

6. The planar drive system according to claim 1, wherein the at least one rotor coil of the rotor is configured as a wound wire and encloses the magnet device of the rotor.

7. The planar drive system according to claim 1,
   wherein the stator conductors of the stator are connected to form multi-phase systems which are energizable independently of one another,
   wherein the stator is configured to carry out the current control based on the pulse-width modulation as a separate current control for each of the multi-phase systems,
   wherein the stator comprises a plurality of current measuring devices for carrying out the separate current control for each of the multi-phase systems,
   wherein the current measuring devices are each connected to an associated group comprising a plurality of the multi-phase systems, and
   wherein the current measuring devices are configured for sampling currents flowing in the multi-phase systems of the respectively associated groups, and to carry out the sampling of the currents simultaneously with respect to only one of the multi-phase systems in each associated group.

8. The planar drive system according to claim 7,
   wherein the stator is configured to carry out the sampling of the currents flowing in the multi-phase systems of a group of the associated groups via the associated current measuring device in a time-coordinated manner with pulse-width-modulated energizing of the multi-phase systems of the group, wherein the stator is further configured to carry out the pulse-width-modulated energizing of the multi-phase systems of the group and the sampling of the currents flowing in the multi-phase systems of the group with a time offset, the time offset being present in each case between the pulse-width modulated energizing of one multi-phase system of the group and the pulse-width modulated energizing of another multi-phase system of the group, and between the sampling of the currents flowing in the one multi-phase system of the group and the sampling of the currents flowing in the other multi-phase system of the group, and wherein the time offset corresponds to a sampling time period of the current measuring devices.

9. The planar drive system according to claim 7, wherein:
the stator is configured, in a first operating mode, to carry out the sampling of the currents of the multi-phase systems of a group of the associated groups via the associated current measuring device in a time-coordinated manner with pulse-width-modulated energizing of the multi-phase systems of the group, and to carry out the pulse-width-modulated energizing of the multi-phase systems of the group and the sampling of the currents flowing in the multi-phase systems of the group with a time offset, the time offset being present in each case between the pulse-width modulated energizing of one multi-phase system of the group and the pulse-width modulated energizing of another multi-phase system of the group, and between the sampling of the currents flowing in the one multi-phase system of the group and the sampling of the currents flowing in the other multi-phase system of the group, and wherein the stator is further configured, in a second operating mode, to carry out the pulse-width-modulated energizing of the multi-phase systems of the group without a time offset, and thus synchronously in time, and to carry out the sampling of the currents flowing in the multi-phase systems of the group via the associated current measuring device with a time offset being present in each case between the sampling of the currents flowing in one multi-phase system of the group and the sampling of the currents flowing in another multi-phase system of the group.

10. The planar drive system according to claim 1, wherein the stator comprises a switchable influencing device which is configured to influence the current control such that an amplified ripple current is generated in the energized stator conductors of the stator and an amplified alternating magnetic field is generated thereby.

11. The planar drive system according to claim 10, wherein the switchable influencing device is configured such that the amplified ripple current and the amplified alternating magnetic field comprise a larger oscillation width than in a state without the influence on the current control by the switchable influencing device.

12. The planar drive system according to claim 10, wherein the switchable influencing device is configured such that a mean value of a current flowing in the energized stator conductors remains substantially unchanged as a result of the influence on the current control by the switchable influencing device.

13. The planar drive system according to claim 10, wherein the stator comprises:
a plurality of current controllers, PWM signal generating devices, and output stage devices connected to the stator conductors and current measuring devices for carrying out the current control;

wherein the current controllers are configured to generate control signals which are transmitted to the PWM signal generating devices, wherein the PWM signal generating devices are configured to generate pulse-width-modulated control signals which are applied to the output stage devices, and wherein the output stage devices are configured for applying voltage pulses to the stator conductors based on the pulse-width-modulated control signals; and wherein the switchable influencing device is configured to generate influencing signals which are added to the control signals generated by one or more of the current controllers or to the pulse-width-modulated control signals generated by one or more of the PWM signal generating devices.

14. The planar drive system according to claim 13, wherein the switchable influencing device is configured to generate the influencing signals such that the voltage pulses comprise different pulse durations and/or polarities that are inverse with regard to one another as applied to the stator conductors.

15. A stator for a planar drive system for driving a rotor, the rotor comprising:
a magnet device comprising at least one rotor magnet, and at least one rotor coil;

wherein the stator comprises a plurality of stator conductors, wherein the stator is configured for energizing the stator conductors, so that a magnetic interaction is producible between energized stator conductors of the stator and the magnet device of the rotor in order to drive the rotor via the magnetic interaction, wherein the stator is configured to carry out the energizing of the stator conductors for driving the rotor by a current control based on a pulse-width modulation (PWM), so that the energized stator conductors are supplied with an electrical voltage clocked via the pulse-width modulation, and thus with pulse-width-modulated periodic voltage pulses, wherein, due to the current control based on the pulse-width modulation, a ripple current is generated in the energized stator conductors of the stator and an alternating magnetic field is generated thereby, via which an alternating voltage is inducible in the at least one rotor coil of the rotor, wherein the stator comprises a switchable influencing device which is configured to influence the current control such that an amplified ripple current is generated in the energized stator conductors of the stator and an amplified alternating magnetic field is generated thereby, and wherein the amplified ripple current and the amplified alternating magnetic field comprise a larger oscillation width than the ripple current and the alternating magnetic field in a state without influence on the current control by the switchable influencing device.

16. The stator according to claim 15, wherein a mean value of a current flowing in the energized stator conductors remains substantially unchanged as a result of the influence on the current control by the switchable influencing device.

17. The stator according to claim 15, wherein voltage pulses comprising different pulse durations and/or polarities that are inverse with regard to one another are applied to the energized stator conductors as a result of the influence on the current control by the switchable influencing device.

18. A planar drive system comprising:
a stator, and
a rotor;
wherein the stator comprises a plurality of stator conductors,
wherein the rotor comprises a magnet device comprising at least one rotor magnet,
wherein the stator is configured for energizing the stator conductors,
wherein a magnetic interaction is producible between energized stator conductors of the stator and the magnet device of the rotor in order to drive the rotor via the magnetic interaction,
wherein the stator is configured to carry out the energizing of the stator conductors by a current control based on a pulse-width modulation (PWM),
wherein, due to the current control based on the pulse-width modulation, a ripple current is generated in the energized stator conductors of the stator and an alternating magnetic field is generated thereby,
wherein the rotor comprises at least one rotor coil in which an alternating voltage is inducible due to the alternating magnetic field, and
wherein the at least one rotor coil of the rotor is configured as a wound wire and encloses the magnet device of the rotor.

19. The planar drive system according to claim 18, wherein the at least one rotor coil of the rotor is integrated in a circumferential spacer structure of the rotor.

* * * * *